US008230359B2

(12) United States Patent
Robertson et al.

(10) Patent No.: US 8,230,359 B2
(45) Date of Patent: Jul. 24, 2012

(54) SYSTEM AND METHOD THAT FACILITATES COMPUTER DESKTOP USE VIA SCALING OF DISPLAYED OBJECTS WITH SHIFTS TO THE PERIPHERY

(75) Inventors: George G. Robertson, Seattle, WA (US); Eric J. Horvitz, Kirkland, WA (US); Daniel C. Robbins, Seattle, WA (US); Gregory R. Smith, Bellevue, WA (US); Mary P. Czerwinski, Woodinville, WA (US); Patrick Markus Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1480 days.

(21) Appl. No.: 10/374,351

(22) Filed: Feb. 25, 2003

(65) Prior Publication Data

US 2004/0165010 A1    Aug. 26, 2004

(51) Int. Cl.
 *G06F 3/048* (2006.01)
(52) U.S. Cl. .................. 715/801; 715/798; 715/802
(58) Field of Classification Search .................. 715/782, 715/848, 764, 839, 767, 805, 517, 781, 788, 715/798–802
See application file for complete search history.

(56) References Cited

U.S. PATENT DOCUMENTS

| | | | |
|---|---|---|---|
| 5,305,435 A | 4/1994 | Bronson | |
| 5,381,523 A | 1/1995 | Hayashi | |
| 5,423,043 A | 6/1995 | Fitzpatrick et al. | |
| 5,493,692 A | 2/1996 | Theimer et al. | |
| 5,495,567 A | 2/1996 | Iizawa et al. | |
| 5,513,342 A | 4/1996 | Leong et al. | |
| 5,544,321 A | 8/1996 | Theimer et al. | |
| 5,555,376 A | 9/1996 | Theimer et al. | |
| 5,592,602 A * | 1/1997 | Edmunds et al. | 345/474 |
| 5,599,191 A * | 2/1997 | DeLara | 439/49 |
| 5,603,054 A | 2/1997 | Theimer et al. | |
| 5,611,050 A | 3/1997 | Theimer et al. | |
| 5,652,850 A | 7/1997 | Hollander | |
| 5,799,292 A | 8/1998 | Hekmatpour | |
| 5,802,220 A | 9/1998 | Black et al. | |
| 5,812,128 A | 9/1998 | Sterling, IV | |

(Continued)

FOREIGN PATENT DOCUMENTS

EP    0570083 A2    11/1993

(Continued)

OTHER PUBLICATIONS

Francois Guimbretiere, Maureen Stone, and Terry Winograd. Fluid Interaction with High-resolution Wall-size Displays. Symposium on User Interface Software and Technology '01, Nov. 2001. 10 pages.

(Continued)

*Primary Examiner* — Tadeese Hailu
(74) *Attorney, Agent, or Firm* — Lee & Hayes, PLLC

(57) ABSTRACT

The system described herein facilitates multi-tasking in a computing environment. A focus area component defines a focus area within a display space—the focus area occupying a subset area of the display space area. A scaling component scales display objects as a function of proximity to the focus area, and a behavior modification component modifies respective behavior of the display objects as a function their location of the display space. Thus, and more particularly the subject invention provides for interaction technique(s) and user interface(s) in connection with managing display objects on a display surface.

85 Claims, 69 Drawing Sheets

U.S. PATENT DOCUMENTS

| | | | |
|---|---|---|---|
| 5,812,865 | A | 9/1998 | Theimer et al. |
| 5,838,318 | A | 11/1998 | Porter et al. |
| 5,838,326 | A * | 11/1998 | Card et al. ............ 715/775 |
| 5,844,559 | A | 12/1998 | Guha et al. |
| 5,874,962 | A | 2/1999 | De Judicibus et al. |
| 5,880,733 | A | 3/1999 | Horvitz et al. |
| 5,920,315 | A | 7/1999 | Santos et al. |
| 6,016,145 | A | 1/2000 | Horvitz et al. |
| 6,025,841 | A | 2/2000 | Finkelstein et al. |
| 6,043,817 | A | 3/2000 | Bolnick et al. |
| 6,104,359 | A | 8/2000 | Endres et al. |
| 6,134,566 | A | 10/2000 | Berman et al. |
| 6,160,553 | A | 12/2000 | Robertson et al. |
| 6,188,405 | B1 | 2/2001 | Czerwinski et al. |
| 6,256,648 | B1 * | 7/2001 | Hill et al. ............ 715/501.1 |
| 6,263,352 | B1 | 7/2001 | Cohen |
| 6,266,064 | B1 * | 7/2001 | Snyder ............ 345/421 |
| 6,275,858 | B1 | 8/2001 | Bates et al. |
| 6,286,043 | B1 | 9/2001 | Cuomo et al. |
| 6,369,827 | B1 | 4/2002 | Pan et al. |
| 6,369,837 | B1 * | 4/2002 | Schirmer ............ 715/764 |
| 6,374,200 | B1 | 4/2002 | Nakagawa |
| 6,411,292 | B1 | 6/2002 | Cook et al. |
| 6,414,677 | B1 | 7/2002 | Robertson et al. |
| 6,462,759 | B1 | 10/2002 | Kurtzberg et al. |
| 6,464,759 | B1 | 10/2002 | Bossard et al. |
| 6,466,232 | B1 | 10/2002 | Newell et al. |
| 6,466,237 | B1 | 10/2002 | Miyao et al. |
| 6,513,046 | B1 | 1/2003 | Abbott, III et al. |
| 6,545,660 | B1 | 4/2003 | Shen et al. |
| 6,549,218 | B1 | 4/2003 | Gershony et al. |
| 6,549,915 | B2 | 4/2003 | Abbott, III et al. |
| 6,570,590 | B1 | 5/2003 | Dubrow et al. |
| 6,590,593 | B1 * | 7/2003 | Robertson et al. ............ 715/782 |
| 6,629,097 | B1 | 9/2003 | Keith |
| 6,684,177 | B2 | 1/2004 | Mishra et al. |
| 6,747,675 | B1 | 6/2004 | Abbott et al. |
| 6,791,530 | B2 | 9/2004 | Vernier et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,826,727 | B1 | 11/2004 | Mohr et al. |
| 6,842,877 | B2 | 1/2005 | Robarts et al. |
| 6,868,441 | B2 * | 3/2005 | Greene et al. ............ 709/220 |
| 6,909,443 | B1 * | 6/2005 | Robertson et al. ............ 715/782 |
| 6,959,425 | B1 | 10/2005 | Krauklis |
| 6,964,025 | B2 | 11/2005 | Angiulo et al. |
| 6,999,955 | B1 * | 2/2006 | Horvitz ............ 706/45 |
| 7,015,910 | B2 * | 3/2006 | Card et al. ............ 345/427 |
| 7,051,291 | B2 | 5/2006 | Sciammarella et al. |
| 7,068,288 | B1 | 6/2006 | Good et al. |
| 7,111,231 | B1 | 9/2006 | Huck et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0033779 | A1 | 3/2002 | Nakai et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054117 | A1 * | 5/2002 | van Dantzich et al. ....... 345/766 |
| 2002/0054130 | A1 | 5/2002 | Abbott, III et al. |
| 2002/0054174 | A1 | 5/2002 | Abbott et al. |
| 2002/0077156 | A1 | 6/2002 | Smethers |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0101418 | A1 * | 8/2002 | Vernier et al. ............ 345/418 |
| 2002/0112180 | A1 * | 8/2002 | Land et al. ............ 713/200 |
| 2002/0184233 | A1 | 12/2002 | Schneider |
| 2003/0046401 | A1 | 3/2003 | Abbott et al. |
| 2003/0052920 | A1 | 3/2003 | Carter |
| 2003/0069892 | A1 | 4/2003 | Hind et al. |
| 2003/0154476 | A1 | 8/2003 | Abbott, III et al. |
| 2003/0156124 | A1 * | 8/2003 | Good et al. ............ 345/620 |
| 2003/0179236 | A1 | 9/2003 | Good et al. |
| 2003/0220895 | A1 | 11/2003 | Vailaya |
| 2003/0225853 | A1 | 12/2003 | Wang et al. |
| 2004/0109006 | A1 * | 6/2004 | Matthews ............ 345/619 |
| 2004/0123238 | A1 | 6/2004 | Hefetz et al. |
| 2004/0143590 | A1 | 7/2004 | Wong et al. |
| 2004/0148573 | A1 | 7/2004 | Buice et al. |
| 2004/0225986 | A1 | 11/2004 | Lin et al. |
| 2005/0034066 | A1 | 2/2005 | Ahlert et al. |
| 2005/0034078 | A1 | 2/2005 | Abbott et al. |
| 2005/0086239 | A1 | 4/2005 | Swann et al. |

FOREIGN PATENT DOCUMENTS

| | | |
|---|---|---|
| EP | 1253510 | 10/2002 |
| EP | 1283483 A2 | 2/2003 |
| JP | 5197509 | 8/1993 |
| JP | 10003375 | 1/1998 |
| JP | 2001024685 | 1/2001 |
| WO | 9800787 | 1/1998 |
| WO | WO9815890 A1 | 4/1998 |

OTHER PUBLICATIONS

Mary P. Czerwinski, Maarten Van Dantzich, George Robertson, and Hunter Hoffman. The Contribution of Thumbnail Image, Mouse-over Text and Spatial Location Memory to Web Page Retrieval in 3D. Interact '99, Edinburgh, UK, Aug. 30, 1999. 8 pages.

George Robertson, Mary Czerwinski, Kevin Larson, Daniel C. Robbins, David Thiel, and Maarten Van Dantzich. Data Mountain: Using Spatial Memory for Document Management. Symposium on User Interface Software and Technology '98, pp. 153-162, Nov. 1998.

Elizabeth D. Mynatt, Takeo Igarashi, W. Keith Edwards, and Anthony Lamarca. Flatland: New Dimensions in Office Whiteboards. Conference on Human Factors and Computing Systems '99, pp. 346-353. May 1999.

Mary Czerwinski, Susan Dumais, George Robertson, Susan Dziadosz, Scott Tiernan, and Maarten Van Dantzich. Visualizing Implicit Queries for Information Management Retrieval. Conference on Human Factors and Computing Systems '99, pp. 560-567, May 1999.

Robert St. Amant, Michael D. Dinardo, and Nickie Buckner. Balancing Efficiency and Interpretability in an Interactive Statistical Assistant. International Conference on Intelligent User Interfaces'03, pp. 181-188, Jan. 2003.

XDESK Software, About Virtual Desktop Managers, Available at: http://www.virtual-desktop.info/, last accessed on May 17, 2006, 3 pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Liam Bannon, et al., Evaluation and Analysis of User's Activity Organization, Proceedings of the CHI '83, Dec. 1983, pp. 54-57.

Patrick Baudisch, et al., Focus Plus Context Visualization Screens: Combining Display Technology with Visualization Techniques, Proceedings of UIST '01, ACM 2002, pp. 31-40.

Benjamin B. Bederson, et al., Pad++: A Zooming Graphical Interface for Exploring Alternative Interface Physics, Proceedings of UIST '94, Nov. 2-4, 1994, pp. 17-26.

Blaine A. Bell, et al., Dynamic Space Management for User Interfaces, Proceedings of UIST '00, ACM Symposium of User Interface Software and Technology, San Diego, California, Nov. 5-8, 2000, pp. 238-248.

Sara A. Bly, et al., A Comparison of Tiled and Overlapping Windows, Proceedings of CHI '86, Apr. 1986, pp. 101-106.

Stuart K. Card, et al., A Multiple, Virtual-Workspace Interface to Support User Task Switching. In Proc. CHI+GI 1987, pp. 53-59.

Edward Cutrell, et al., Notification, Disruption, and Memory: Effects of Messaging Interruptions on Memory and Performance, Human-Computer Interaction—Interact '01, IOS Press, 2001, pp. 263-269.

Mary Czerwinski, et al., Instant Messaging and Interruption: Influence of Task Type on Performance, Proceedings of OZCHI 2000, pp. 356-361.

Mary Czerwinski, et al., Instant Messaging: Effects of Relevance and Time, Proceedings of HCI 2000, British Computer Society, 2000, vol. 2, pp. 71-76.

Mary Czerwinski, et al., An Investigation of Memory for Daily Computing Events, Proceedings of HCI 2002, pp. 230-245.

Mary Czerwinski, et al., A Diary Study of Task Switching and Interruptions, Proceedings of the Conference on Human Factors in Computing Systems (CHI 2004), Vienna, Austria, Apr. 24-29, 2004, vol. 6, No. 1, pp. 175-182.

A. Goldberg, Smalltalk-80: Chapter 17—Views, New York: Addison-Wesley, 1983, pp. 292-297.

D. Austin Henderson, Jr., et al., Rooms: The Use of Multiple Virtual Workspaces to Reduce Space Contention in a Window-Based Graphical User Interface, ACM Transactions on Graphics, vol. 5, No. 3, Jul. 1986, pp. 211-243.

Eser Kandogan, et al., Elastic Windows: Evaluation of Multi-Window Operations, Proceedings of CHI 1997, pp. 250-257.

Victor Kaptelinin, UMEA: Translating Interaction Histories into Project Contexts, Proceedings of CHI 2003, Ft. Lauderdale, Florida, Apr. 5-10, 2003, vol. No. 5, Issue No. 1, pp. 353-360.

Blare MacIntyre, et al., Support for Multitasking and Background Awareness Using Interactive Peripheral Displays, Proceedings of UIST 2001, Orlando, Florida, Nov. 11-14, 2001, ACM 2001, vol. 3, No. 2, pp. 41-50.

Thomas W. Malone, How Do People Organize Their Desks? Implications for the Design of Office Information Systems, ACM Transactions on Office Information Systems, Jan. 1983, vol. 1, No. 1, pp. 99-112.

Brad A. Myers, Window Interfaces: A Taxonomy of Window Manager User Interfaces, IEEE Computer Graphics and Applications, Sep. 1988, vol. 8, No. 5, pp. 65-84.

Jun Rekimoto, Time-Machine Computing: A Time-centric Approach for the Information Environment, Proceedings of UIST '99, pp. 45-54.

George Robertson, et al., The Task Gallery: A 3D Window Manager, Proceedings of CHI '00, Apr. 1-6, 2000, vol. 2, Issue 1, pp. 494-501.

Greg Smith, et al., GroupBar: The TaskBar Evolved, Proceedings of OZCHI '03, 2003, 10 pages.

Warren Teitelman, Ten Years of Window Systems—A Retrospective View, in F. Hopgood, et al. (Eds.), Methodology of Window Management, Berlin: Springer-Verlag, 1986, pp. 35-46.

Desney S. Tan, et al. "WinCuts: Manipulating Arbitrary Window Regions for More Effective Use of Screen Space", CHI 2004, Apr. 2004, pp. 1525-1528, ACM, Vienna, Austria.

Dugald Hutching, et al. "Revisiting Display Space Management: Understanding Current Practice to Inform Next-Generation Design", Graphics Interface 2004, May 19, 2004, pp. 127-134, Canadian Human-Computer Communications Society, Ontario.

Nicolas Roussel, "Ametista: A Mini-Toolkit for Exploring New Window Management Techniques", Latin American Conference on Human-Computer Interaction, Aug. 2003, pp. 117-124, ACM, Rio de Janeiro, Brazil.

George Robertson, et al. "The Task Gallery: A 3D Window Manager", CHI 2000, Apr. 2000, pp. 494-501, V. 2.1, ACM, The Hague, Amsterdam.

Eser Kandogan, et al. "Elastic Windows: Evaluation of Multi-Window Operations", CHI 97, 1997, pp. 250-257, ACM, Atlanta, GA.

George Robertson, et al. "Scalable Fabric: Flexible Task Management", AVI '04, May 2004, pp. 85-89, ACM, Atlanta, GA.

European Search Report for European Application No. EP04004253, dated Oct. 26, 2006. 3 pages.

Amant, et al., "Balancing Efficiency and Interpretability in an Interactive Statistical Assistant", International Conference on Intelligent User Interface 2003, pp. 181-188, Jan. 2003.

Office Action from the U.S. Patent and Trademark Office for U.S. Appl. No. 10/851,459, mailed on Aug. 28, 2010, 12 pgs.

Final Office Action from the U.S. Patent and Trademark Office for U.S. Appl. No. 10/851,569, mailed on Aug. 30, 2007, 9 pgs.

Final Office Action from the U.S. Patent and Trademark Office for U.S. Appl. No. 10/851,569, mailed on Oct. 27, 2008, 13 pgs.

Final Office Action from the U.S. Patent and Trademark Office for U.S. Appl. No. 10/851,928, mailed on Dec. 7, 2007, 12 pgs.

Final Office Action from the U.S. Patent and Trademark Office for U.S. Appl. No. 10/851,569, mailed on Jan. 12, 2010, 13 pgs.

Final Office Action from the U.S. Patent and Trademark Office for U.S. Appl. No. 10/851,569, mailed on Mar. 9, 2011, 15 pgs.

Grudin, "Partitioning Digital Worlds: Focal and Peripheral Awareness in Multiple Monitor Use," SIGGHI'01, ACM Mar. 31-Apr. 5, 2001, Seattle, WA, 8 pages.

K. S. Booth, et al., "On the Parameters of Human Visual Performance an Investigation of the Benefits of Antialiasing," Computer Graphics Laboratory, University of Waterloo, Waterloo, Ontario, Canada, ACM Apr. 5-9, 1987, 7 pages.

Mario Ruggier, "Guide for Using the Software Documentation Layout Template," accessible from http://engineering-software.web.cern.ch/engineering-software/Products/Framemaker/Docsys/www/distribution/CERN-ONLY/sdlt/SDLT/doc/ugSDLT.pdf, Jul. 5, 1999, 56 pages.

Office Action from the U.S. Patent and Trademark Office for U.S. Appl. No. 10/851,459, mailed on Apr. 10, 2007, 10 pgs.

Office Action from the U.S. Patent and Trademark Office for U.S. Appl. No. 10/851,928, mailed on Jun. 26, 2007, 12 pgs.

Office Action from the U.S. Patent and Trademark Office for U.S. Appl. No. 10/851,459, mailed on Sep. 18, 2007, 10 pgs.

Office Action from the U.S. Patent and Trademark Office for U.S. Appl. No. 10/851,569, mailed on May 12, 2009, 10 pgs.

Office Action from the U.S. Patent and Trademark Office for U.S. Appl. No. 10/851,569, mailed on Jan. 15, 2008, 9 pgs.

Office Action from the U.S. Patent and Trademark Office for U.S. Appl. No. 10/851,569, mailed on Apr. 2, 2007, 10 pgs.

Office Action from the U.S. Patent and Trademark Office for U.S. Appl. No. 10/851,569, mailed on May 27, 2008, 11 pgs.

Office Action from the U.S. Patent and Trademark Office for U.S. Appl. No. 10/851,569, mailed on Jul. 20, 2010, 11 pgs.

Pattison et al., "Information Visualisation using Composable Layouts and Visual Sets," Dec. 2011, Conference in Research and Practice in Information Technology, vol. 9, Commonwealth of Australia, 10 pages.

Y. K. Leung et al., "A Review of Distortion-Oriented Presentation Techniques," ACM Transactions on Computer-Human Interaction, vol. 1, No. 2, Jun. 1994, pp. 126-160.

* cited by examiner

SYSTEM AND METHOD THAT FACILITATES COMPUTER DESKTOP USE VIA SCALING OF DISPLAYED OBJECTS WITH SHIFTS TO THE PERIPHERY

TECHNICAL FIELD

The present invention relates generally to user interfaces, and more particularly to a graphical user interface, data structure and method to facilitate management of data.

BACKGROUND OF THE INVENTION

Various graphical user interfaces have been developed to provide a rich experience for computer users. Computer programs typically provide a graphical user interface (GUI) to facilitate data entry, to enable viewing output on a display screen, as well as to manipulate or rearrange data. A graphical user interface can be associated with an application program or operating system shell, which may be running on a user's local machine and/or remotely, such as in a distributing computing system or over the Internet. In view of continuing technological developments and increasing use of the Internet, people are using computers to access information to an ever-increasing extent. Such information can reside locally on the person's computer or within a local network or be global in scope, such as over the Internet.

Users of window-based graphical user interfaces face difficult problems when they employ a same machine for multiple tasks or activities—they often have a large number of windows to manage, with many windows for each task. Switching between tasks is difficult because the windows often can be scattered around. Moreover, if windows are minimized while not in use, they are typically not organized together. If not minimized, a user can be faced with a difficult task of locating all relevant obscured windows and bringing them to a top of a display.

When users begin employing large display configurations (e.g., multiple monitors), managing windows and tasks becomes an ever more difficult problem, because minimized windows are kept in a location that may be significantly distant from where they will be used. Managing many display objects on small displays (e.g., PDA's) is also difficult—in such case, oftentimes sufficient screen space is not available to display objects of interest.

Although various attempts have been made via conventional user interface schemes to address some of the aforementioned concerns, there is still a substantial unmet need for a system and/or methodology that facilitates efficient use of valuable computer desktop real estate in a multi-task working environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or method that provides for interaction technique(s) and user interface(s) in connection with managing display objects on a display surface. One aspect of the invention defines a central focus area where the display objects are displayed and behave as usual, and a periphery outside the focus area where the display objects are reduced in size based on their location, getting smaller as they near an edge of the display surface so that many more objects can remain visible. In addition or alternatively, the objects can fade and/or become increasingly transparent as they move toward an edge—fading increasing as a function of distance from the focus area and/or use of the object and/or priority of the object. Objects in the periphery can also be modified to have different interaction behavior (e.g., lower refresh rate, fading, reconfigured to display sub-objects based on relevance and/or visibility, static, . . . ) since they may be too small for standard techniques.

The invention can be implemented in connection with any suitable display area (e.g., large display surfaces, standard display surfaces and small, for example PDA, displays as well). The invention has wide applicability to window and task management in a multi-task computing environment, for example. In such case, display objects are typically windows although they can be objects (e.g., documents, presentations, media, pictures, audio files, video files . . . ) as well. In the focus area, the windows can have a standard appearance and behavior. When the display objects cross into a periphery of the focus area, the objects reduce in size and the behavior can change to a much simpler set of interactions. For example, refresh rate of the windows can be made a function of size and/or distance from the focus area. In addition or alternatively, the windows outside of the periphery can become static until repositioned into the focus area.

By grouping windows in the periphery into clusters, and supporting cluster operations (e.g., move all cluster windows into the focus area, or move windows in the focus area back to their peripheral location), the invention significantly facilitates task management, allowing user(s) to easily swap from one task (or activity) to another.

Another aspect of the invention provides for employing computer-based intelligence (e.g., inference, probabilistic determination, statistical determination, machine learning . . . ) that can move the display objects as a function of activity and/or priority associated therewith. For example, display objects that have not been used for a predetermined period of time can be made to drift from the focus area to the edge of the display space. Likewise, size of the display object can also be automatically adjusted as a function of various pre-defined and/or learned metrics. Moreover, based on computer-based inference as to a user desired display of object(s), object(s) can automatically be moved to the focus area for interaction therewith based at least upon predetermined and/or learned metrics associated with user use and inferred intentions.

It is to be appreciated that the subject invention is not limited to window and/or task management, but can work for any suitable kind of display objects. For example, the invention can be employed in connection with photo management.

One particular aspect of the invention relates to a notion of automated, patterned, canonical display object (e.g., window) motion given enlargement or opening of indicia at a center of focus. A concept behind such notion is the idea that the invention can include flexible policies for effecting shifts of multiple display objects so as to automatically move older, less active objects into a periphery—and to pop them back when those objects go away.

Another particular aspect of the invention relates to a notion of fundamental transitions or phases of transition that can be discontinuous, also to maintain, in a substantially continuous manner scaling properties associated therewith. In such case, a minimum density or resolution of an object can be established as a threshold and the object can be rendered into a different, potentially less visually accessible representation—and the object(s) can be re-rendered when other object(s) are closed. Thus, the subject invention can provide for several multilevel transitions, including continuous and potentially discontinuous transitions.

Yet another aspect of the invention provides for continuously adding more objects and a mechanism for automatically shifting and moving off and on objects, in a manner that keeps the respective objects on a screen usable (e.g., above a particular resolution). The invention also provides a means for implicitly returning to similar state(s) as newer objects are closed.

Another aspect of the invention relates to display object occlusion avoidance within a display area (e.g., focus area, periphery or progressive shrink area)— such aspect of the invention mitigates objects from obscuring one another. An extension of this aspect relates to cluster occlusion avoidance which mitigates clusters from obscuring other clusters as well as mitigating merging (e.g., since clustering can be proximity based) of clusters as a result of moving clusters.

Thus, the subject invention mitigates many of the aforementioned windows and task management problems by keeping windows open but making them much smaller when they are not in use. By doing so, it becomes possible to maintain a large number of windows around the periphery of the display. Task management is supported by placing windows into clusters that represent tasks and adding some simple mechanisms for task switching. Human spatial memory can be used to facilitate locating a desired window or task. The invention also mitigates a display object management problem for small displays, because the objects in the periphery take so little space.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
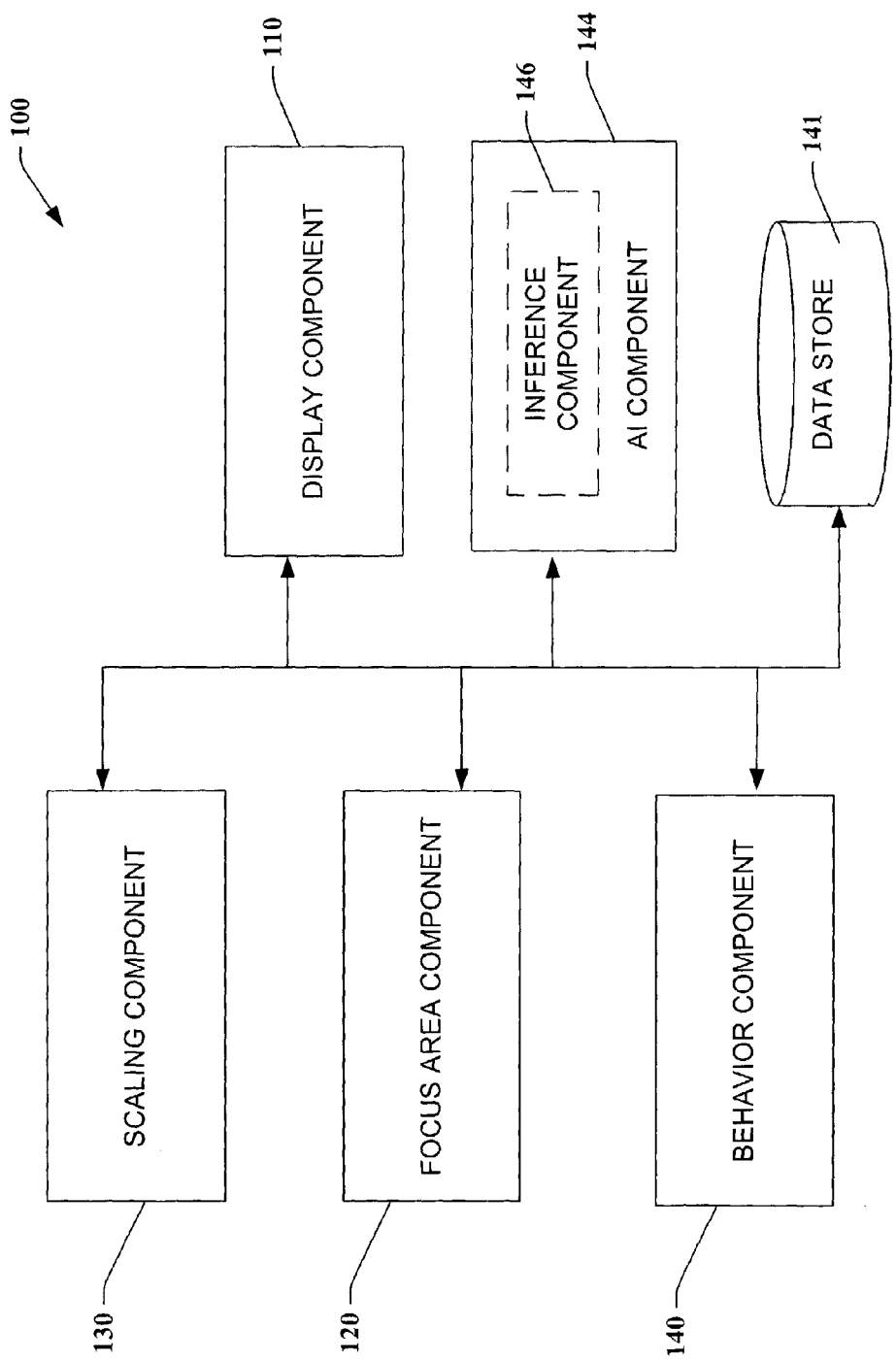
FIG. 1 illustrates a general block diagram of a display system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with scaling and/or modifying behavior of display objects. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2:
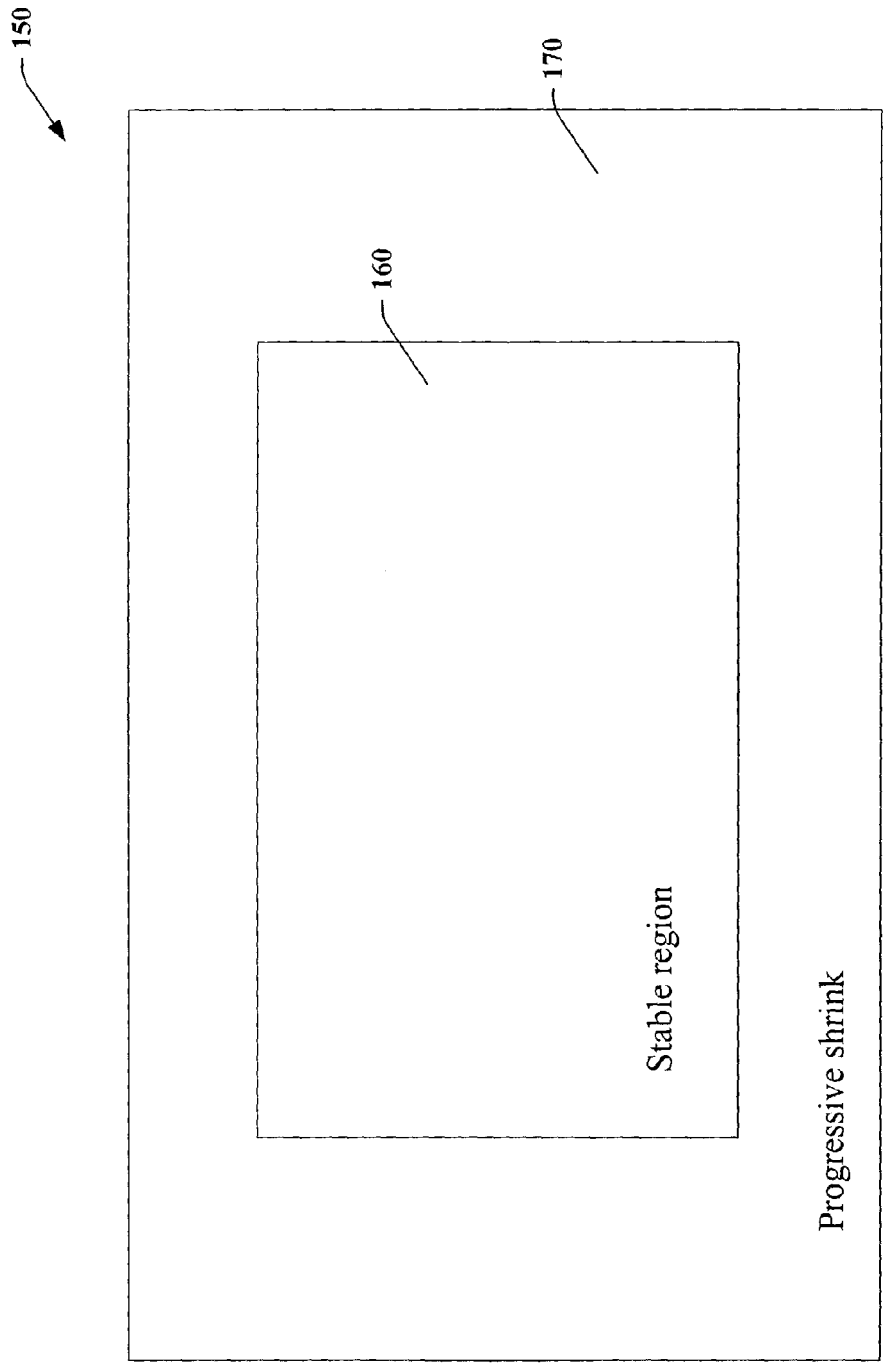
FIGS. 2-4 illustrate a display space having a stable region (e.g., focus area) and a progressive shrink region in accordance with the subject invention.
Figure 3:
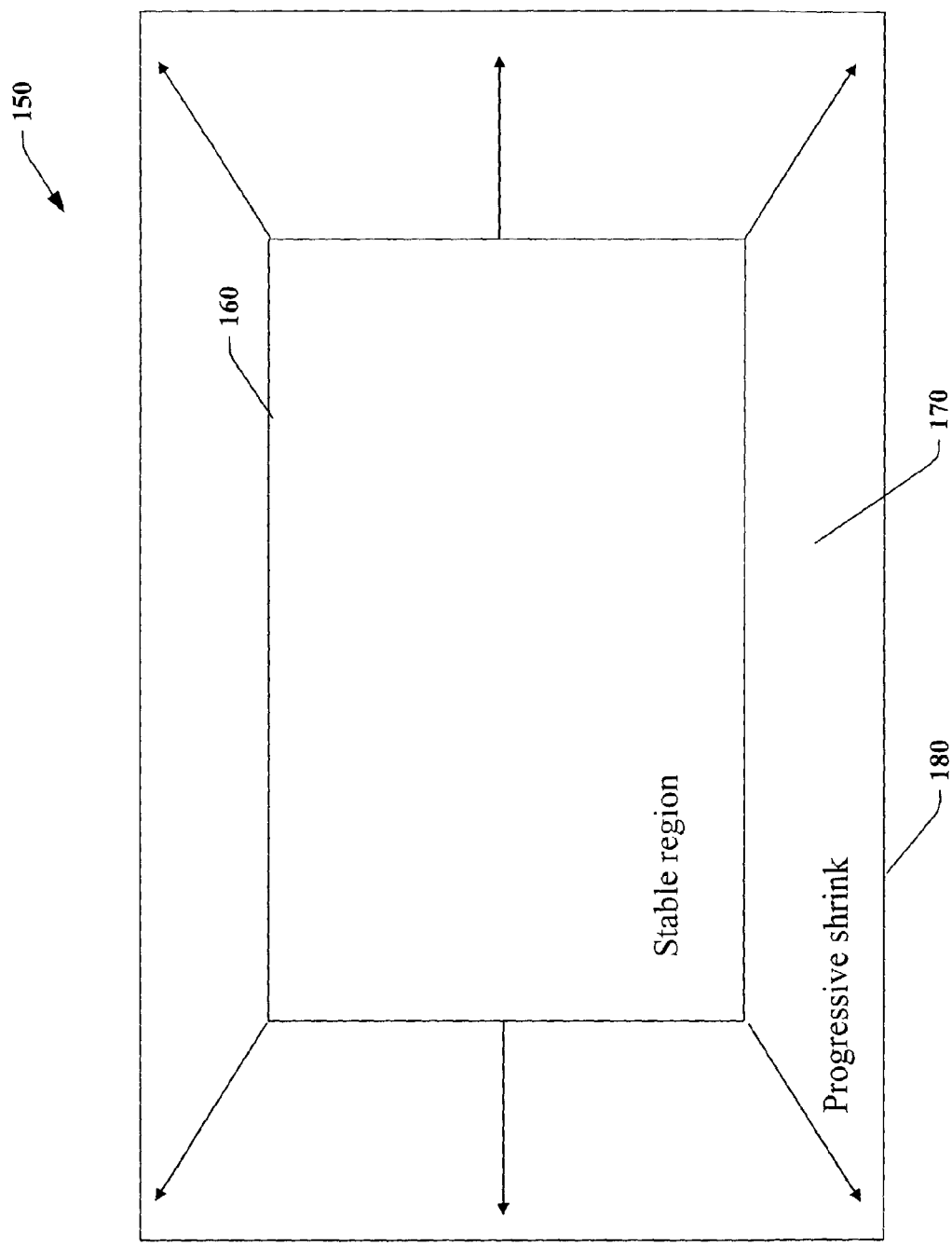

FIG. 1 illustrates a schematic representation of an aspect of a system 100 that facilitates controlling display object behavior in accordance with the subject invention. A display component 110 effects rendering of display objects on a display space (not shown). The display space is typically a screen in connection with a computing system or device (e.g., desktop computer, laptop computer, personal data assistant, wireless telephone, television, . . . ). The system 100 further comprises a focus area component 120, a scaling component 130 and a behavior component 140. It is to be appreciated that some or all of these components can be part of a single component and/or comprise a plurality of sub-components to effect various aspects of the subject invention. The focus area component 120 provides for defining a stable region or focus area (see e.g., reference number 160 at FIG. 2). The focus area component 120 can also define a progressive shrink area (see e.g., reference number 170 at FIG. 2) which is typically located about an outside periphery of the focus area.

The scaling component 130 provides for selectively scaling attributes of a display object as a function of location of the display object within the display space. For example, when display object(s) are within the focus area 160 the display objects are displayed and behave as usual. When display objects are moved outside of the focus area 160 into the progressive shrink region 170, the display objects can be reduced in size based on their location, getting smaller as they near an edge of the display surface so that many more objects can remain visible. It is to be appreciated the display object(s) can be moved outside of and into the focus area manually (e.g., via a user employing a mouse), and it is contemplated that display object(s) can be automatically moved outside of and into the focus area by the system 100. Automatic action (e.g., relocating of objects) can be taken as a function of the system 100 inferring a user's intentions with respect to manipulating display object(s). With respect to taking automatic action, machine learning techniques can be implemented to facilitate performing automatic action. Moreover, utility based analyses (e.g., factoring benefit of taking correct automatic action versus costs of taking incorrect action) can be incorporated into performing the automatic action.

The behavior component 140 can provide for modifying behavior of display objects in accordance with the subject invention. For example, display object(s) located within the focus area 160 can behave in a standard manner with full functionality. When display object(s) are located outside of the focus area 160, functionality associated with the display object(s) can be modified. For example, refresh rates of the display object(s) can be modified as a function of proximity to the focus area 160 and/or to an edge of the display space. In other words, objects in the periphery can also be modified to have different interaction behavior (e.g., lower refresh rate, static, . . . ) since they may be too small for standard techniques. In addition or alternatively, the objects can fade as they move toward an edge—fading increasing as a function of distance from the focus area and/or use of the object and/or priority of the object.

Beyond smooth manipulation of such aforementioned homogenous graphical properties with moves to the periphery, the subject invention can also facilitate richer notions of compression with the diminishing of size of objects, including compression with selective elision of unimportant components of an object and the selective sizing of multiple components, so as to maximize likelihood that the object would still be recognizable in its reduced formulation. For example, key headings and distinctive figures might reduced proportionally less than less distinctive objects with the decreasing size of objects. Moreover, the number of display object(s) within the display space as well as within the respective sections (e.g., focus area, and progressive shrink area) can be factored into modifying behavior of the display object(s). The behavior component 140 can apply any suitable number of and/or combination of metrics (e.g., processing overhead, display space, number of display objects, relative location of display objects, priority associated with respective display objects, time of day, user state . . . ) in connection with modifying display object behavior in accordance with the subject invention.

As noted above, the invention also can provide for object occlusion avoidance within a display area (e.g., focus area, periphery or progressive shrink area)—such aspect of the invention mitigates objects from obscuring one another. An extension of this aspect relates to cluster occlusion avoidance which mitigates clusters from obscuring other clusters as well as mitigating merging (e.g., since clustering can be proximity based) of clusters as a result of moving clusters. These features are discussed in greater detail infra.

The system 100 also includes a data store 141 that can be employed to store information (e.g., historical data, user profile data, display object data, system data, state information, algorithms, databases, display object current and/or previous state data, user current and/or previous state info. multiple user info., task-related data . . . ) in connection with the subject invention.

The system 100 can optionally include an artificial intelligence (AI) 144 that can facilitate automatically performing various aspects (e.g., modifying behavior of display object(s), scaling of display object(s), changing size and/or location of focus areas, changing size and/or location of progressive shrink areas, changing geometries of respective focus areas, changing geometries of respective progressive shrink areas, turning on and off functionalities associated with display objects, focus areas, progressive shrink areas, side bars . . . ) of the subject invention as described herein. The AI component can optionally include an inference component that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, . . . are contemplated and are intended to fall within the scope of the hereto appended claims.

Although for ease of understanding, only a single focus area, progressive shrink area and display area are shown, it is to be appreciated that multiples of any and all of these areas is contemplated and intended to fall within the scope of the hereto appended claims. For example, more than one focus area can exist with a display space, and locations of such focus areas can be defined as desired. Moreover, functionality of respective focus areas can differ respectively (e.g., so as to optimize multi-tasking). Likewise, multiple progressive shrink areas can be defined, and functionality (e.g., with respect to modifying display object behavior) can be varied as desired.

The subject invention will now be described with respect to many figures that are intended to emphasize various generalizable aspects of the subject invention—it is to be noted that these figures are not intended to be exhaustive of the novel features of the subject invention but rather are meant to be examples of a set of generalizations in accordance with the subject invention. One particular aspect of the invention relates to a notion of automated, patterned, canonical display object (e.g., window) motion given enlargement or opening of indicia at a center of focus. A concept behind such notion is the idea that the invention can serve as a "scalable fabric," to reconfigure one or more objects on a display surface, based on automatic or semi-automatic reconfiguration of the sizing and or position of multiple displayed objects, in reaction to the addition, deletion, and movement of objects (e.g., windows) by users or automated processes. Display surfaces that gracefully scale to hold increasing numbers of items, while still providing detail to users about important objects, can be supported by flexible policies for effecting shifts of multiple display objects so as to automatically move older, less active objects into a periphery—and to pop them back when those objects go away. Some of the following discussed figures capture a physical "pressure model" but it is to be appreciated that other suitable models can be employed and are intended to fall within the scope of the hereto appended claims.

Another concept is a notion of fundamental transitions or phases of transition that can be discontinuous, also to maintain, in a substantially continuous manner scaling properties associated therewith. In such case, a minimum density or resolution of an object can be established as a threshold and the object can be rendered into a different, potentially less visually accessible representation—and the object(s) can be re-rendered when other object(s) are closed. Thus, the subject invention can provide for several multilevel transitions, including continuous and potentially discontinuous transitions.

The subject invention provides for continuously adding more objects and a mechanism for automatically shifting and moving off and on objects, in a manner that keeps the respective objects on a screen usable (e.g., above a particular resolution). The invention also provides a means for implicitly returning to similar state(s) as newer objects are closed.

Figure 4:
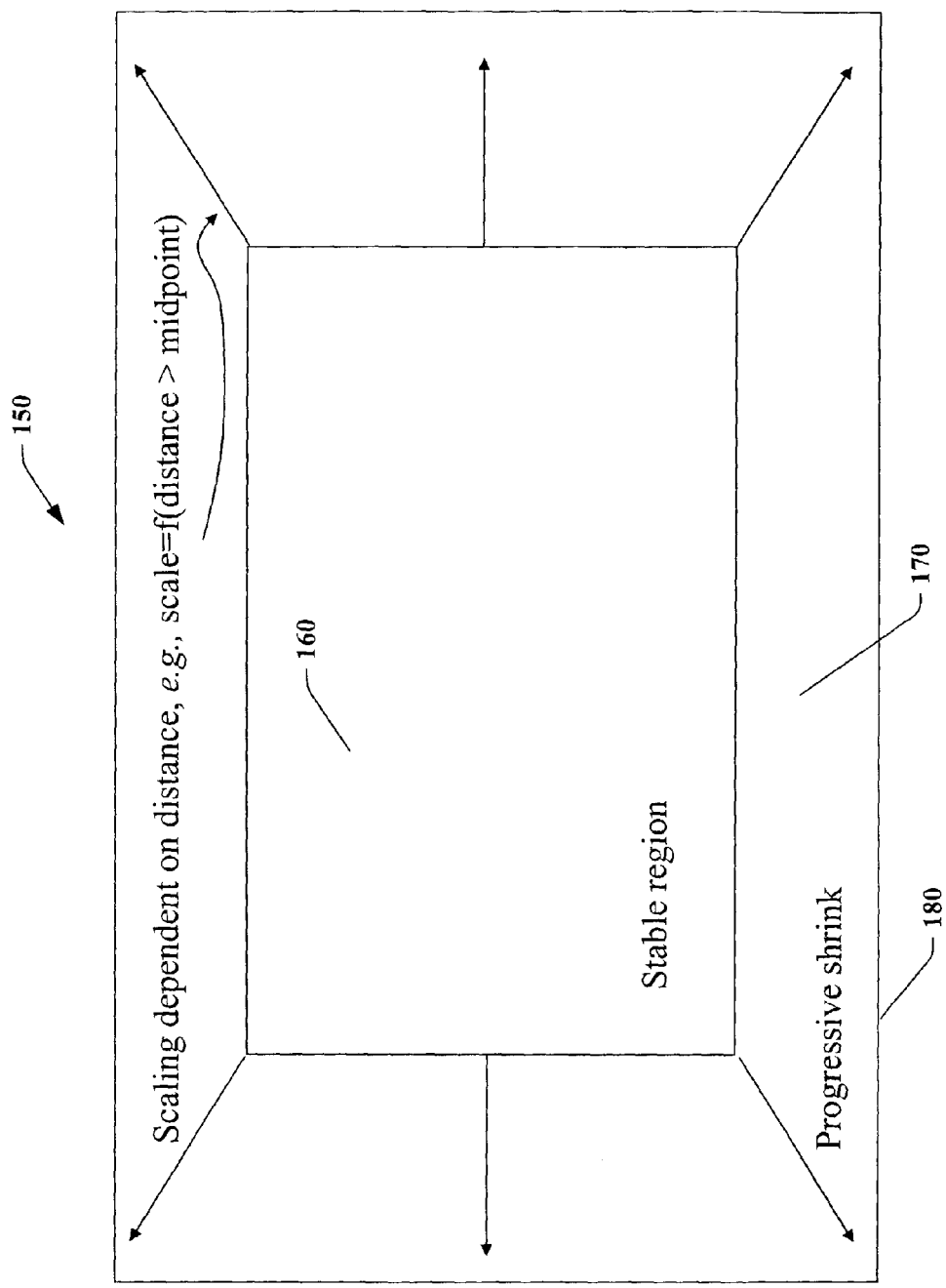
Figure 5:
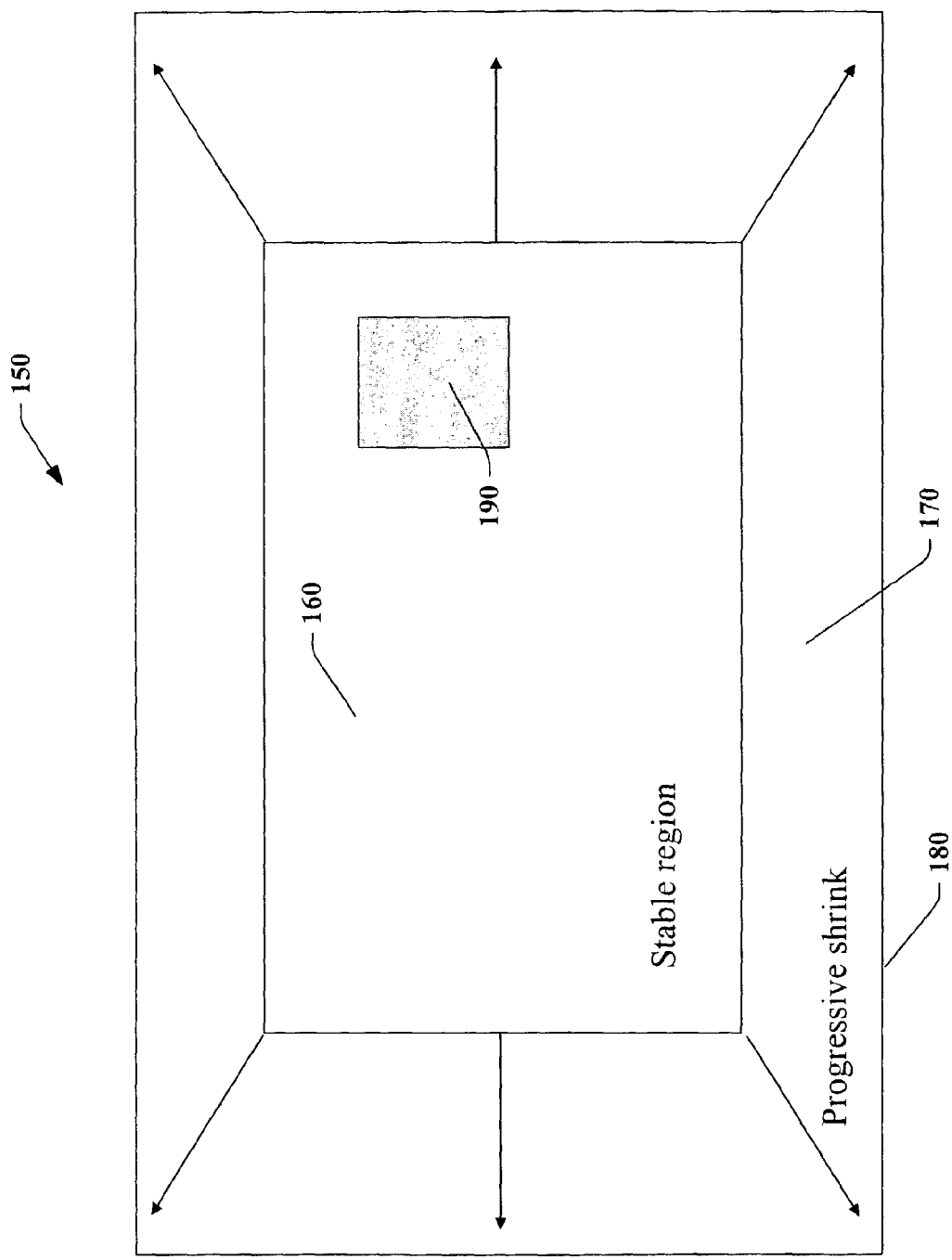
FIGS. 5-13 illustrate a display object changing behavior in accordance with the subject invention.
Figure 6:
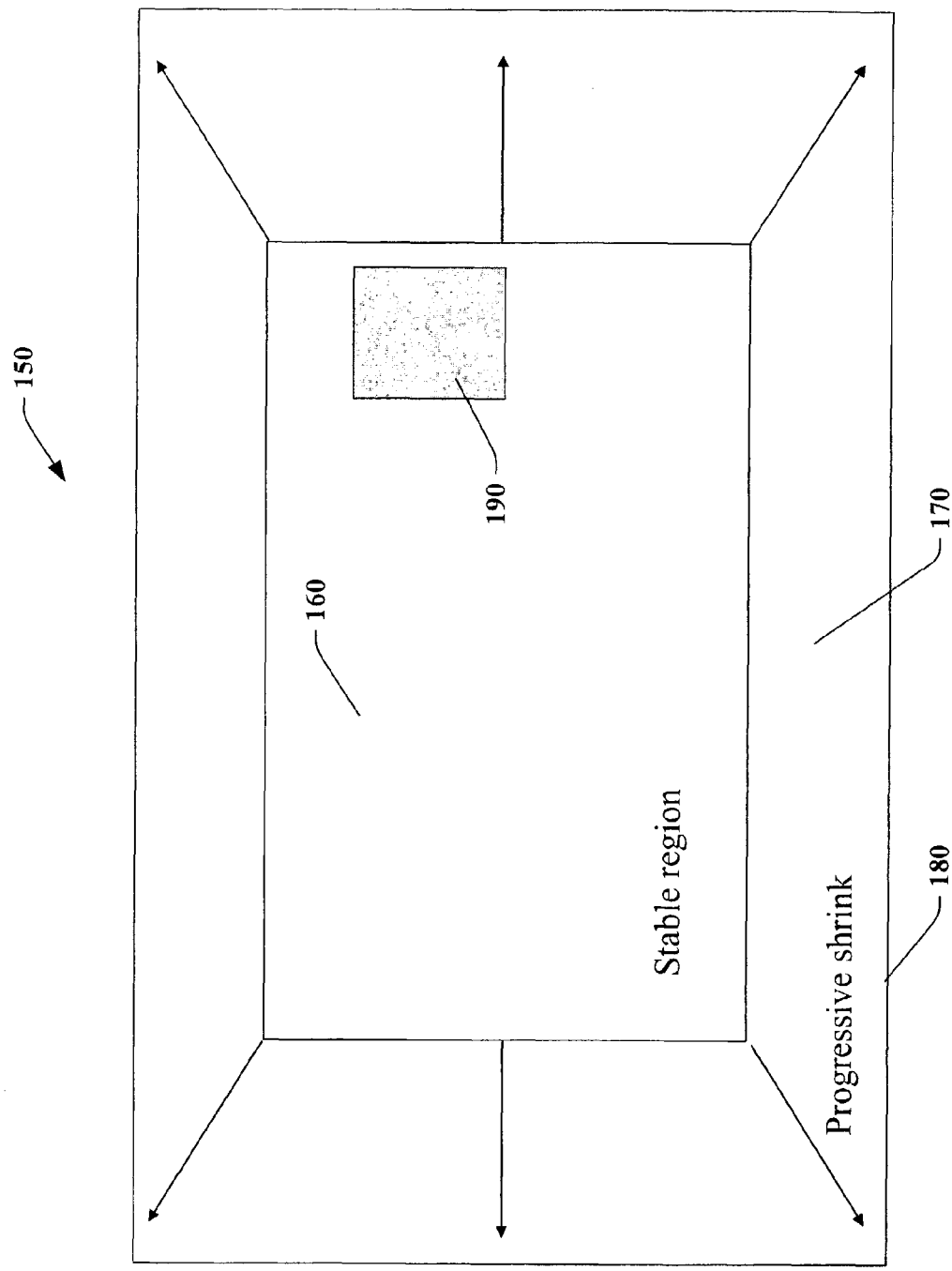

FIGS. 3-13 illustrate a stable region (focus region) 160 and a periphery region (e.g., progressive shrink region) 170 and a display object 190 changing behavior based on at least location within a display space 150 in accordance with the subject invention. It is to be appreciated that the periphery of the stable region 160 can be demarcated with an outline (e.g., dashed line) or made invisible based upon user preference. Moreover, if desired the stable region 160 can have a different background or wallpaper than that of the progressive shrink region 170 if desired. As shown in FIG. 4, scaling of display objects can be based on a function of distance from the focus area 160 and/or an edge 180 of the display area. Moreover, the scaling can be a function of a variety of predetermined and/or learned metrics as discussed in part supra. It is to be appreciated that initiation of scaling of display objects can be effected as a function of a variety of physical parameters with respect to display object(s) and relative location to the focus area 160 and/or edge 180. For example, scaling can be initiated as soon as any portion of a display object crosses a periphery of the focus area 160. Alternatively, scaling can be effected as a function of distance from a midpoint (or other reference point) of the focus area 160. Scaling could also be effected as a function of speed of movement of display object(s) and/or relative center if mass. Scaling could also be initiated as a function of size of display object(s) and display area constraints so as to facilitate optimization of valuable display space real estate.

Scaling can also be initiated when the cursor (being used for the object drag movement) crosses a periphery boundary as discussed in greater detail below. Moreover, it is to be appreciated that scaling and/or behavior modification in accordance with the subject invention can be based on liner and/or non-linear functions. For example, scaling can be based on a linear function relating to proximity to the focus area and/or an edge of the display space. To avoid appearance of abruptness, non-linear based techniques can be employed to effect more smooth transitioning from one state to another. Regarding display space corners, a variety of object and/or cluster scaling and behavior modification techniques can be employed. One specific example is to scale objects in corners as a function of minimum of scales as defined by respective horizontal and/or vertical positions of the objects relative to the corner. It is to be appreciated that any suitable technique for effecting smooth and natural scaling and/or modification to objects and clusters is contemplated and intended to fall within the scope of the hereto appended claims.

Figure 7:
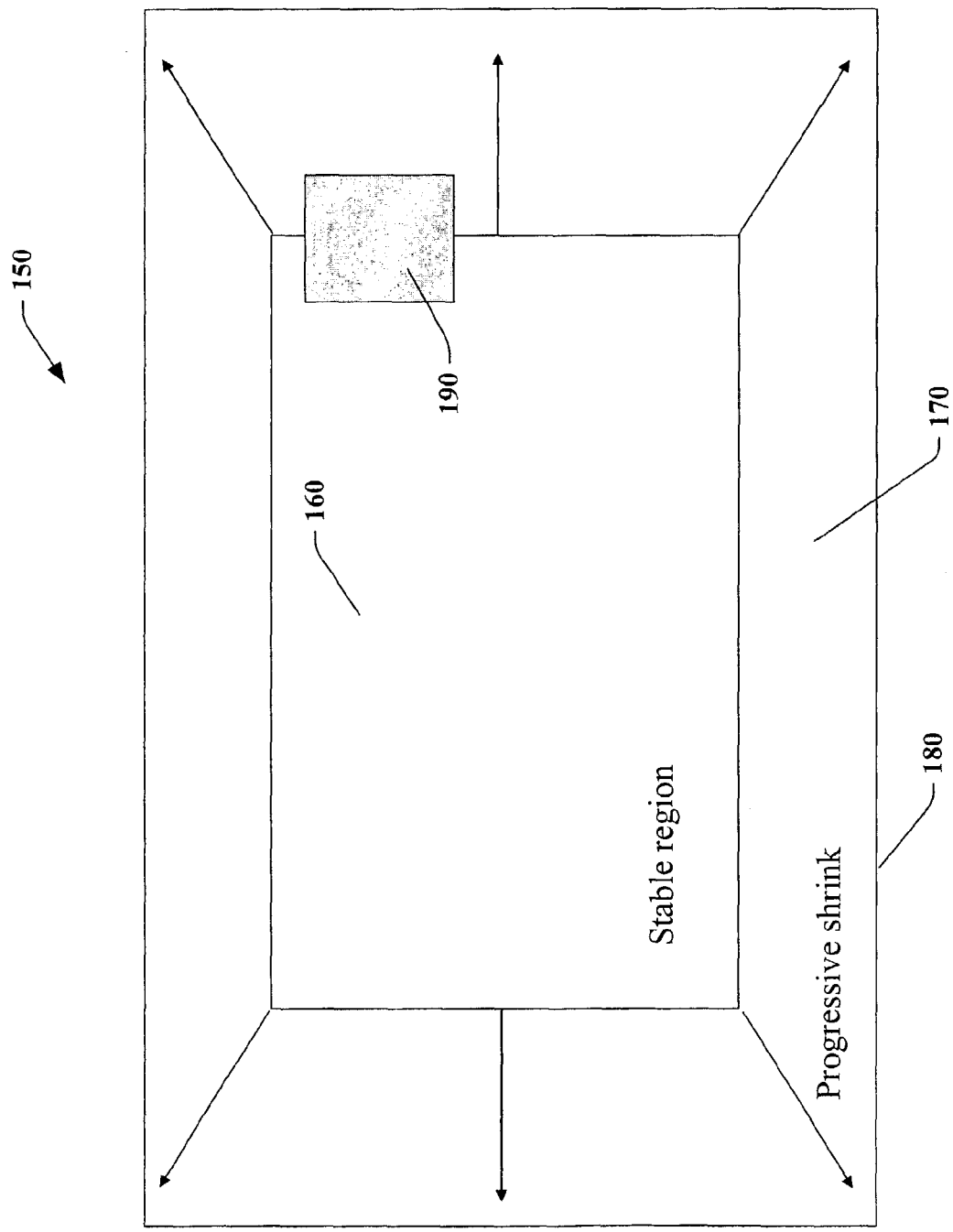
Figure 8:
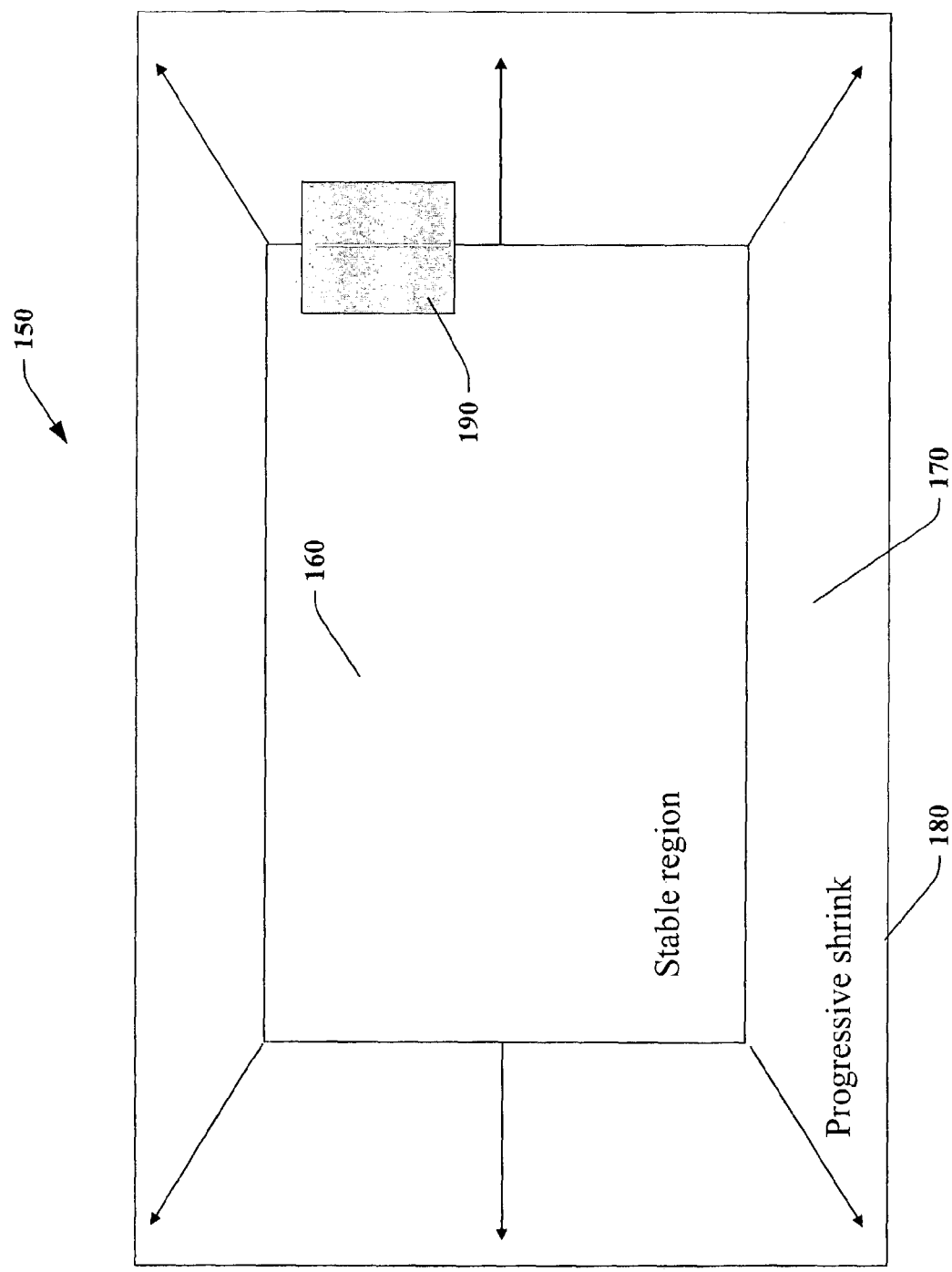
Figure 9:
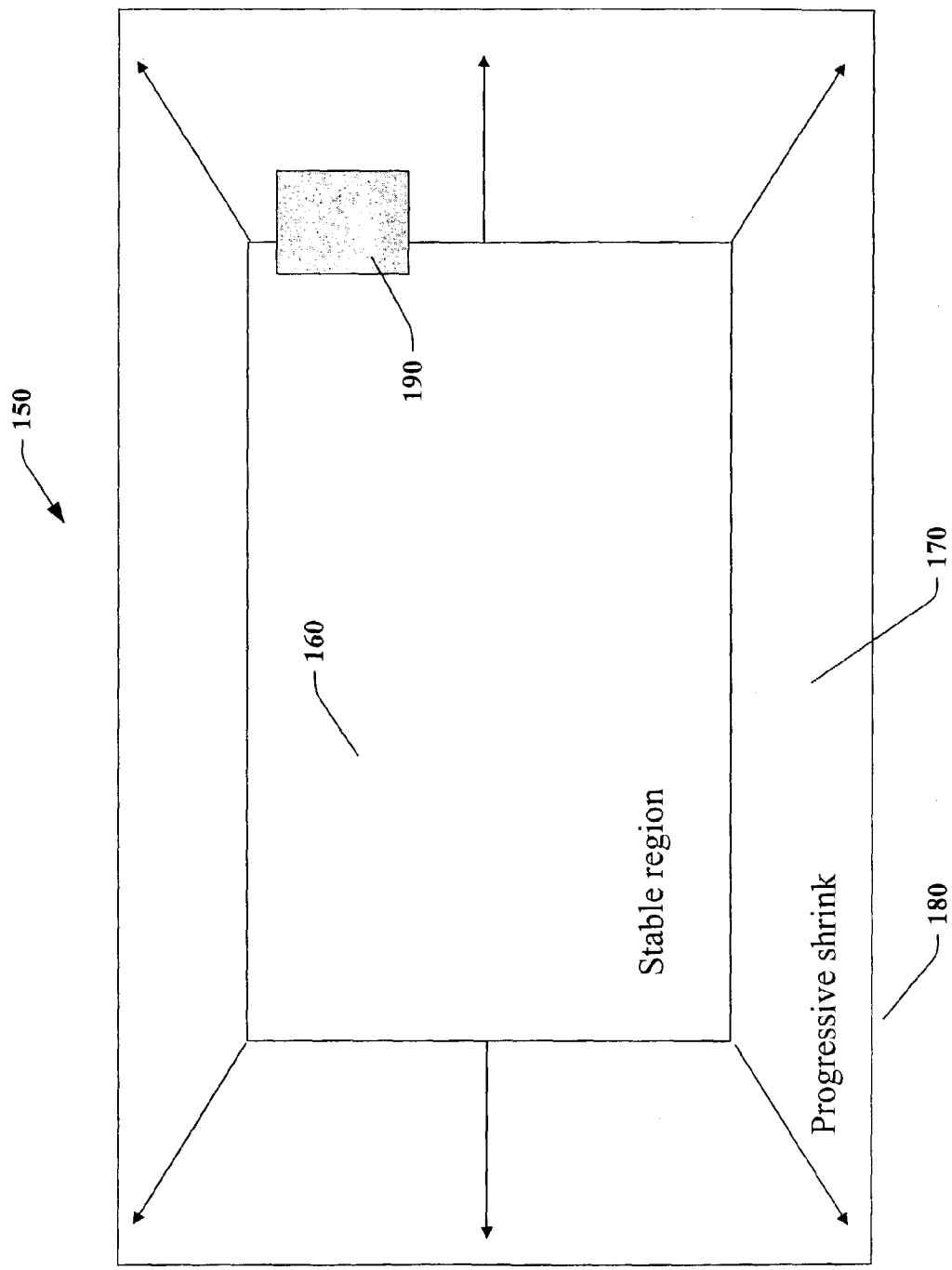
Figure 10:
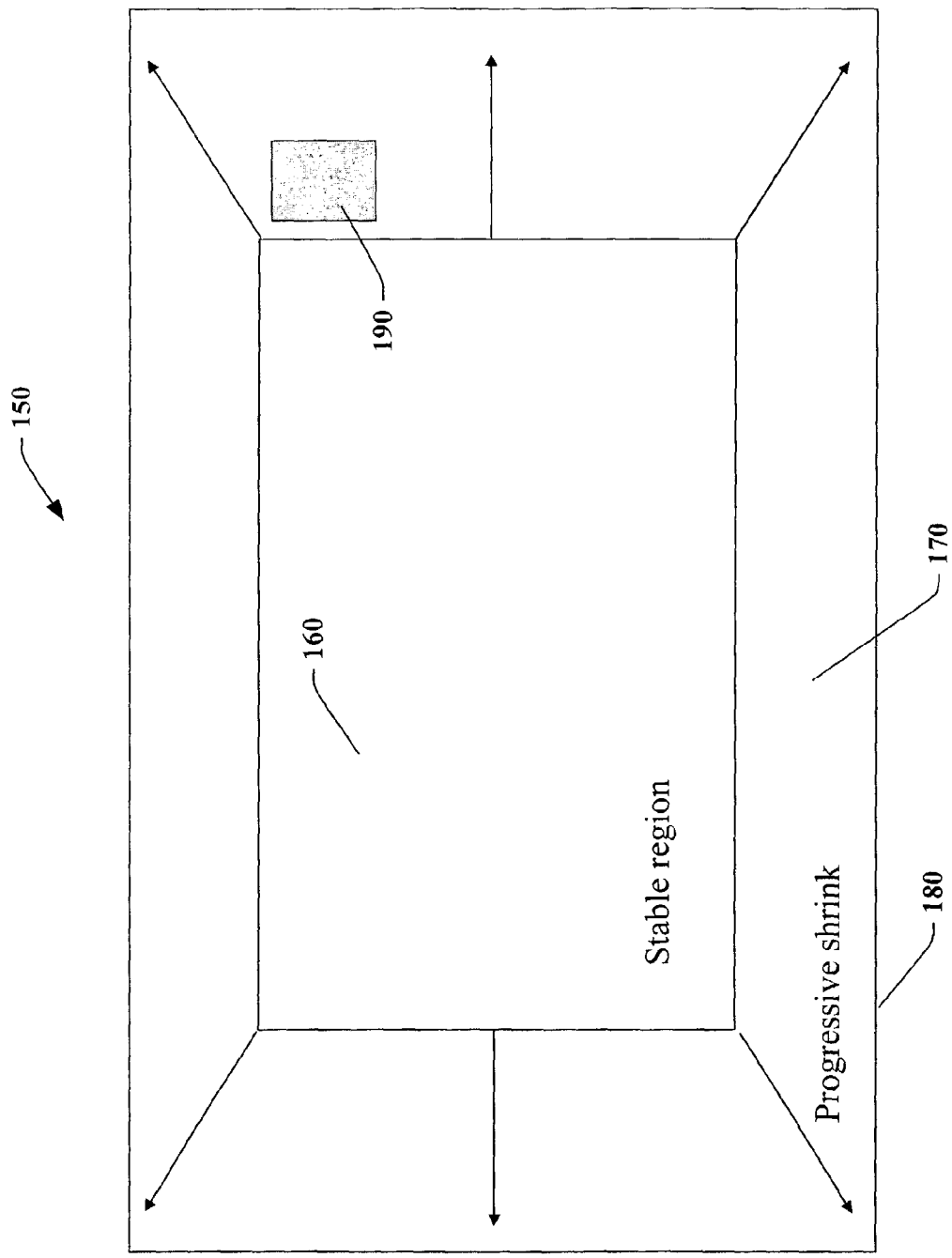
Figure 11:
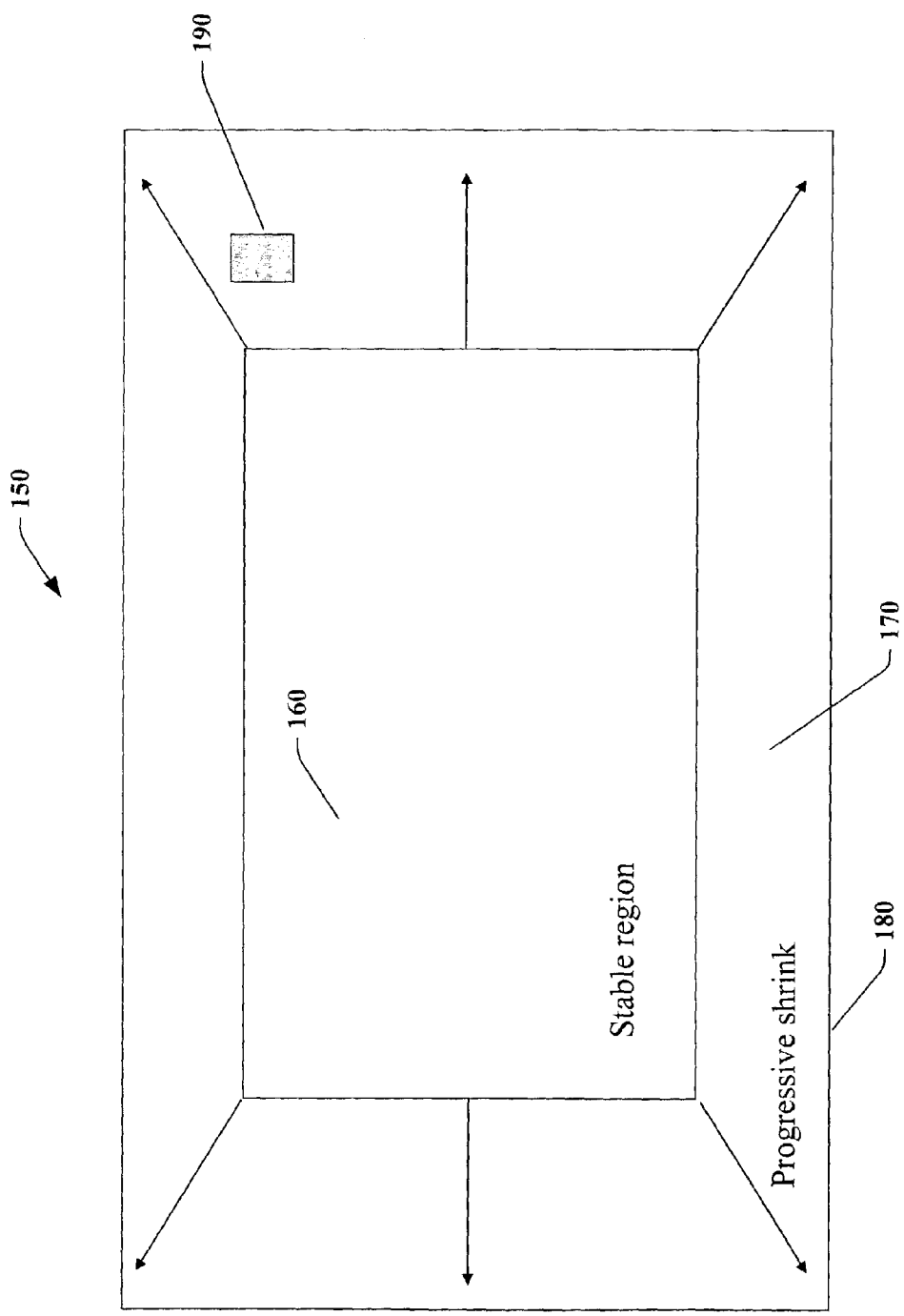
Figure 12:
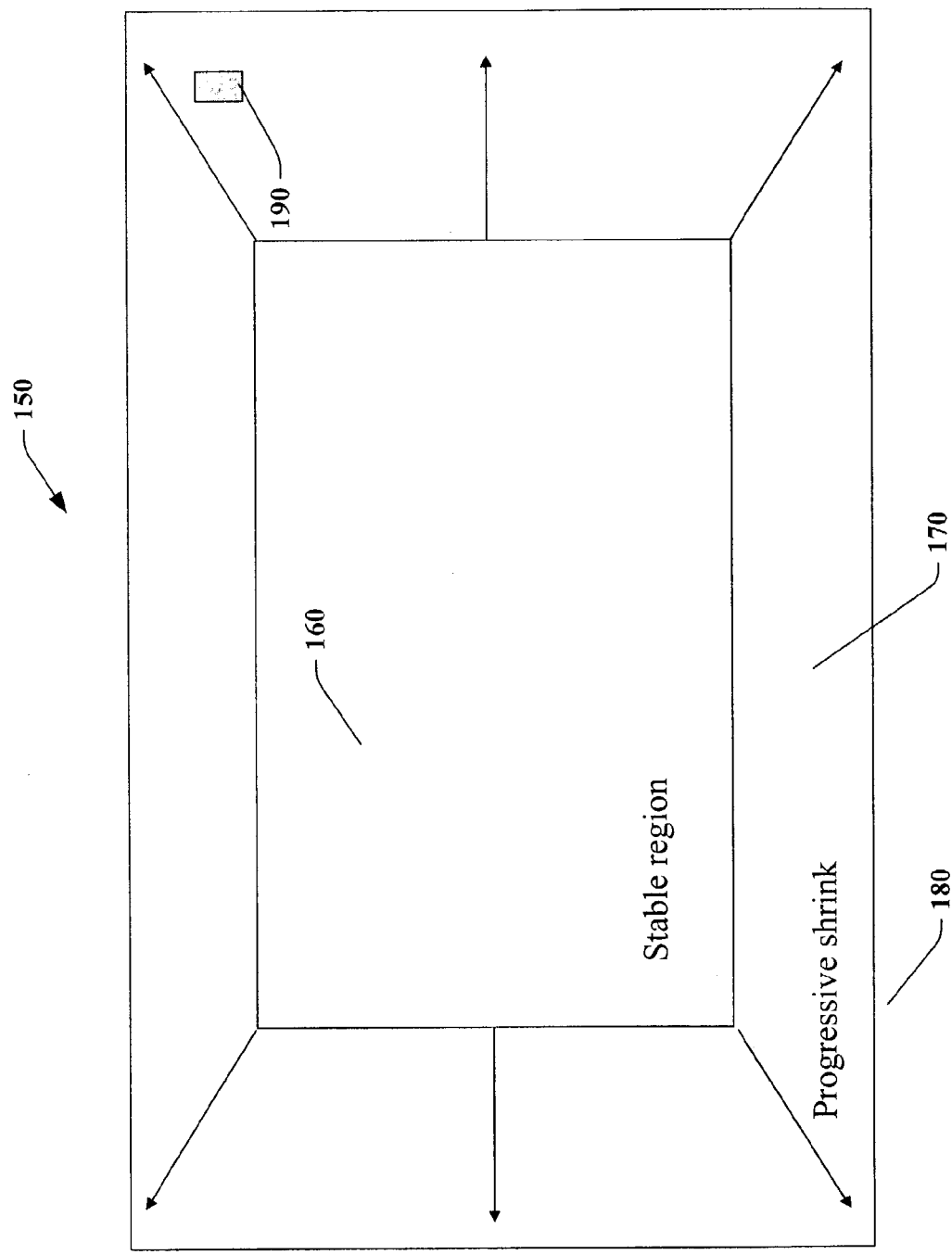
Figure 13:
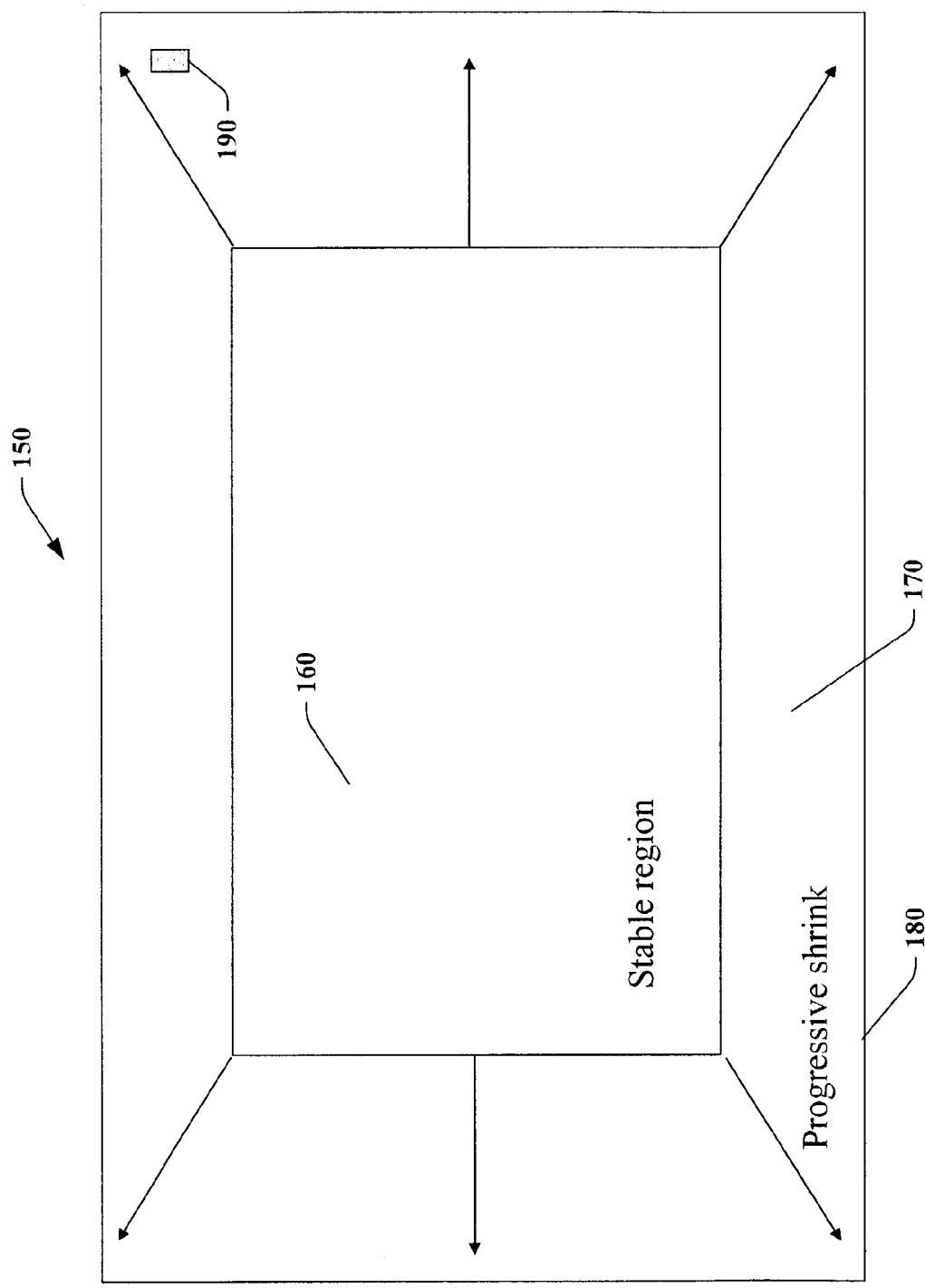
Figure 14:
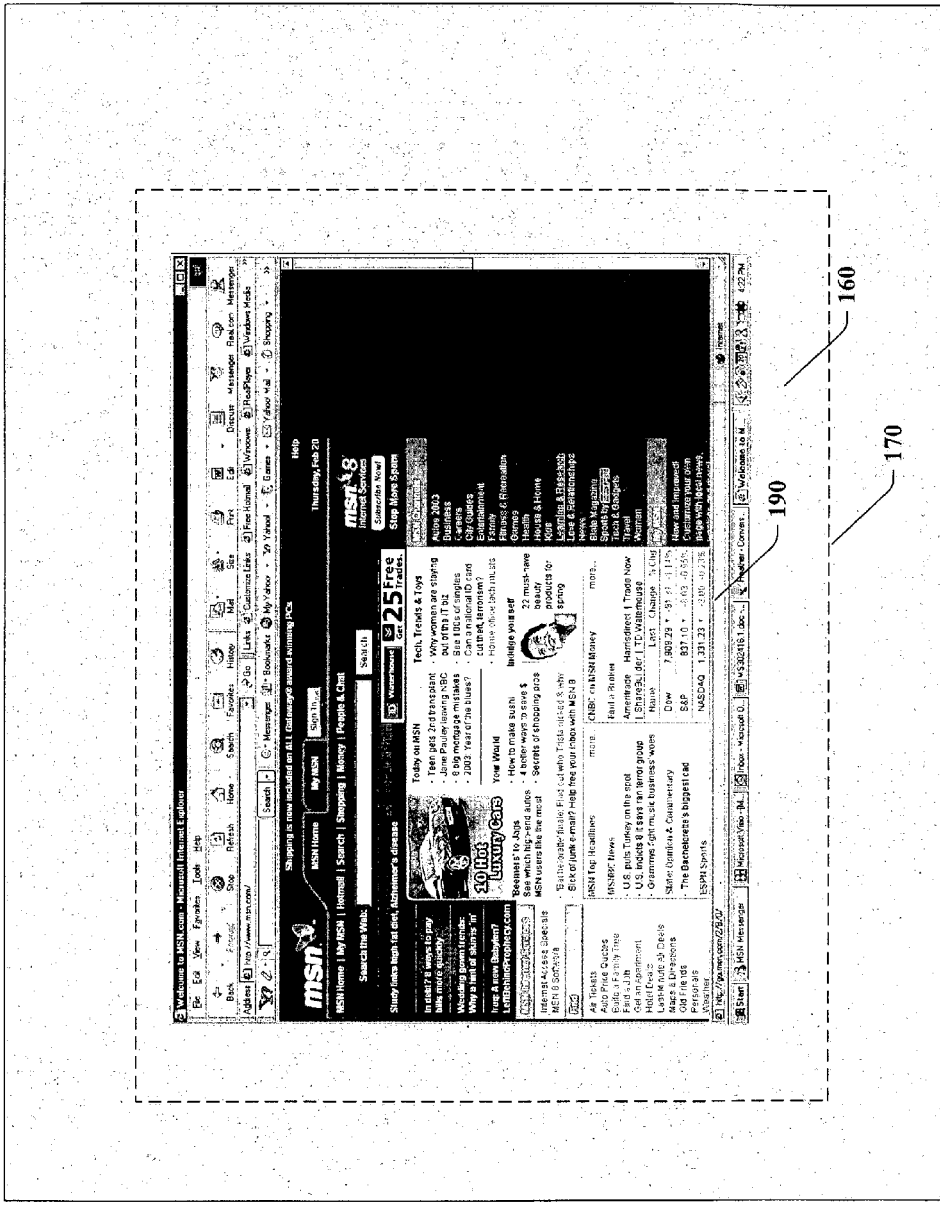
FIGS. 14-17 illustrate a web page window object changing behavior in accordance with the subject invention.
Figure 15:
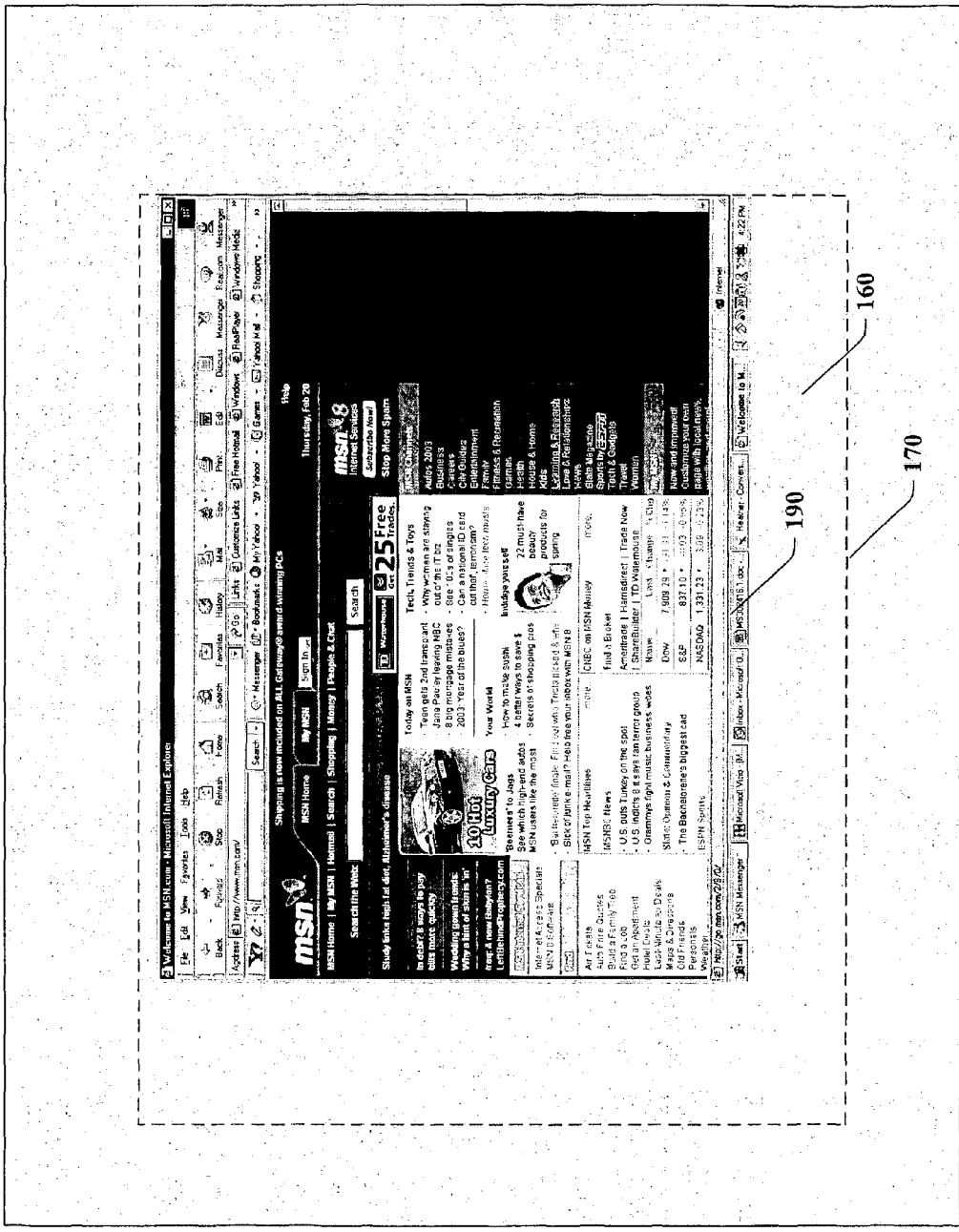
Figure 16:
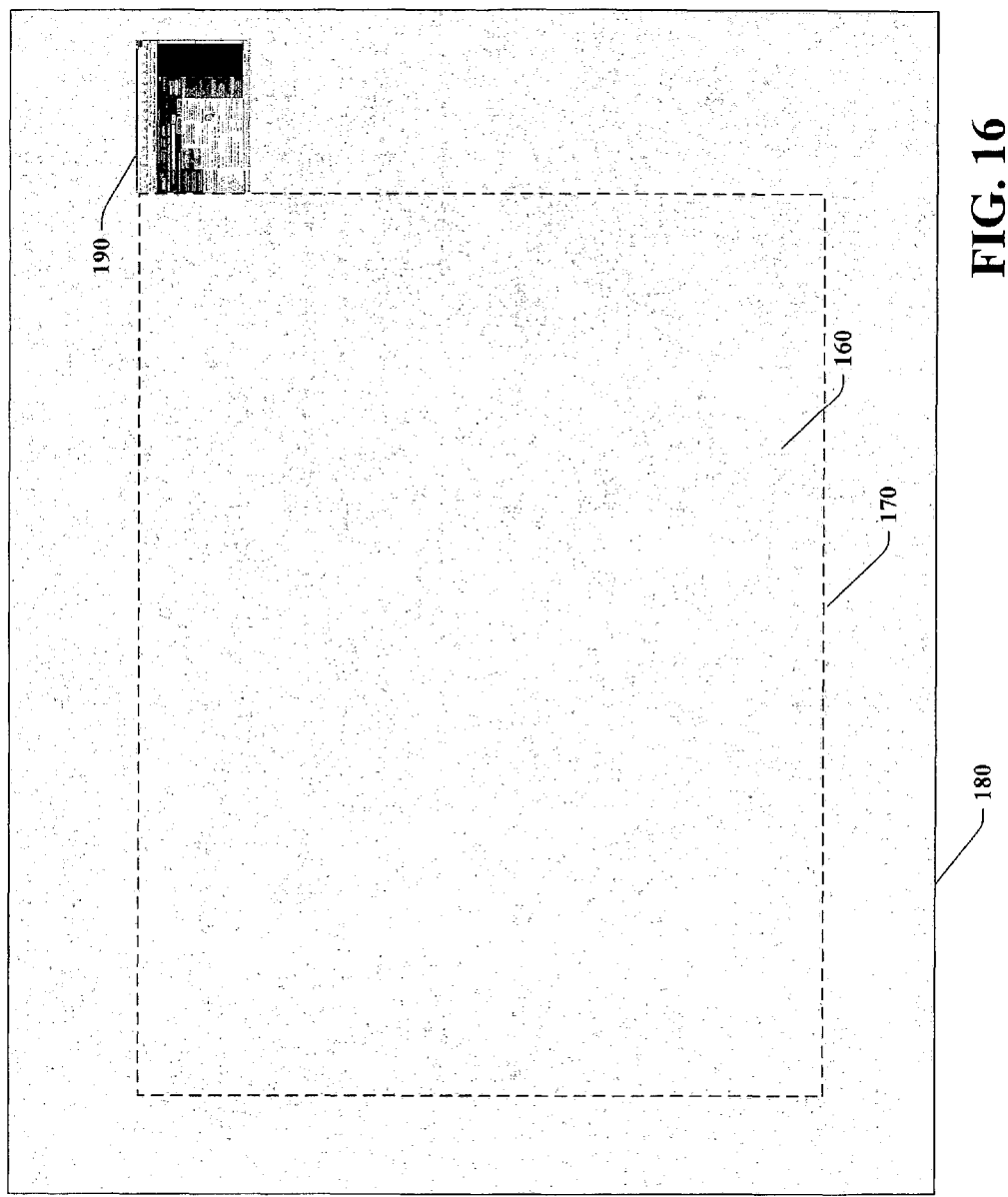
Figure 17:
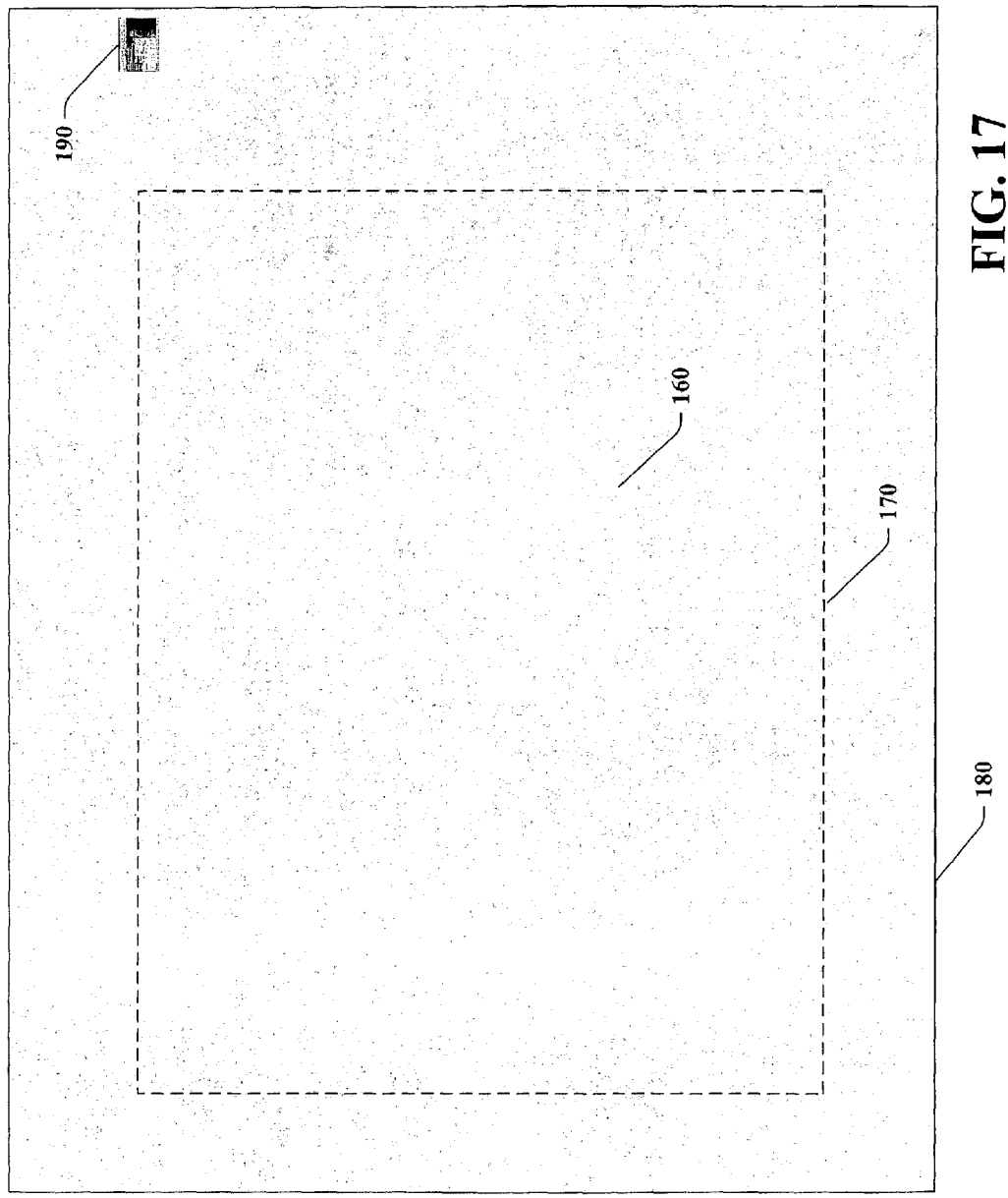

Turning to FIGS. 5-13, a display object is shown initially located in the focus area 160, where the display object 190 exhibits standard behavior with respect to desired size and functionality. As the figures progress, the display object 190 is shown being moved or migrating outside of the focus area 160 toward the progressive shrink space 170. As the object 190 crosses a periphery of the focus area 160, as shown in FIGS. 7 and 8, behavior of the display object is modified (e.g., window shrinks in size, lower refresh rate, displaying more relevant sub-objects over less relevant sub-objects, fading of the display object 190 . . . ) as shown in FIG. 9. More particularly with regards to appearance of an object outside of the focus area, the object can be a scaled snapshot of the object as last appeared in the focus area. Another aspect provides for a scaled object showing continuous changes thereto—it is to be appreciated that application redirection can be employed so that unmodified applications can have their associated display objects modified without need to be aware thereof. Another aspect provides for semantic zooming, which can be based for example, on authored tags (e.g., HTML or XML tags) that indicate what is most important, or an analysis of a resulting image that determines most salient features (e.g., author specified or deduced) would then be primarily displayed whereby non-essential (or too small to read) indicia is attenuated or not displayed.

It is to be appreciated that initiation of resizing and/or behavior modification can be implemented in a variety of manners. More particularly regarding transition points, when a display object crosses from a focus area to a periphery (e.g., progressive shrink area) or vice versa there is an instant when the object is deemed to have migrated from one area to the other. The choice of transition point should allow for predictable and invertable scaling/behavior modification. The various schemes for implementing such transition point include: (1) using the center of window—such technique is predictable and invertable, but may lead to problems if the periphery is small compared to the size of the display object (e.g., window); in other words, it may be possible to drag a window into parts of the periphery; (2) leading edge of display object entering periphery, and trailing edge leaving—this is quite predictable, but not very obvious to users. At present, one significantly effective scheme for initiating resizing and/or object behavior modification is based on (3) employing location of a cursor being used to drag an object. For example, as the cursor crosses a particular boundary (e.g., focus area periphery) resizing and/or behavior modification can be initiated. As the object 190 progresses toward the edge 180, behavior of the object 190 continues to change—for example, the size of the object continues to reduce. Other behavior can change as discussed supra, for instance, the object can become less active as it moves closer to the edge.

FIGS. 14-17 illustrate an example where the display object 190 is a web page window. As the window moves from the focus area 160 into the progressive shrink area 170, behavior of the window changes (e.g., it shrinks in size and becomes less active (for example, refresh frequency is lower, functionality reduced). It is to be appreciated that the window itself can change so that indicia that is difficult to discern within a small window size is not displayed and more prominent features of the window are displayed. Alternatively or in addition, more relevant objects (e.g., based on priority to a user) within the window can be displayed or made relatively larger and less relevant objects not displayed or made relatively smaller.

When an object is moved into a peripheral region (e.g., progressive shrink area), the object can be scaled as a function of location of a cursor during a movement operation, and that cursor location can be preserved. Once in the periphery, object occlusion avoidance behavior can be employed as discussed below. Moreover, objects can be clustered based on proximity to cluster markers, and cluster occlusion avoidance behavior can be employed. Cluster scaling can include both object scaling and appropriate changes to distance between objects and a cluster center point.

Object behavior can be modified to support task management. For example, when an object is placed in a periphery its former focus position can be preserved—likewise, a last periphery position can be preserved. When a user selects (e.g., clicks) an object in the periphery, it can be returned to its focus position. When a user selects an object in the focus area (or in the case of windows, minimizes the window), it is moved to its periphery position. When a user selects a cluster marker for a respective cluster situated in the periphery, all objects presently in the focus area return to their periphery positions and the objects in the cluster move to their focus positions. Selecting a cluster marker for an already focused cluster can return the cluster to its former periphery position. The above examples are merely exemplary as to various techniques to facilitate task switching, and are not intended to limit the subject invention to these noted functionalities but rather they are mentioned to provide context as to various functionalities that can be implemented in accordance with the subject invention.

It is to be appreciated that global controls can be programmed and/or configured to implement controls relative to background and/or environment of an image space in accordance with the subject invention. For example, global controls relative to the background can change tilt angle or appearance of the background. In addition, the global controls can enable adjustment of viewing options associated with the image space also, such as to switch between a two-dimensional or a three-dimensional representation thereof. The global controls can also include import controls—the import controls, for example, can be employed to import one or more clusters or graphical objects into the image space. Those skilled in the art will understand and appreciate various other types of peripheral devices or applications that can be used in conjunction with a graphical user interface system in accordance with an aspect of the present invention.

The scaling component can be utilized to implement scaling globally across the image space. For example, a reduction in scaling can be implemented to accommodate a greater number of clusters and graphical objects in a desired image space. Further, the scaling component can be used to enlarge clusters and graphical objects relative to the background or environment. In accordance with an aspect of the present invention, such scaling can operate on clusters and objects independently of the environment or surface on which such objects are visually displayed. Further it is to be appreciated that different amounts of scaling can be utilized for cluster indicators than for the objects associated with the respective indicators. In this way, information about a cluster can be maintained slightly larger to facilitate locating the various clusters in the image space.

The cluster controls can include a clustering algorithm that is applied to implement clustering of objects relative to cluster indicators in accordance with an aspect of the present invention. The clustering algorithm can be operative to determine an appropriate cluster to which an object is to be associated based on a relative location or proximity between the object and the respective cluster indicators. For example, such a determination can be made based on location information associated with the respective cluster indicators and a selected graphical object, such as when the object is moving or when supplied to the image space. The clustering algorithm can be programmed to automatically associate each object with an appropriate cluster based on the distance of determination. Alternatively or additionally, a threshold distance can be utilized, wherein a given object must be within the threshold distance of a respective cluster indicator in order to be associated with that respective cluster.

The clustering algorithm further can be operative to automatically arrange graphical objects in a respective cluster so as to maximize utilization of the image space. Further, in a three-dimensional space, the clustering algorithm can arrange graphical objects in a respective cluster so as to partially occlude other objects, but still provide sufficient visual information to distinguish the graphical objects from each other.

A cluster movement/avoidance scheme can be employed to control movement of a selected cluster in the image space and interactions between clusters in accordance with an aspect of the present invention. For example, it may be desirable for a selected cluster that is being moved to push other clusters when within a predetermined distance of the other cluster. The predetermined distance can be a two-dimensional distance on the screen or a simulated three-dimensional distance according to the simulated three-dimensional image space. Such an avoidance technique can help mitigate occlusion of the objects in the respective clusters as a given cluster (or group of clusters) is being moved in the image space. In addition, after a cluster has been pushed or moved from its original location, such as in response to being bumped or pushed by a selected cluster, the cluster may rebound back to its original pre-push position after the selected cluster has been moved sufficiently away from the pre-push position. The rebounding can be performed so that the cluster returns back to its original position or it can rebound to an alternative location in the image space based on the available locations and the relative size of the particular cluster. Those skilled in the art will understand and appreciate various modes of animation that can be utilized to provide a pleasing transition during the rebound condition.

The cluster controls further can include a cluster context scheme, which provides a menu of available operations that can be performed relative to a selected cluster or group of clusters. The cluster context scheme, for example, can display a pop-up menu of available options, which can include other associated pop-up or drop down menus. Some possible menu options include sending the selected cluster (including all associated objects, e.g., image data, textual data, audio data, video data, associated applications) to a desired destination. The destination can include hardware and/or software, which may reside on be coupled to the computer or other device running the GUI. Alternatively, the destination can be a remote destination, such as an email recipient, a Web page, or other device. The options also can include performing editing of cluster annotations as well as viewing images as part of show, which can include annotations. Based on the description herein, those skilled in the art will understand and appreciate other possible operations that can be performed on a cluster in accordance with an aspect of the present invention.

The behavior modification component can provide for object movement/avoidance that is operative to control movement of an object relative to the image space, such as for example based on user input information. The object movement control further can implement occlusion avoidance during movement of the selected object. For example, a selected graphical object can be maintained in a foreground and display the selected (or active) object in a highlighted condition to visually distinguish it from other objects as it is moved in the image space.

The behavior component and the scaling component can cooperate to implement desired 2D and 3D mapping and scaling of the respective objects. Such mapping and scaling can be implemented based on location of the object and implemented global scaling. The mapping and scaling also can vary depending on whether the image space corresponds to a two-dimensional or three-dimensional representation.

The behavior modification component further can provide an object context control function that is operative to implement various menu options relative to a selected object. The object context can be activated based on user inputs for example. The behavior control can enable a user to annotate a selected object, view details of the object, or send the object to an application or to one or more external devices. Additionally, general editing can be performed relative to the object via an object menu, such as duplicating, cutting, copying, pasting or deleting a selected object. A selected object also can be sent to a desired destination, such as described with respect to the cluster context. Those skilled in the art will understand and appreciate various other operations that can be performed via similar types of menus relative to a graphical object, all of which are contemplated as falling within the scope of the present invention.

Figure 18:
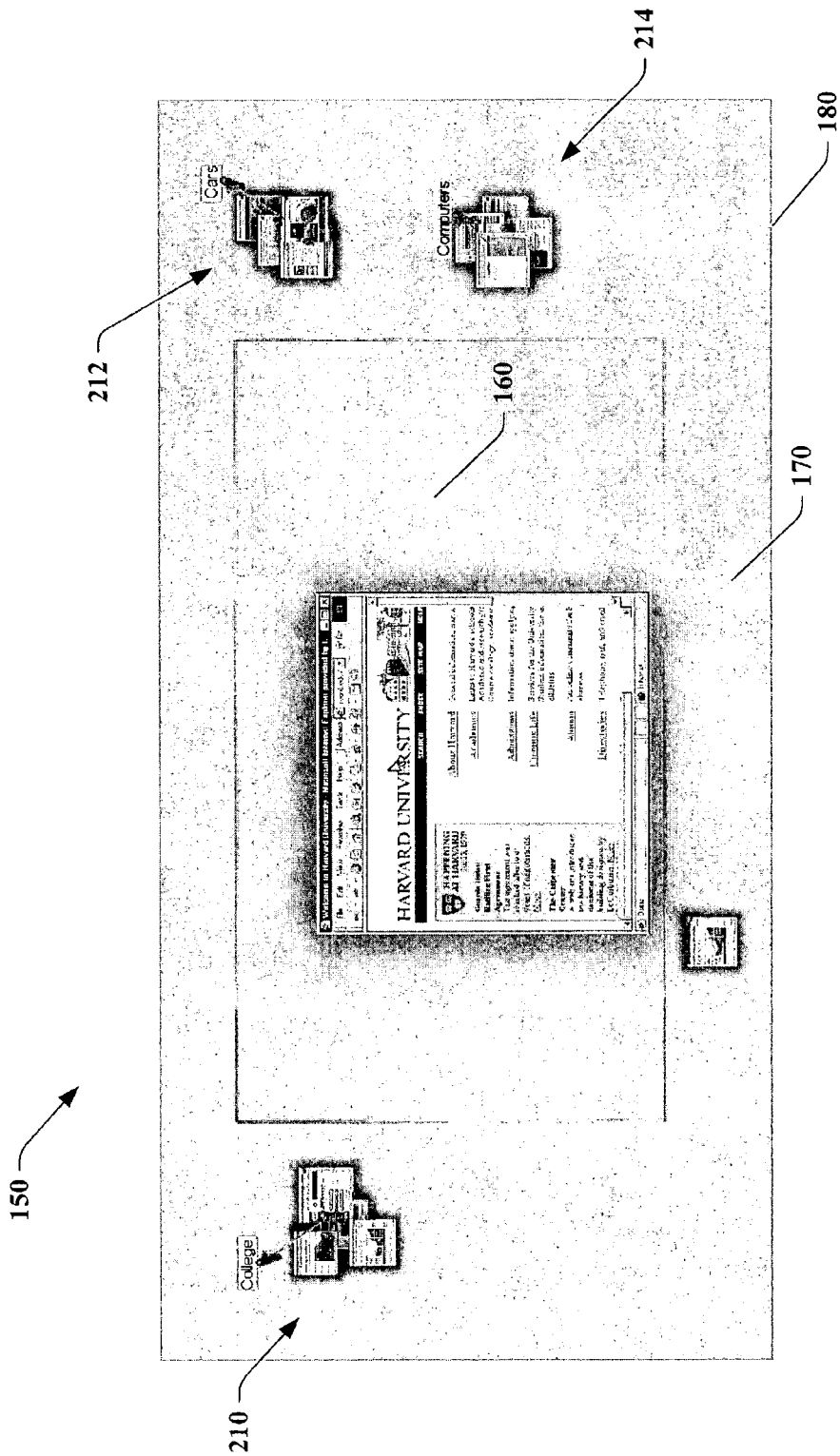
FIG. 18 illustrates a plurality of display objects and behavior thereof in accordance with the subject invention.

FIG. 18 illustrates a plurality of display objects situated with the display space 150. As shown, a display object located within the focus area 160 is shown with standard behavior. Other display objects are shown outside of the focus area with respective behavior modified accordingly. Another aspect of the invention provides for clustering or grouping display objects and effecting behavior modification to a particular cluster or group en masse. Thus, the display object cluster 210 (related to college) is shown with behavior modified as a group—if the cluster 210 is moved within the focus area 160, all display objects that are part of the cluster will concurrently exhibit behavior consistent with standard respective behavior within the focus area 160. Such aspect of the invention significantly facilitates multi-tasking operations within a computing environment. As any of the clusters 210, 212 or 214 move toward the edge 180, the behavior of the clusters will modify accordingly (e.g., size of windows changes, activity of windows changes . . . ). Typically, when a cluster is scaled, the individual objects that are part of the cluster are scaled as well. However, in such case, if the objects are scaled and their relative positions remain unchanged, they can appear to move away from the center of the cluster—to address this issue, the objects can be moved closer to the center of the cluster as the cluster scale is reduced.

It is to be appreciated that within cluster(s), the behavior of respective display objects can change uniformly and/or uniquely. For example, within a particular cluster one display object can have a higher priority than other display objects within the cluster and thus activity of the one display object can be maintained at a higher level than that of the other display objects. It is to be appreciated that any suitable hierarchical classification of respective behavior modifications to display objects with a cluster or group can be employed in accordance with the subject invention.

Figure 19:
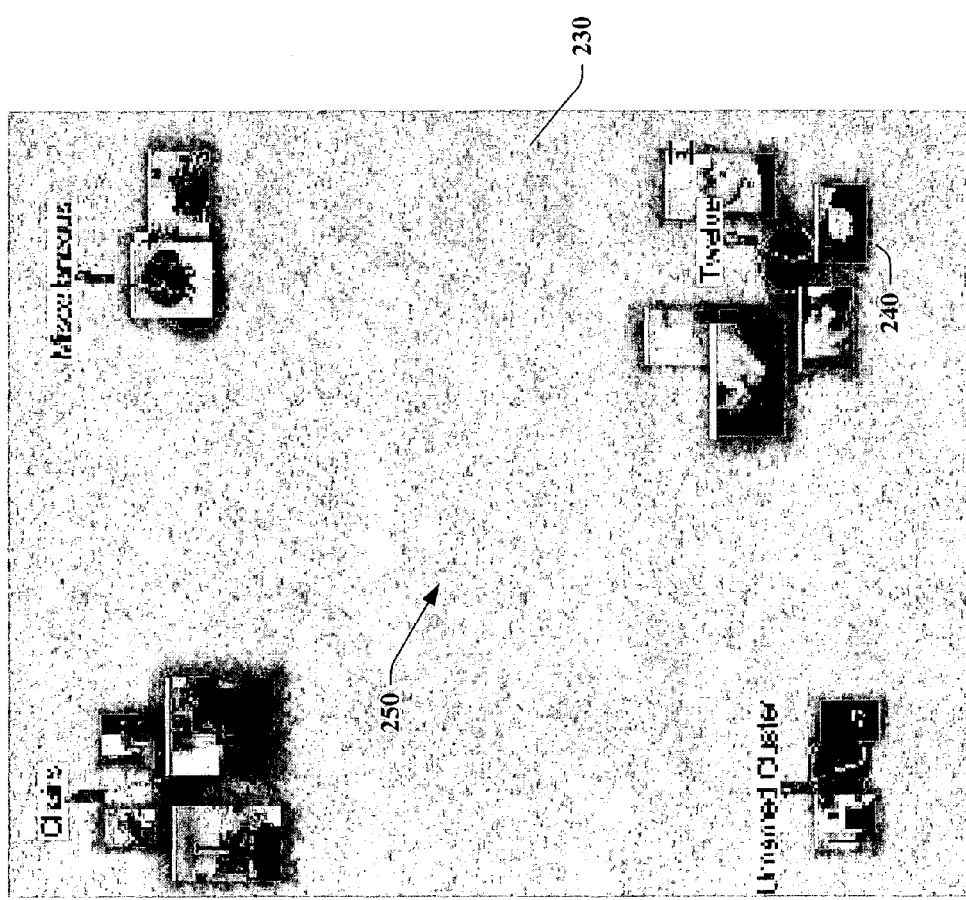
FIGS. 19-20 illustrate a plurality of display objects and behavior thereof in connection with a small device (e.g., PDA) display in accordance with the subject invention.
Figure 20:
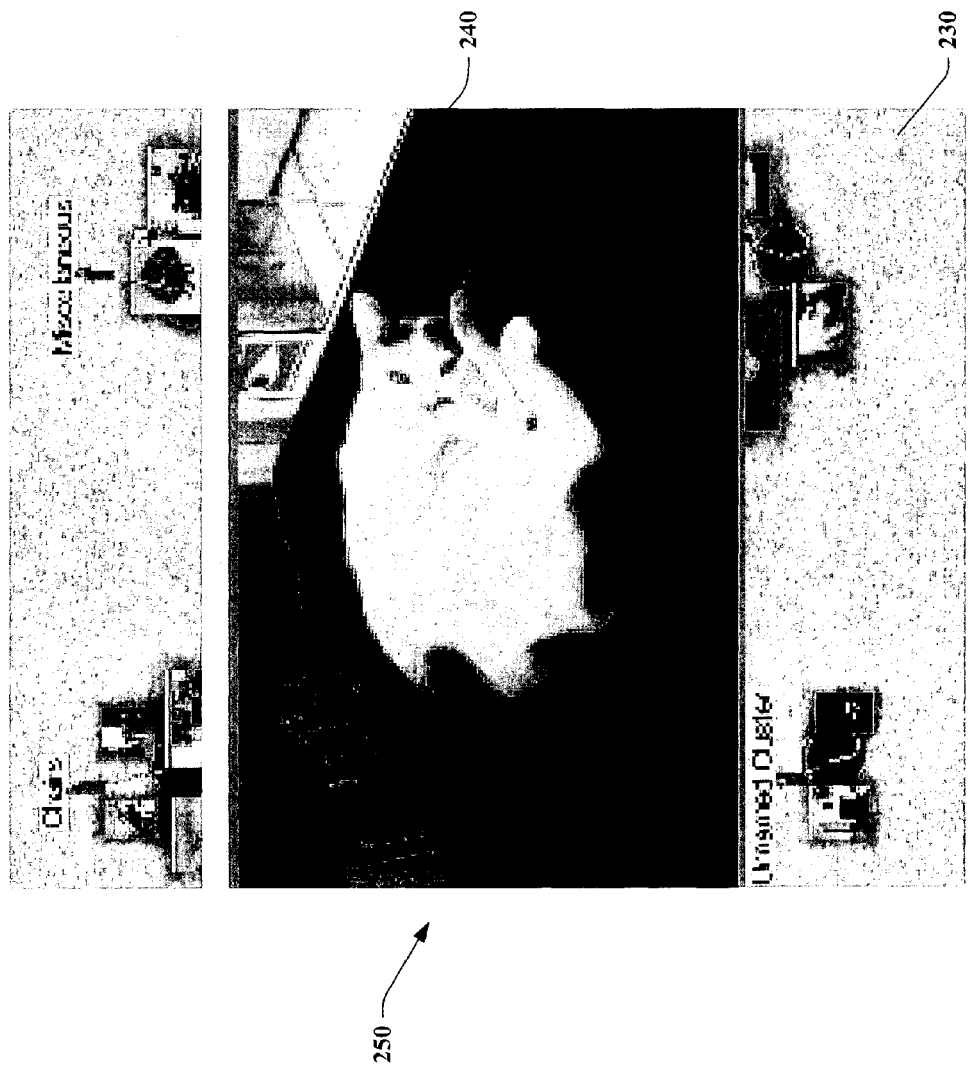

FIGS. 19-20 illustrate an aspect of the invention as applied to a small display space area 230 (e.g., associated with a portable computing device, personal data assistant or wireless telephone). In FIG. 19, various display objects are shown located outside of a focus area 250. FIG. 20 illustrates display object 240 after being moved into the focus area.

As discussed supra regarding occlusion avoidance, when a display object is moved in the periphery, it is desirable to mitigate the possibility that one object could completely obscure another. Accordingly, various schemes such as those described in U.S. patent application Ser. No. 09/152,712 filed on Sep. 14, 1998 (Now U.S. Pat. No. 6,414,677) entitled METHODS, APPARATUS AND DATA STRUCTURES FOR PROVIDING A USER INTERFACE WHICH EXPLOITS SPATIAL MEMORY IN THREE-DIMENSIONS, TO OBJECTS AND WHICH VISUALLY GROUPS PROXIMALLY LOCATED OBJECTS; and U.S. patent application Ser. No. 10/092,458, filed on Mar. 7, 2002 and entitled GRAPHICAL USER INTERFACE, DATA STRUCTURE AND ASSOCIATED METHOD FOR CLUSTER-BASED DOCUMENT MANAGEMENT, can be employed—the entireties of these two applications are incorporated herein by reference. Accordingly, objects move out of the way when an object is moved past them, and return to their original position when the moved object has passed. This is predictable behavior, since the user can stop at any point and no further movement occurs. It is appreciated that as objects move out of the way, their respective scale can be updated based at least in part upon new location.

Figure 21:
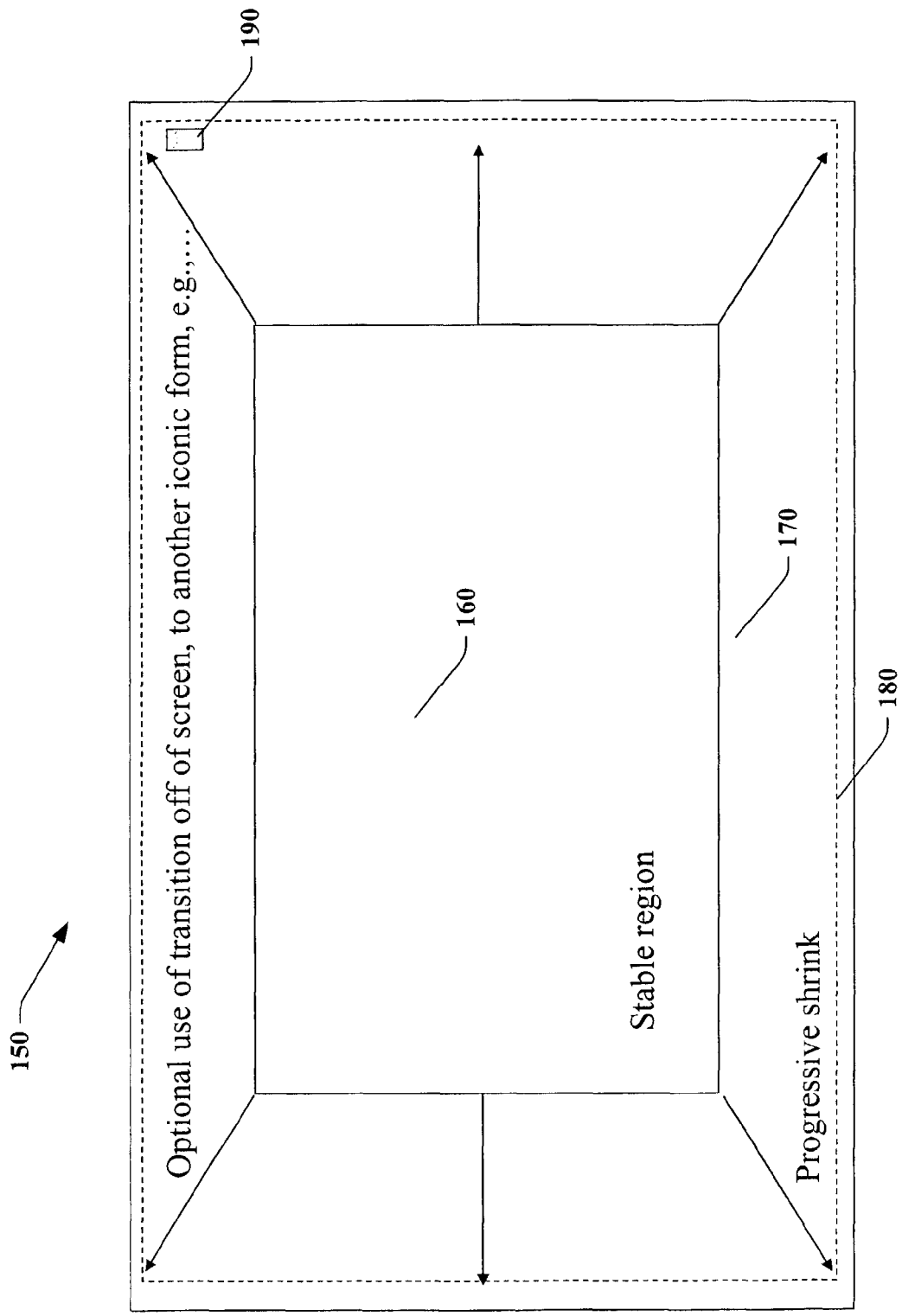
FIGS. 21-39 illustrate an optional aspect of transition of display objects off of screen (e.g., to side bar) to another iconic form in accordance with the subject invention.
Figure 22:
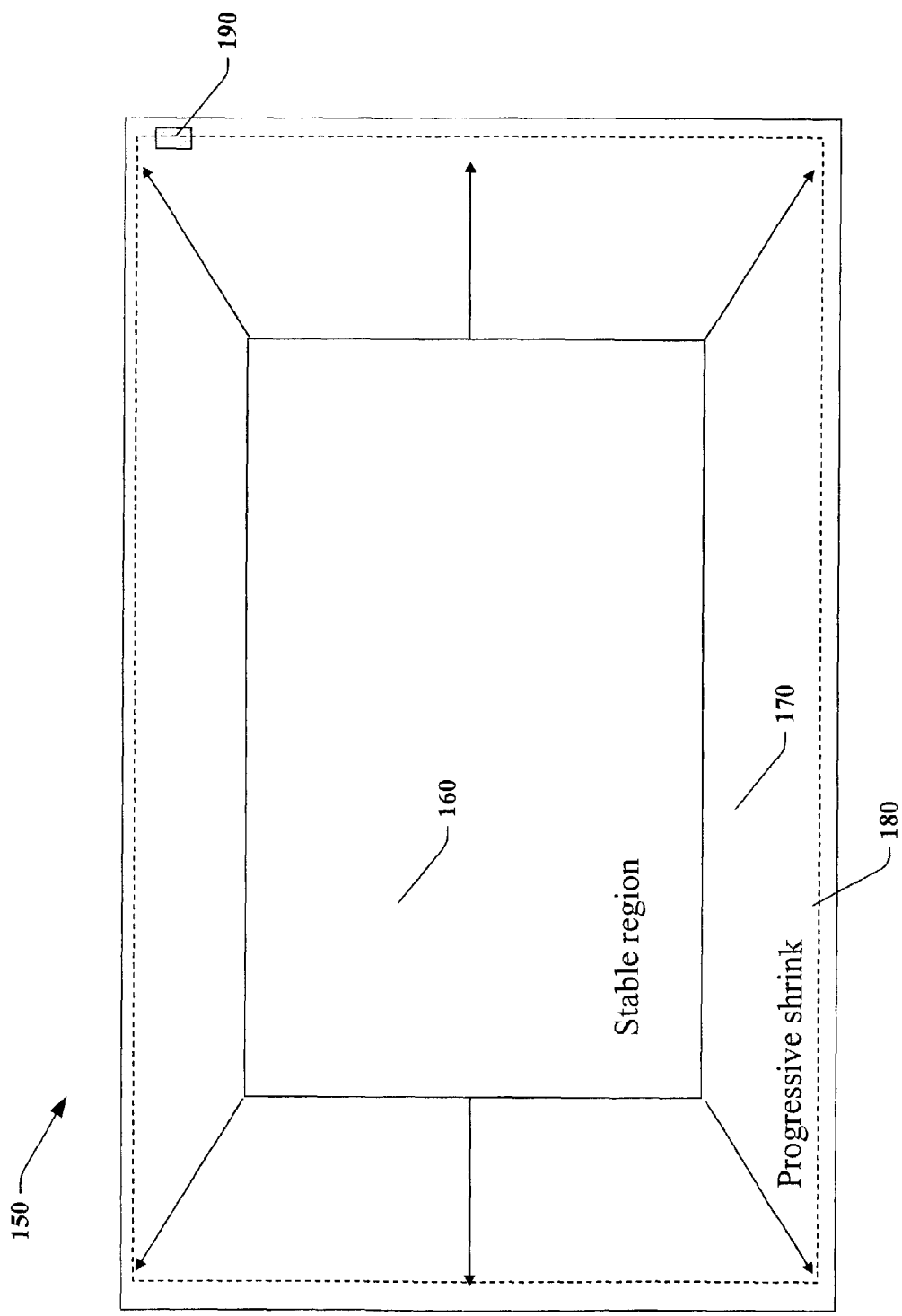
Figure 23:
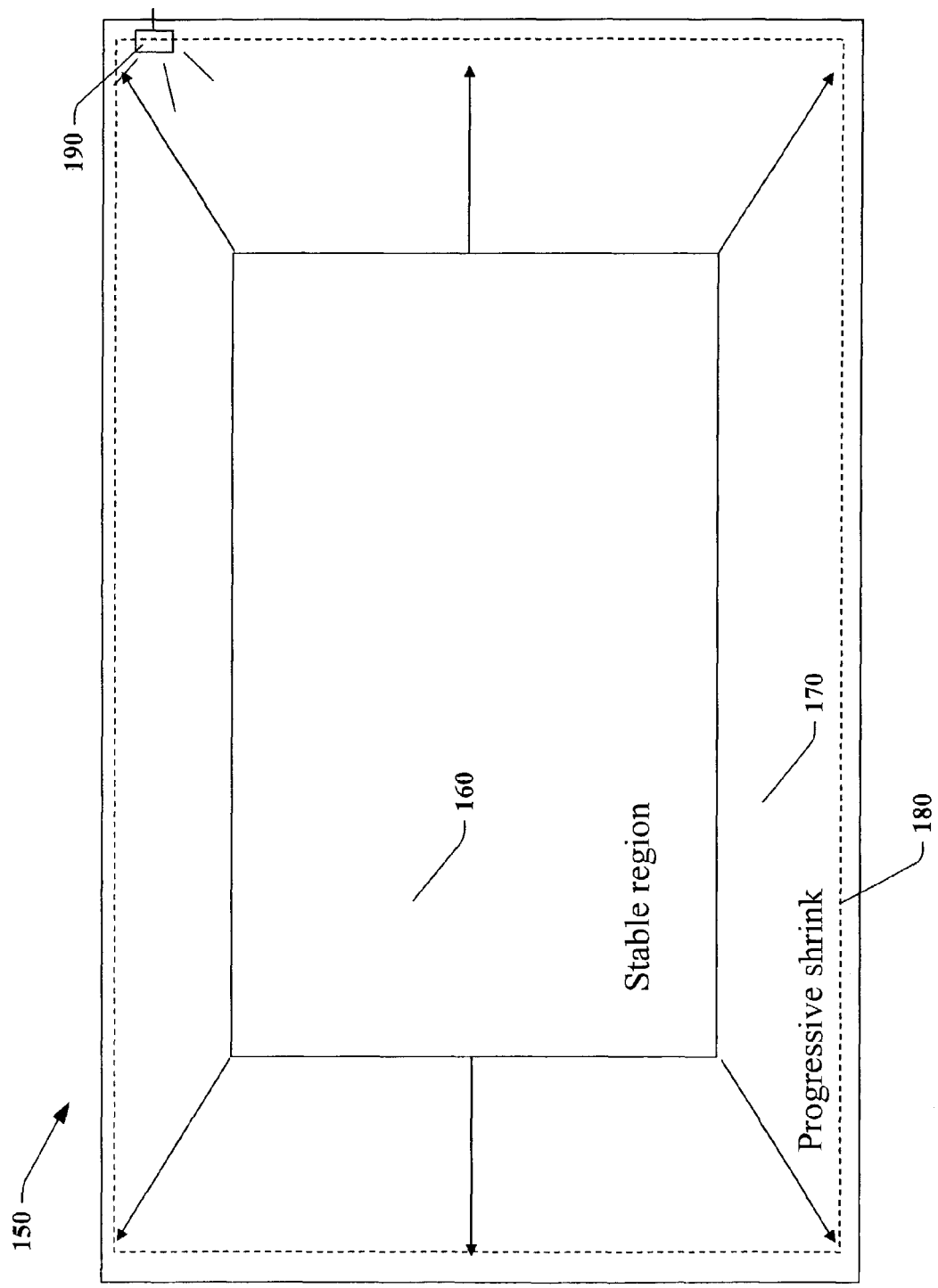
Figure 24:
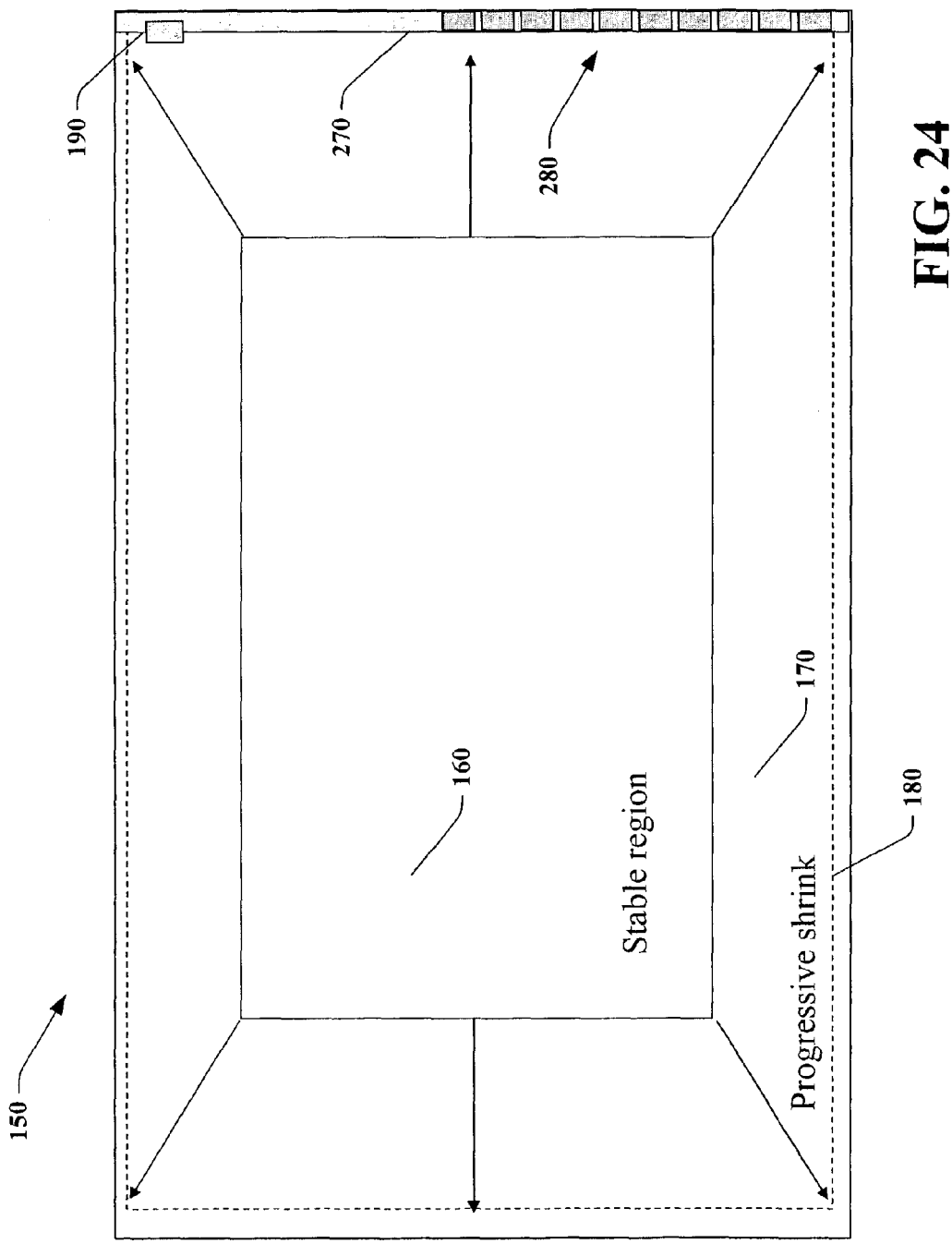
Figure 25:
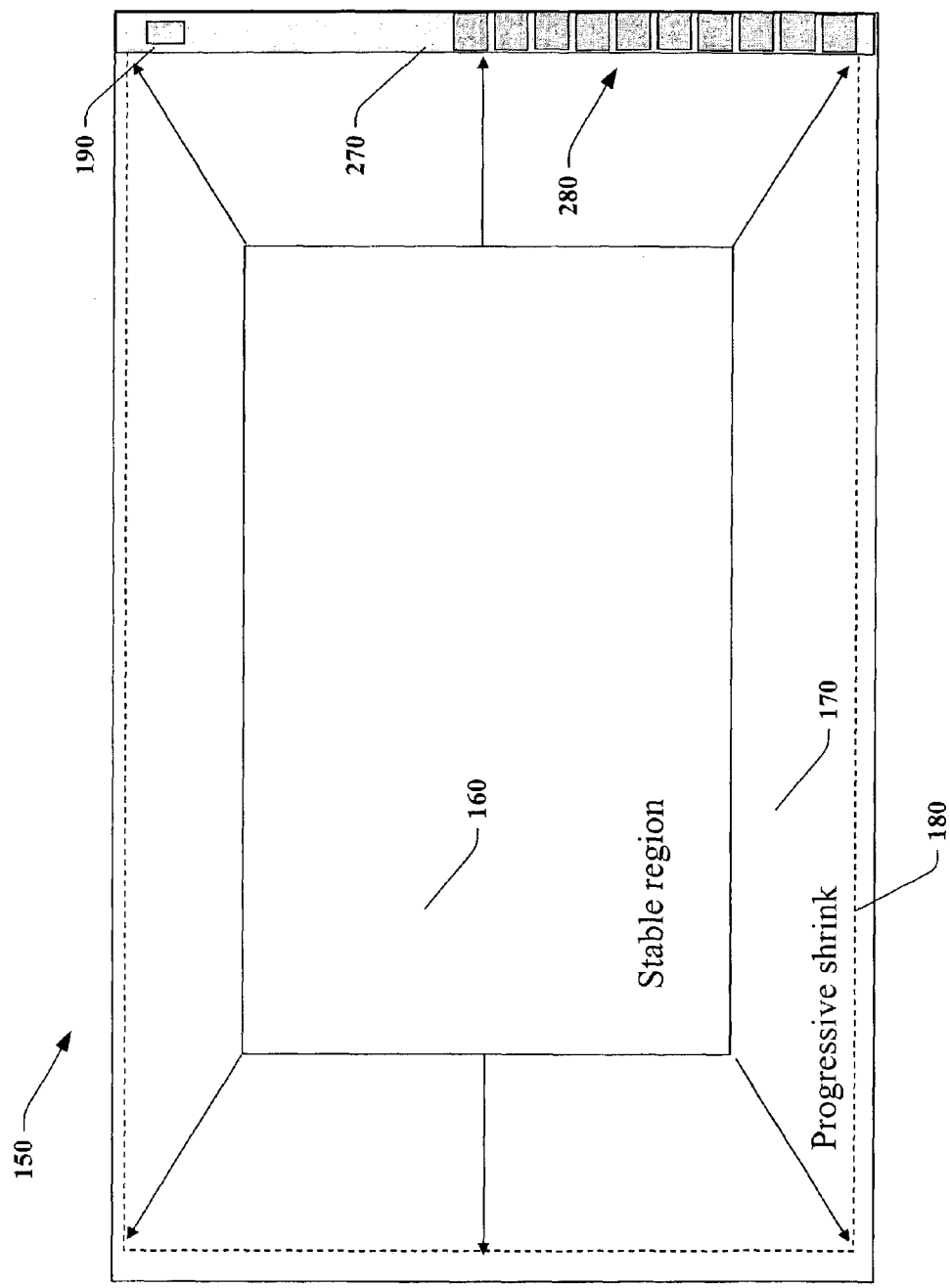
Figure 26:
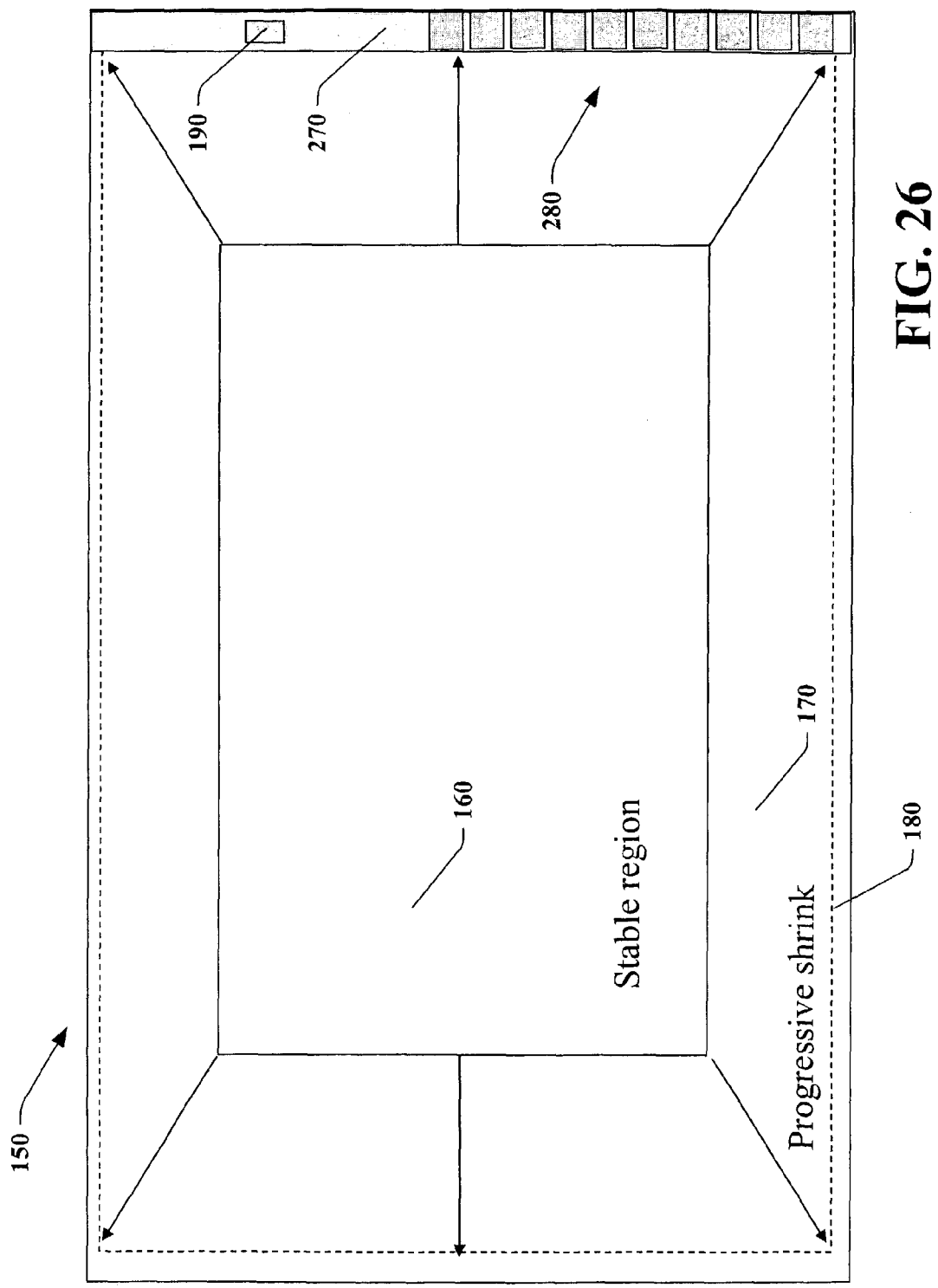
Figure 27:
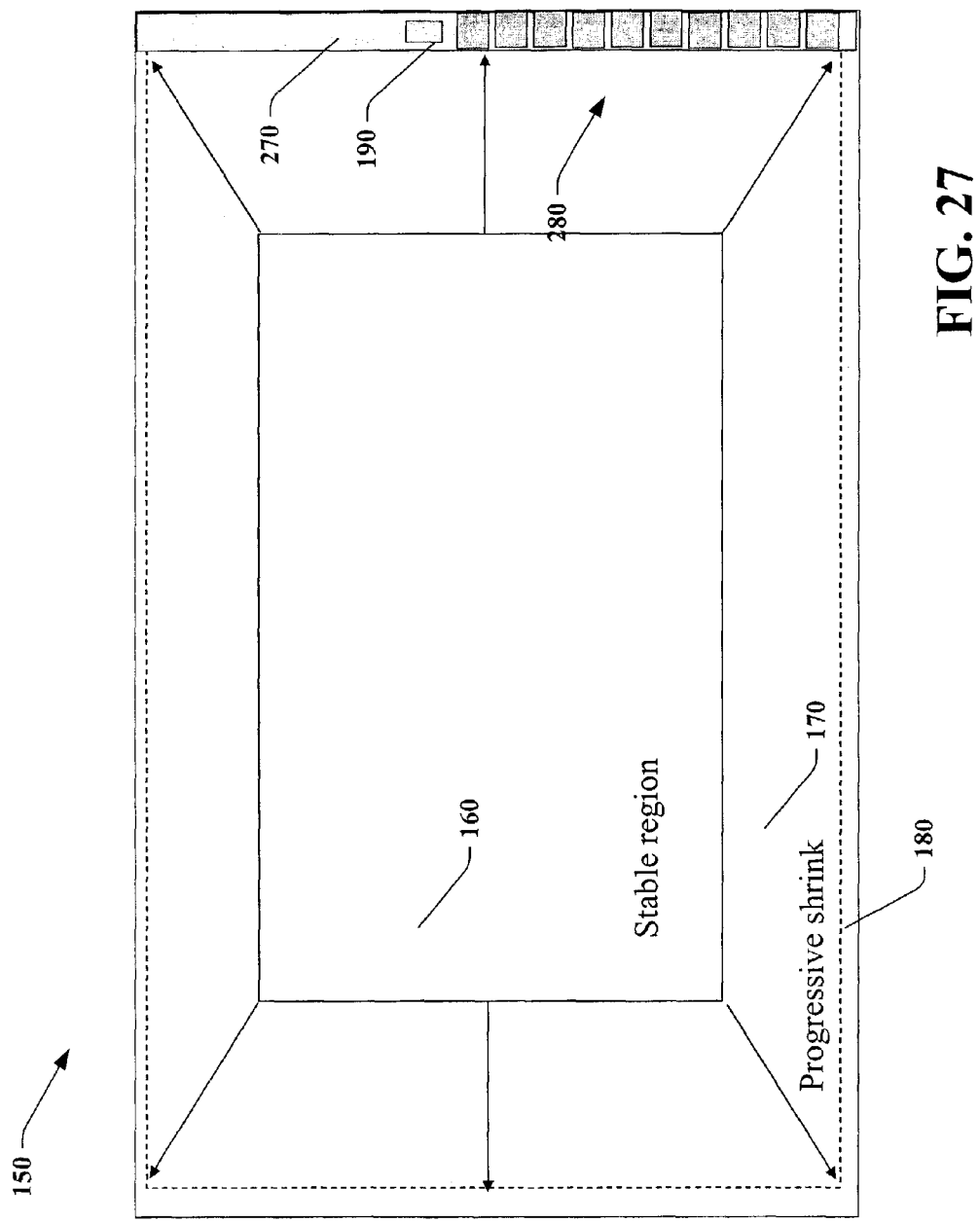
Figure 28:
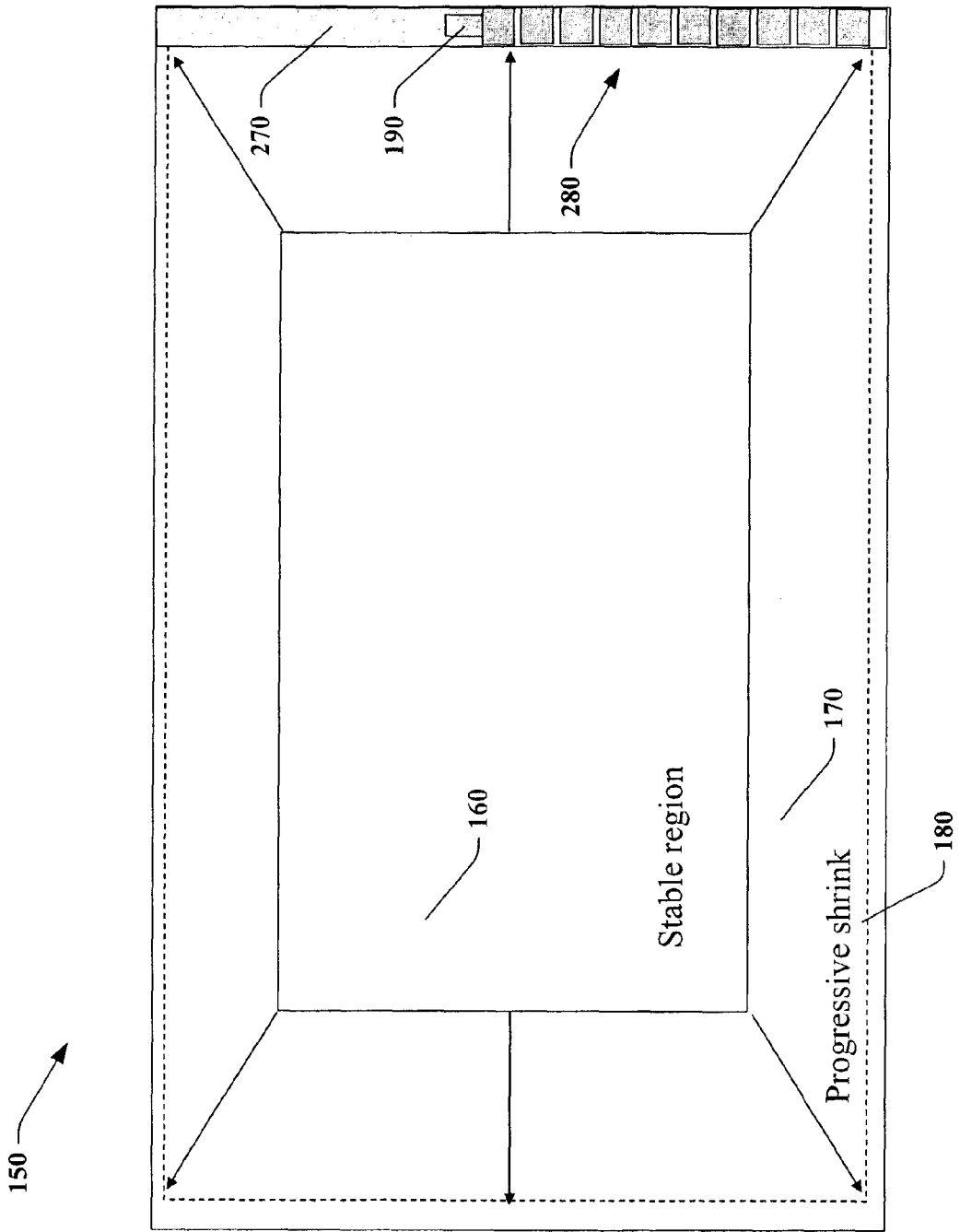
Figure 29:
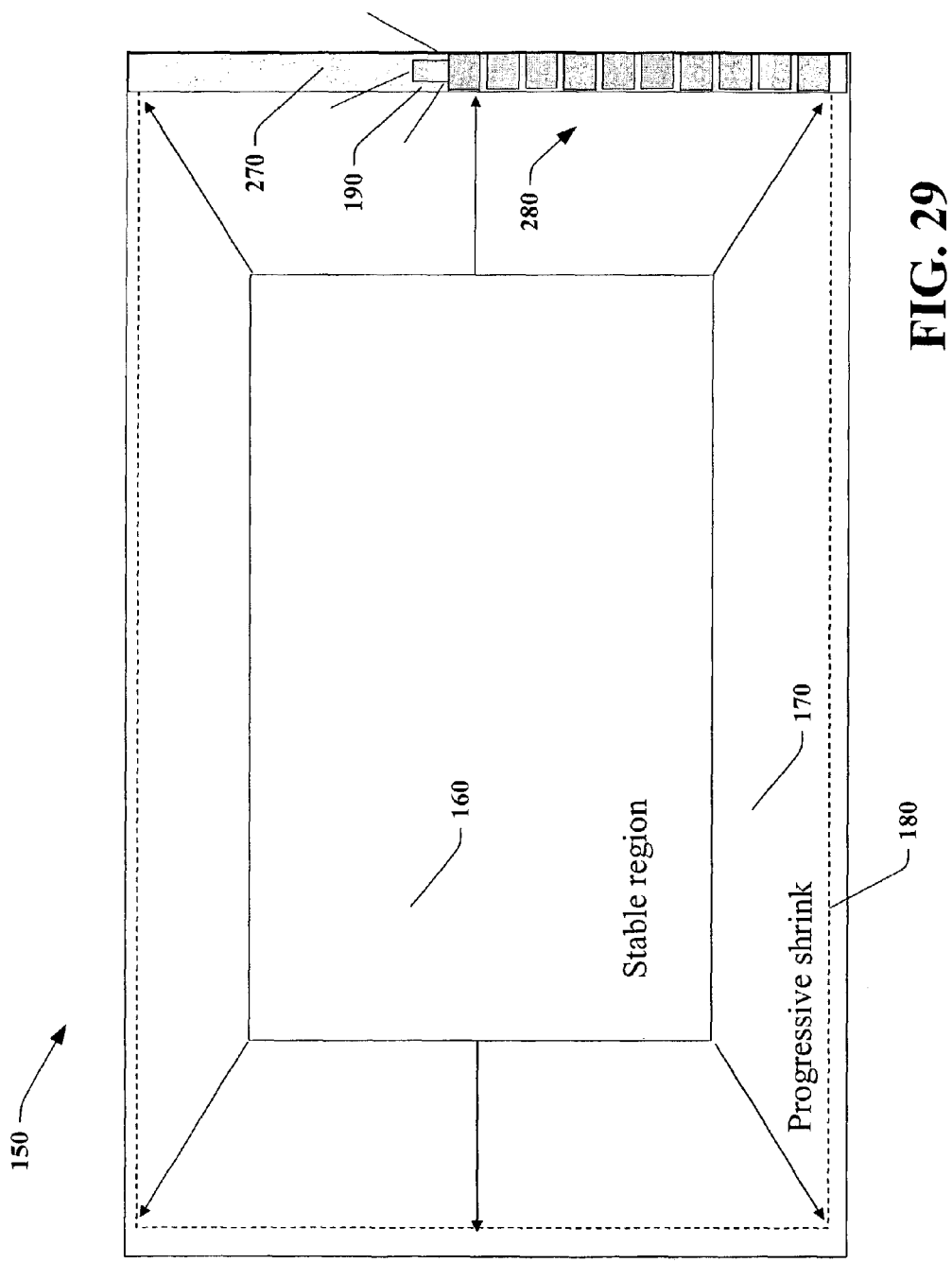
Figure 30:
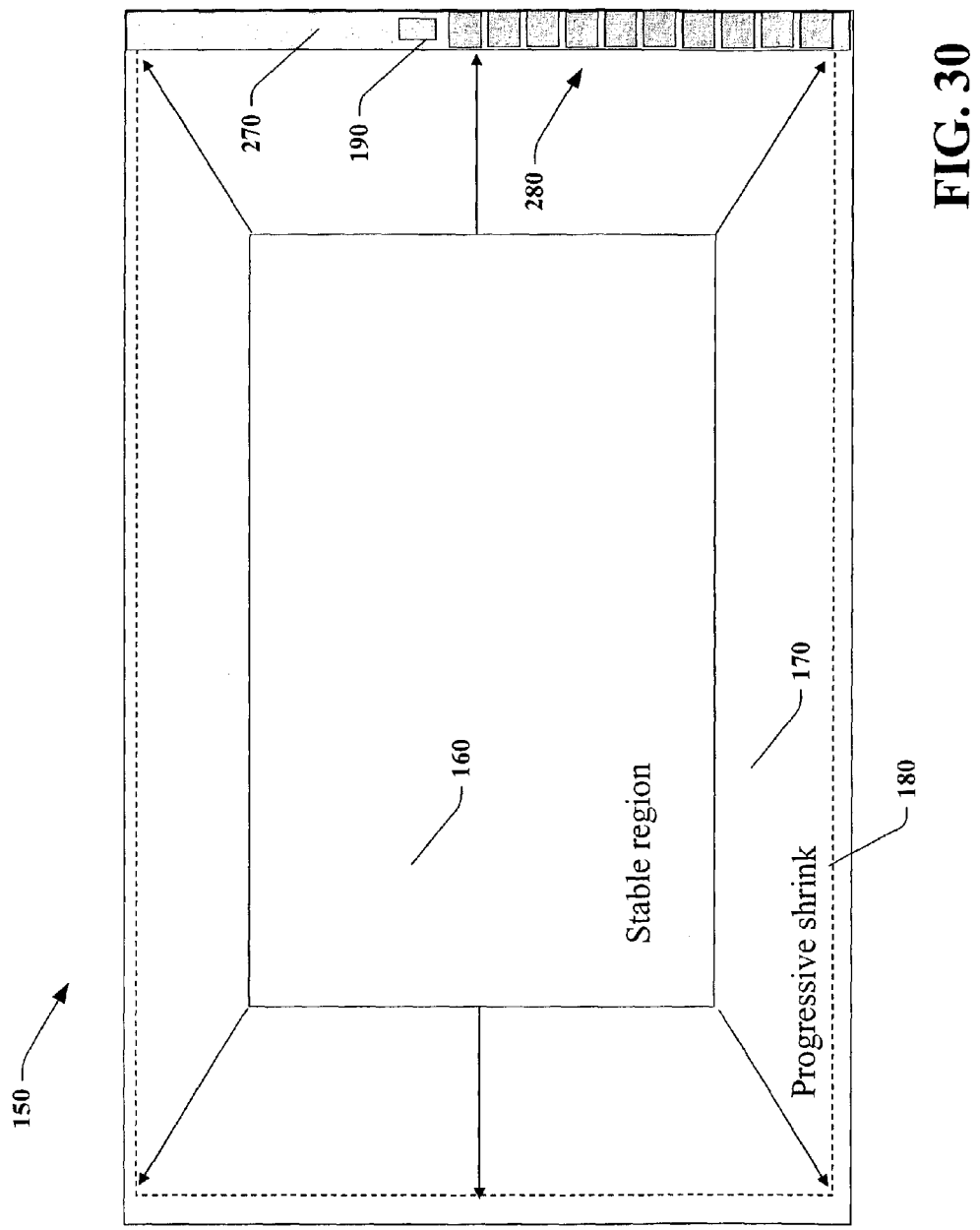
Figure 31:
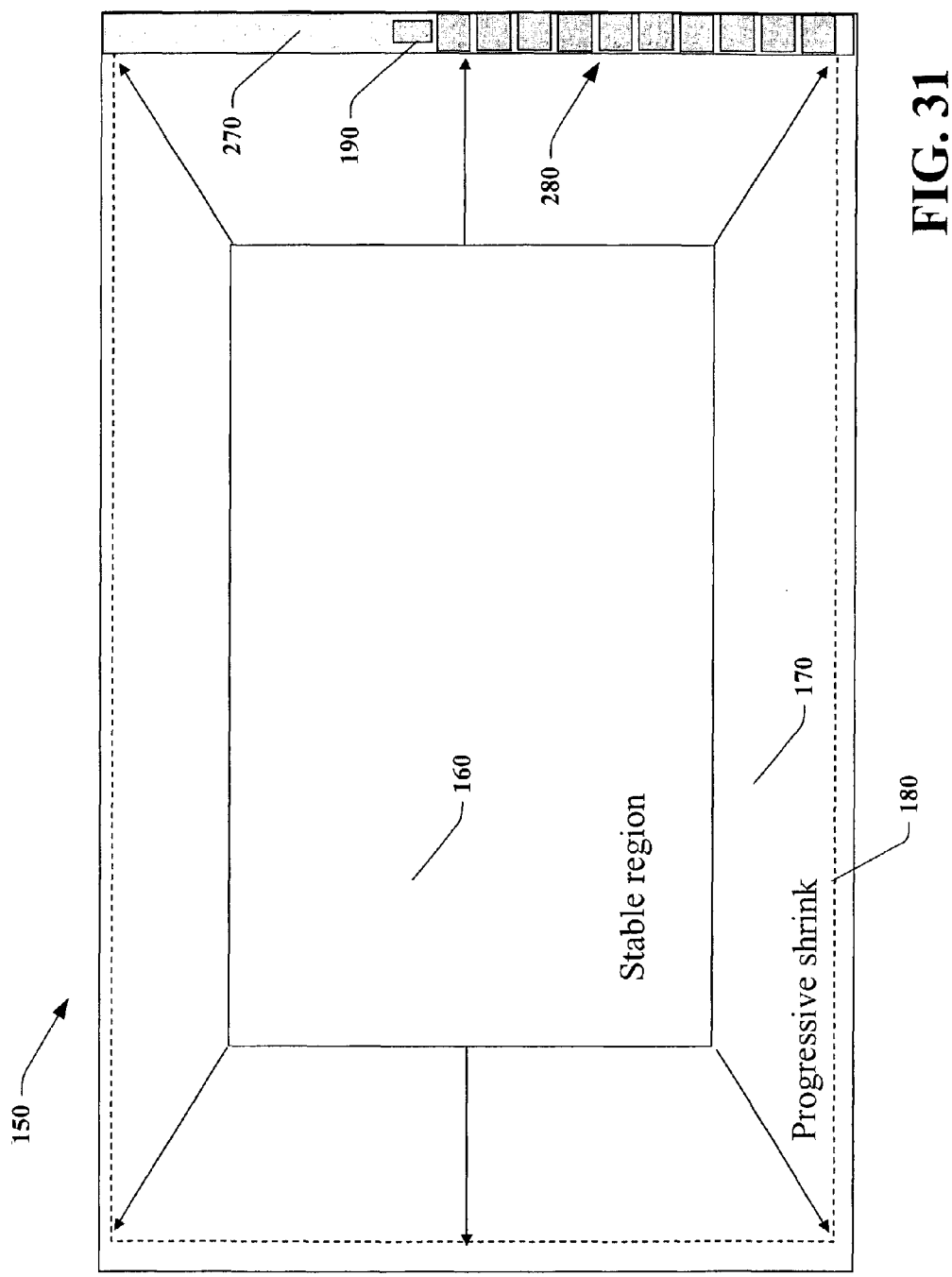
Figure 32:
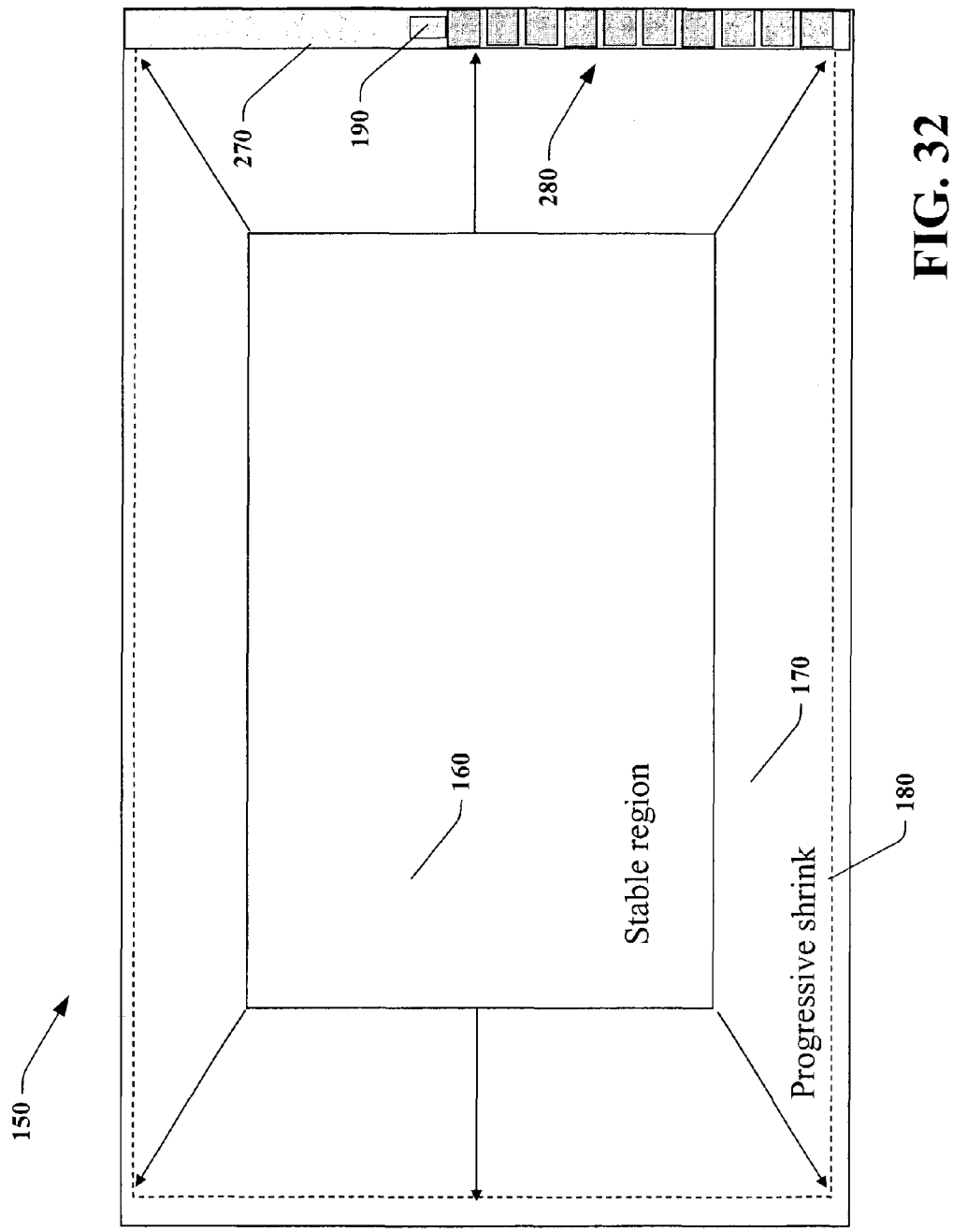
Figure 33:
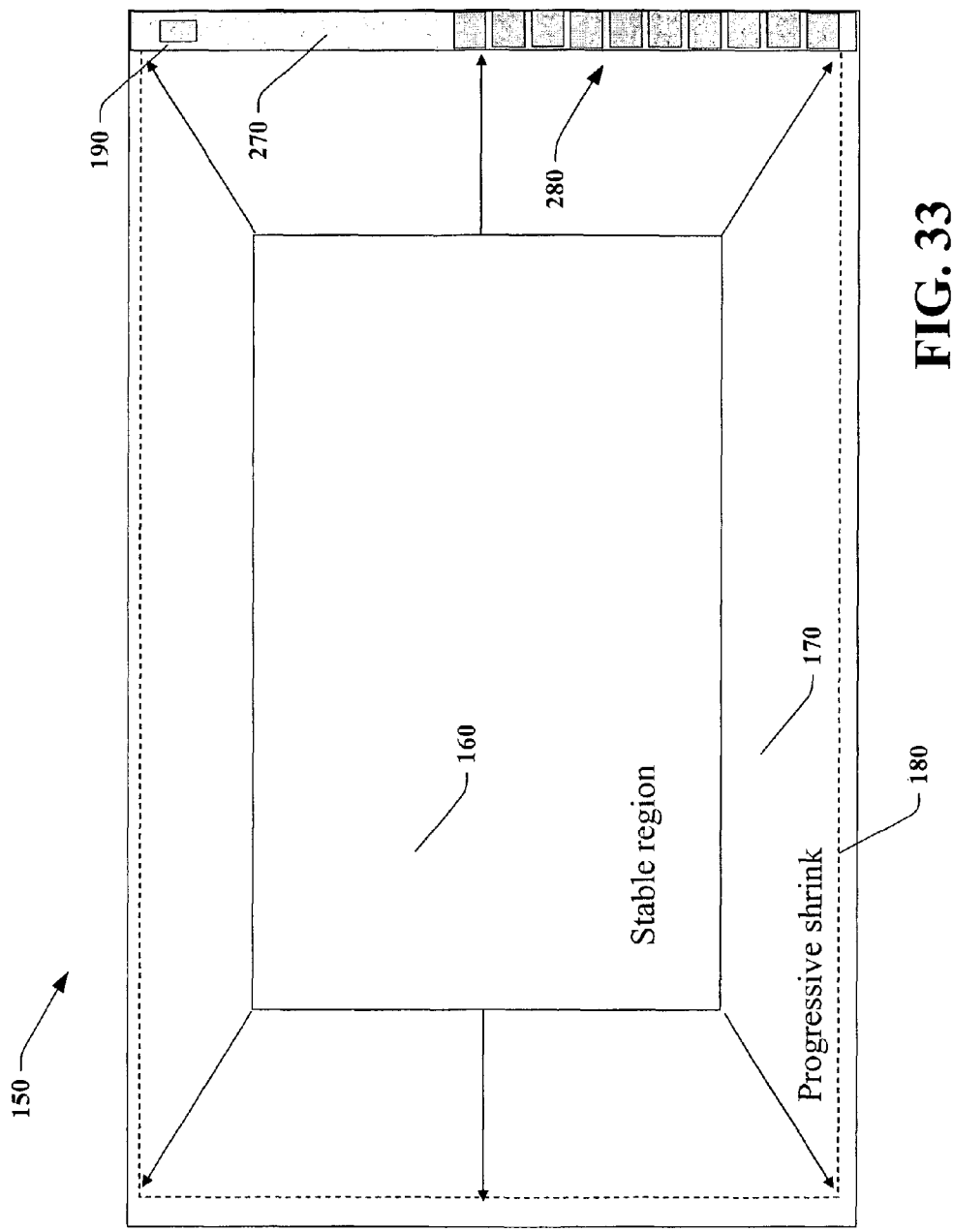

FIGS. 21-39 illustrate an optional aspect of transition of display objects off of a screen (e.g., to side bar) to another iconic form in accordance with the subject invention. In FIG. 21, the display object 190 is shown moving to the edge 180 of the display area 150. As the object reaches the edge 180 in FIGS. 21 and 22, the object 190 migrates into a side bar 270 where a plurality of display objects 280 are shown residing therein. The side bar allows efficient grouping of display object(s) that are not currently being actively used. The display objects can be organized in the side bar 270 in accordance with a variety of manners (e.g., order of entry into side bar, priority, age of use . . . ).

Figure 34:
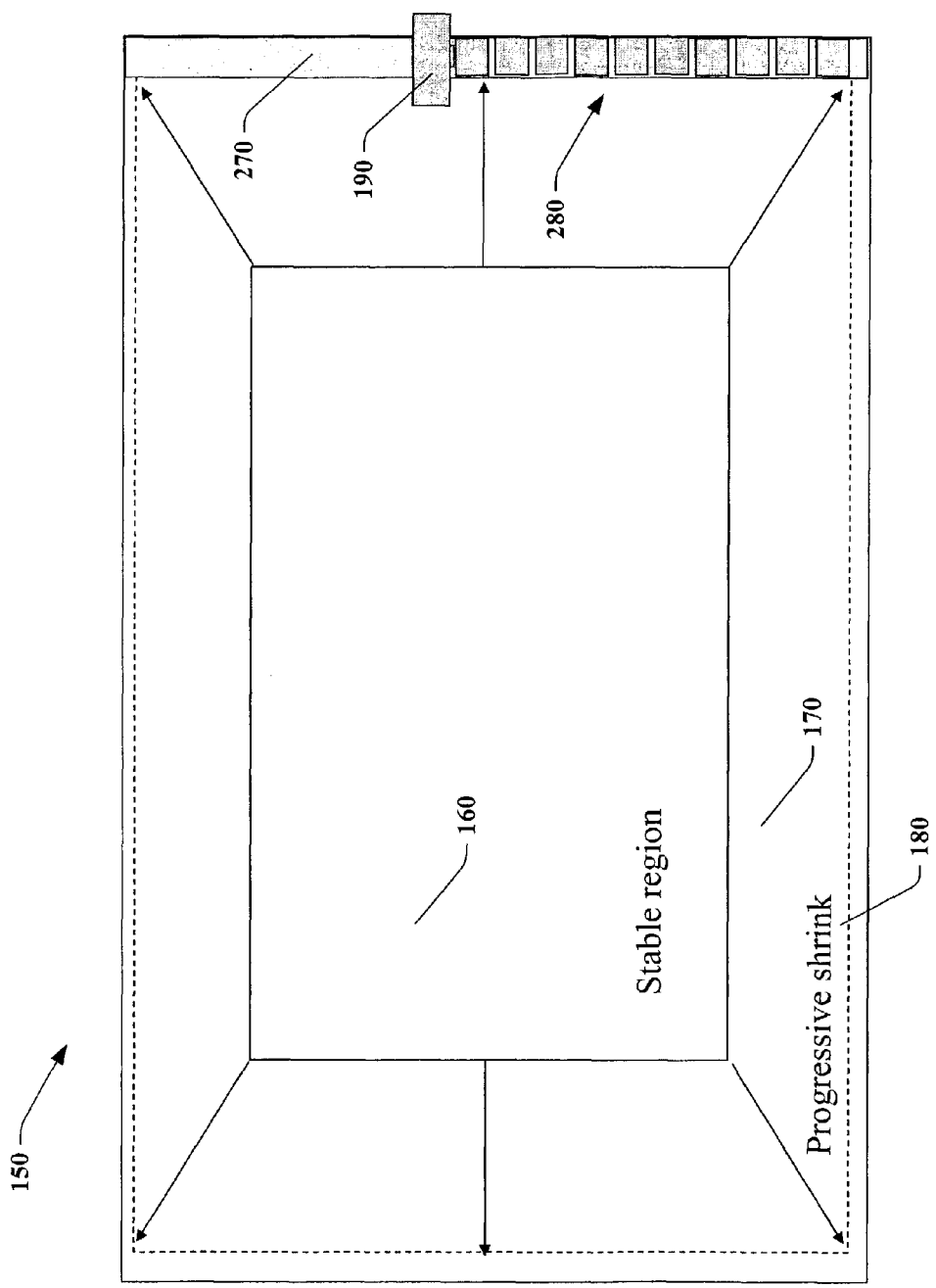
Figure 35:
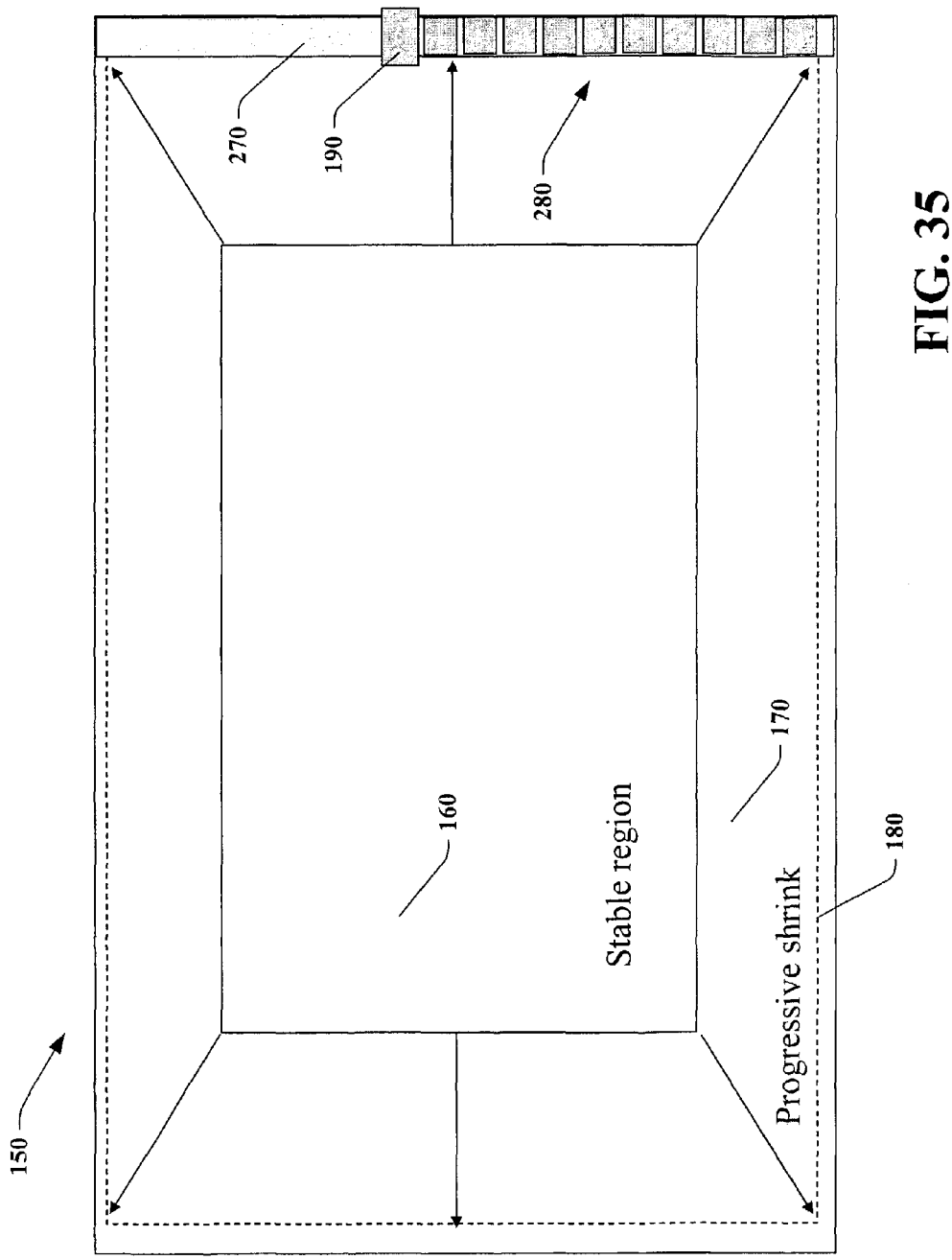
Figure 36:
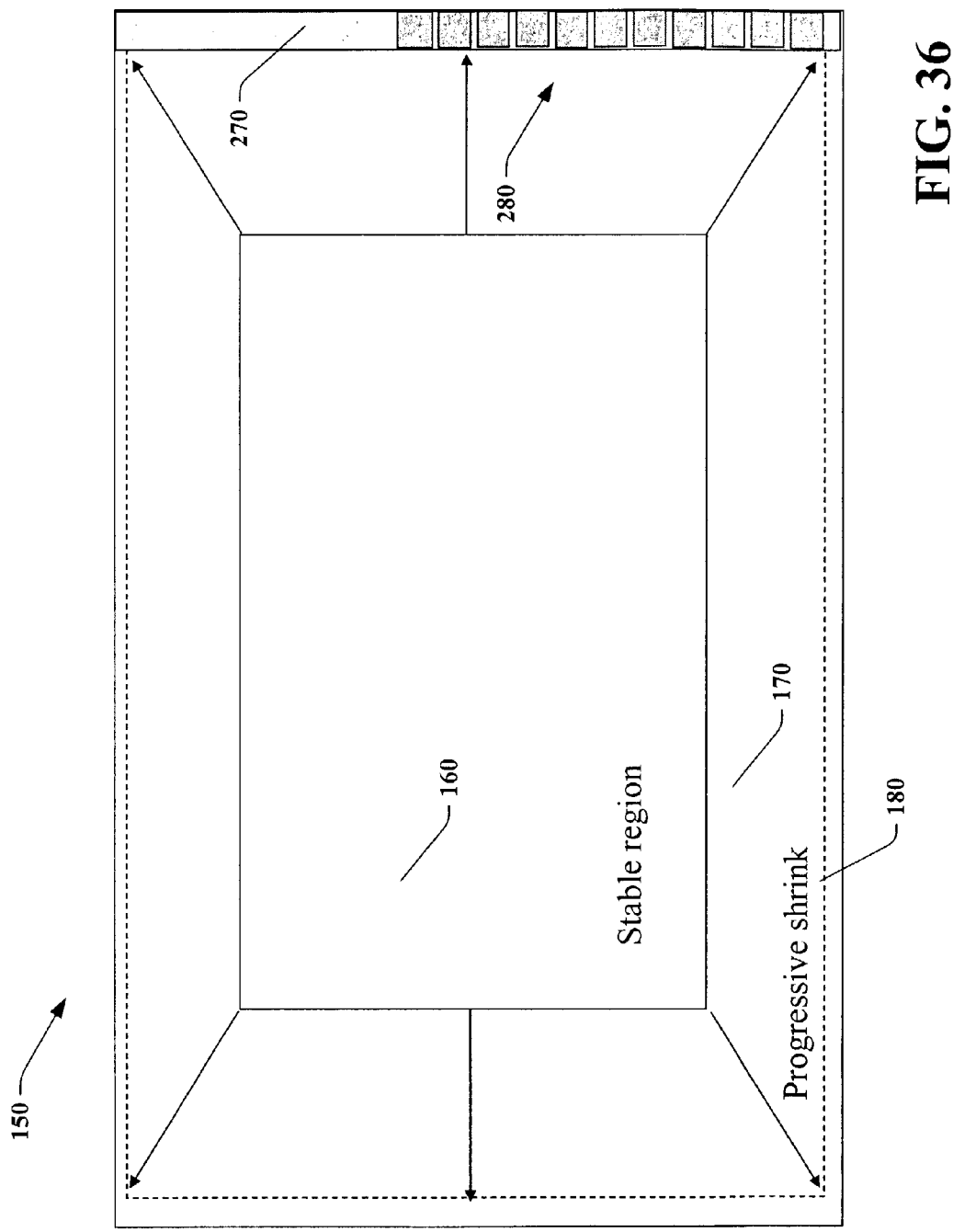
Figure 37:
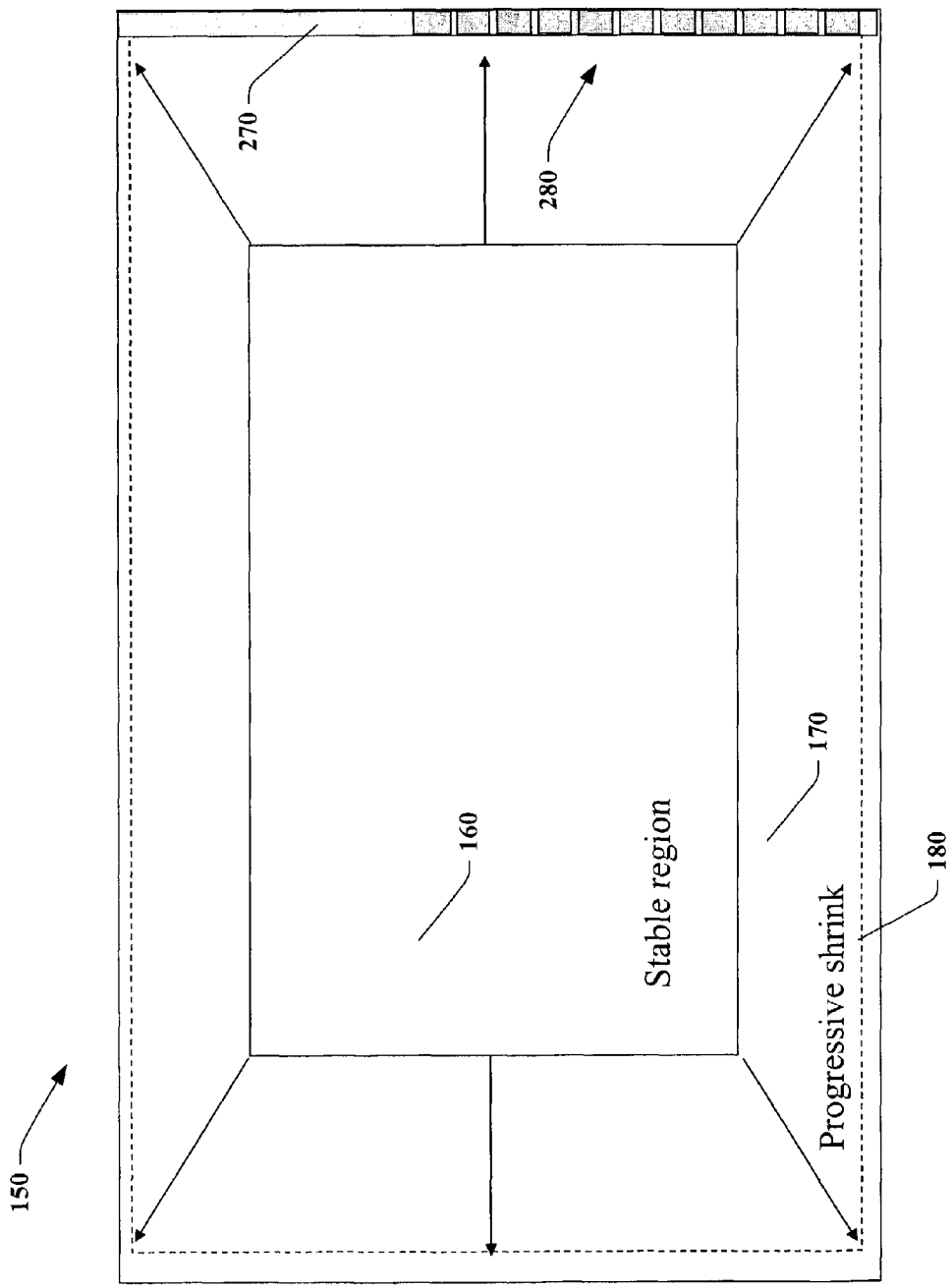
Figure 38:
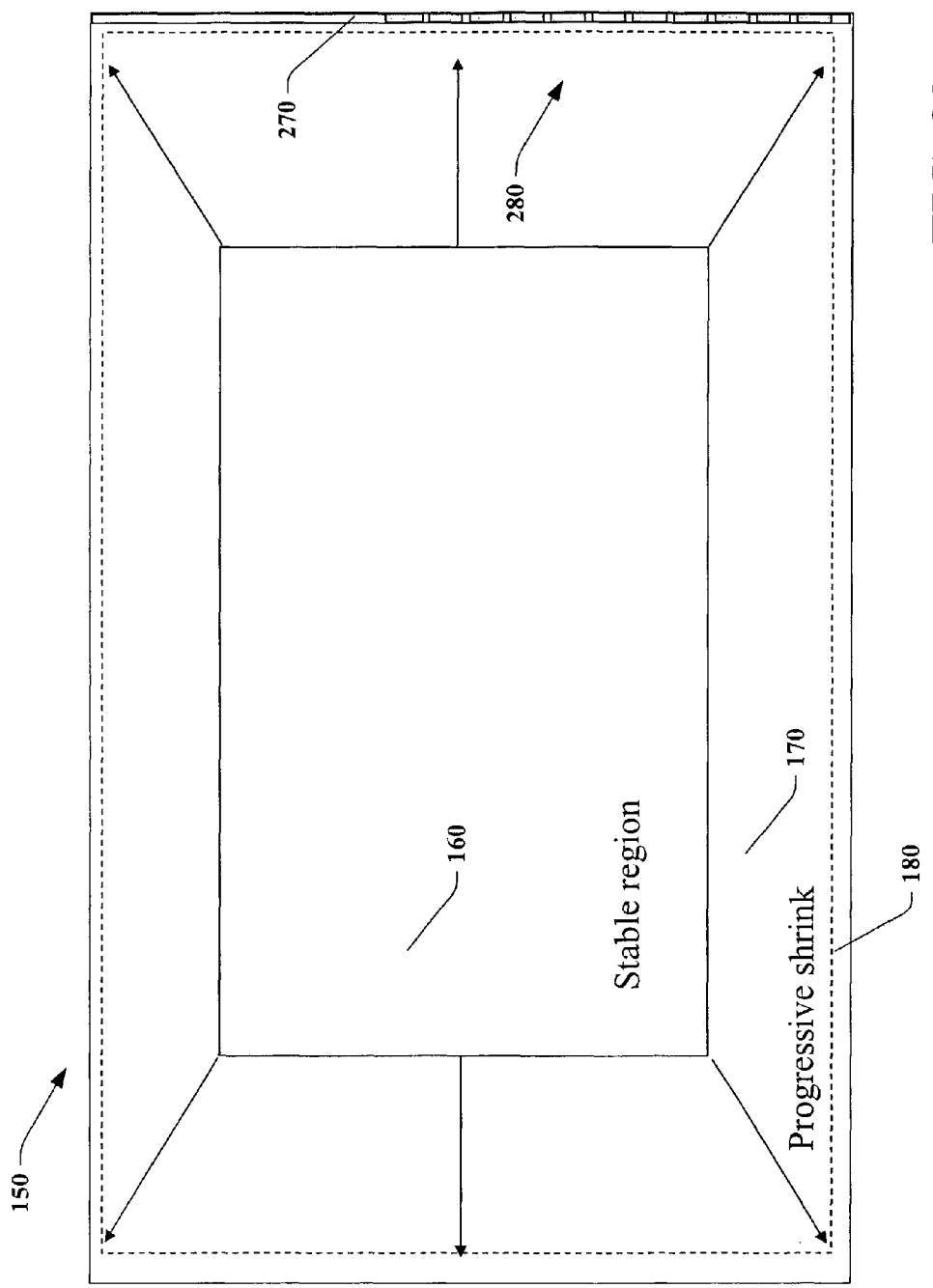
Figure 39:
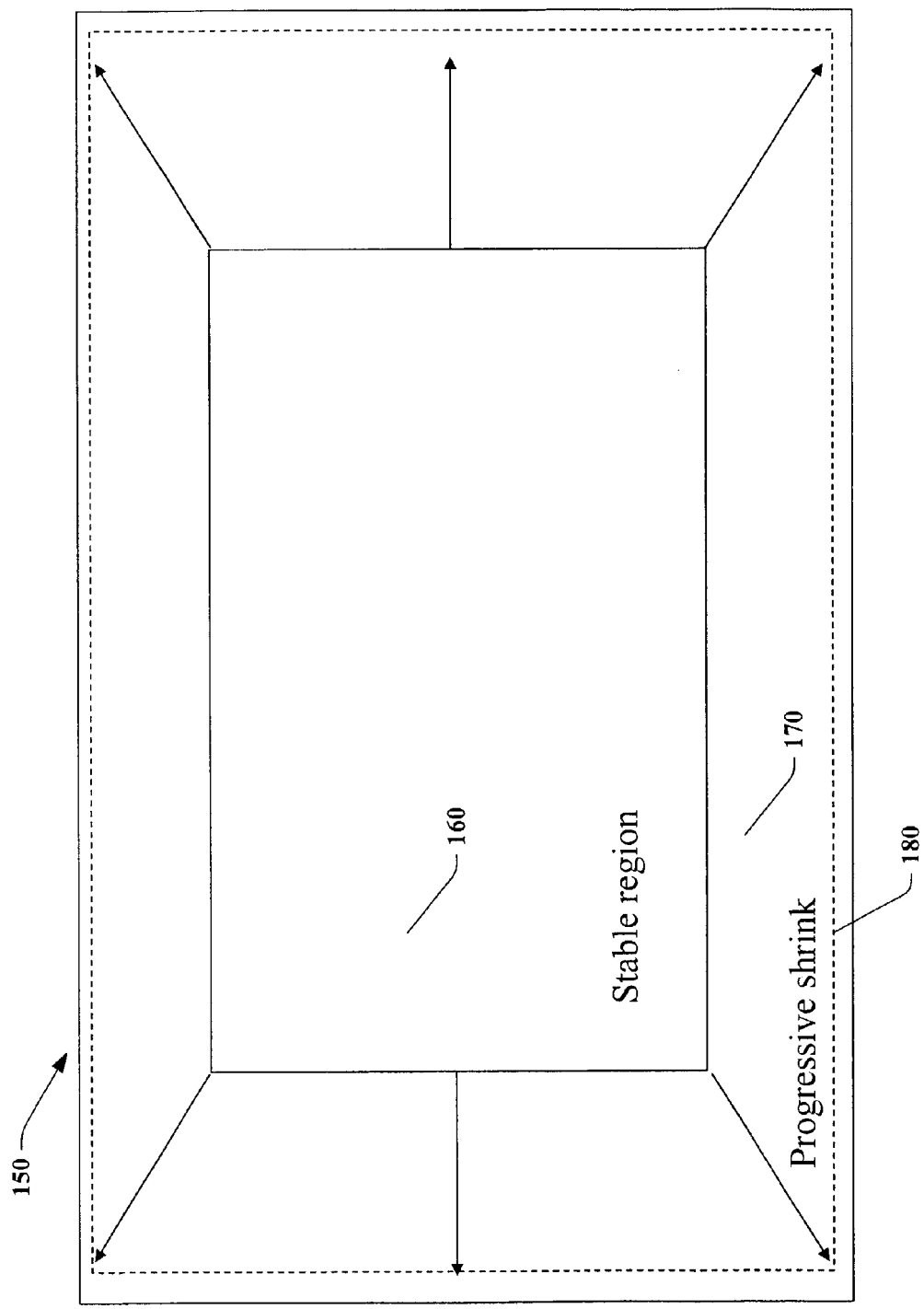

As shown in FIGS. 25-33, the side bar 270 can be modified in size (e.g., width or height) and as is typical with conventional side bars repositioned with a display space as desired. As an object enters the side bar 270, the object can automatically position itself as a suitable location within the side bar. FIGS. 34 and 35 illustrate that particular display object(s) 190 can be modified to have behavior (e.g., size, refresh rate, . . . ) different from other display objects within the side bar. FIGS. 36-39 illustrate that the side bar 270 can be hidden (e.g., automatically or manually) from view during periods of non-use.

Figure 40:
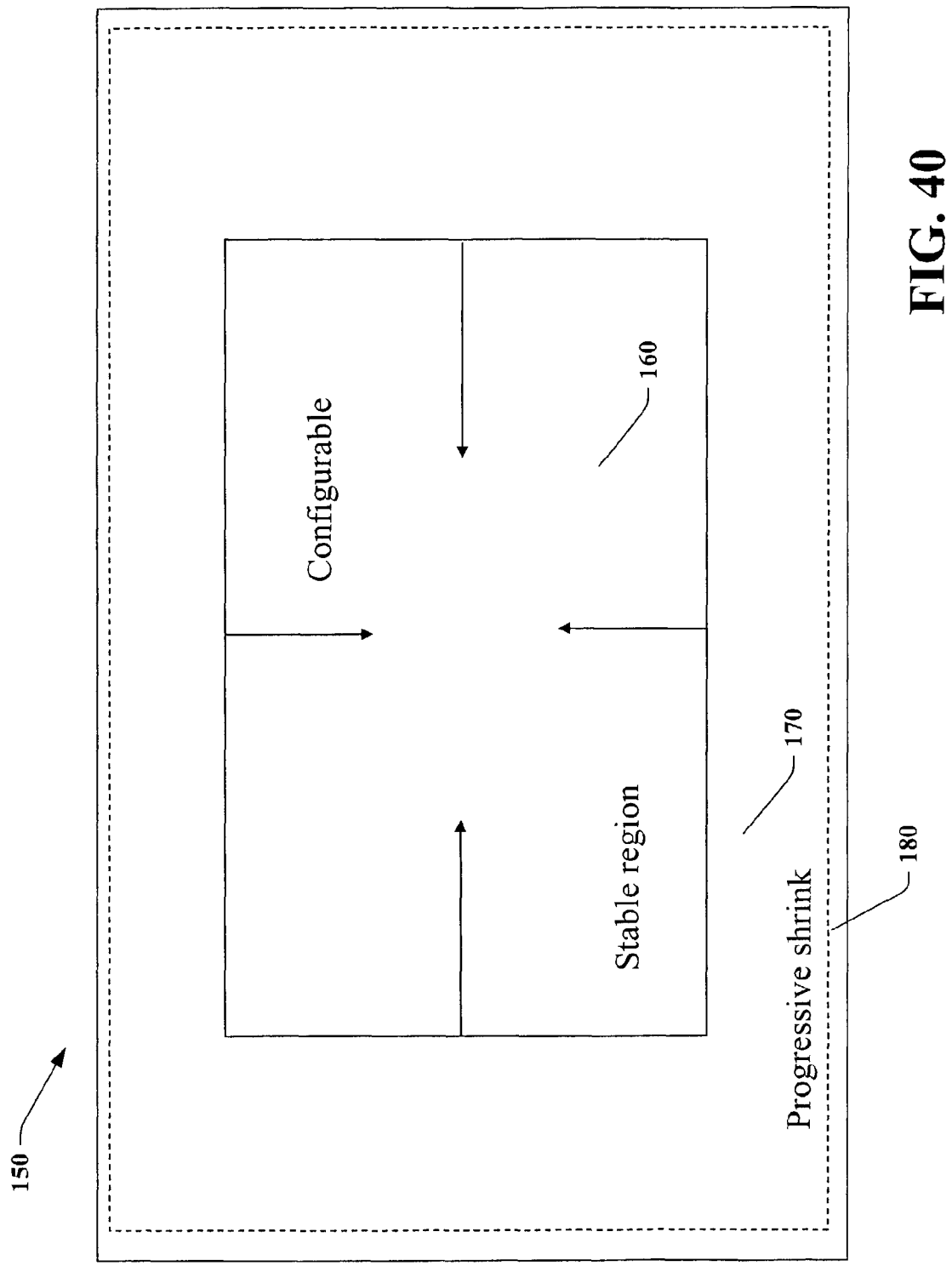
FIGS. 40-47 illustrate a focus region and/or progressive shrink region be configurable in accordance with the subject invention.
Figure 41:
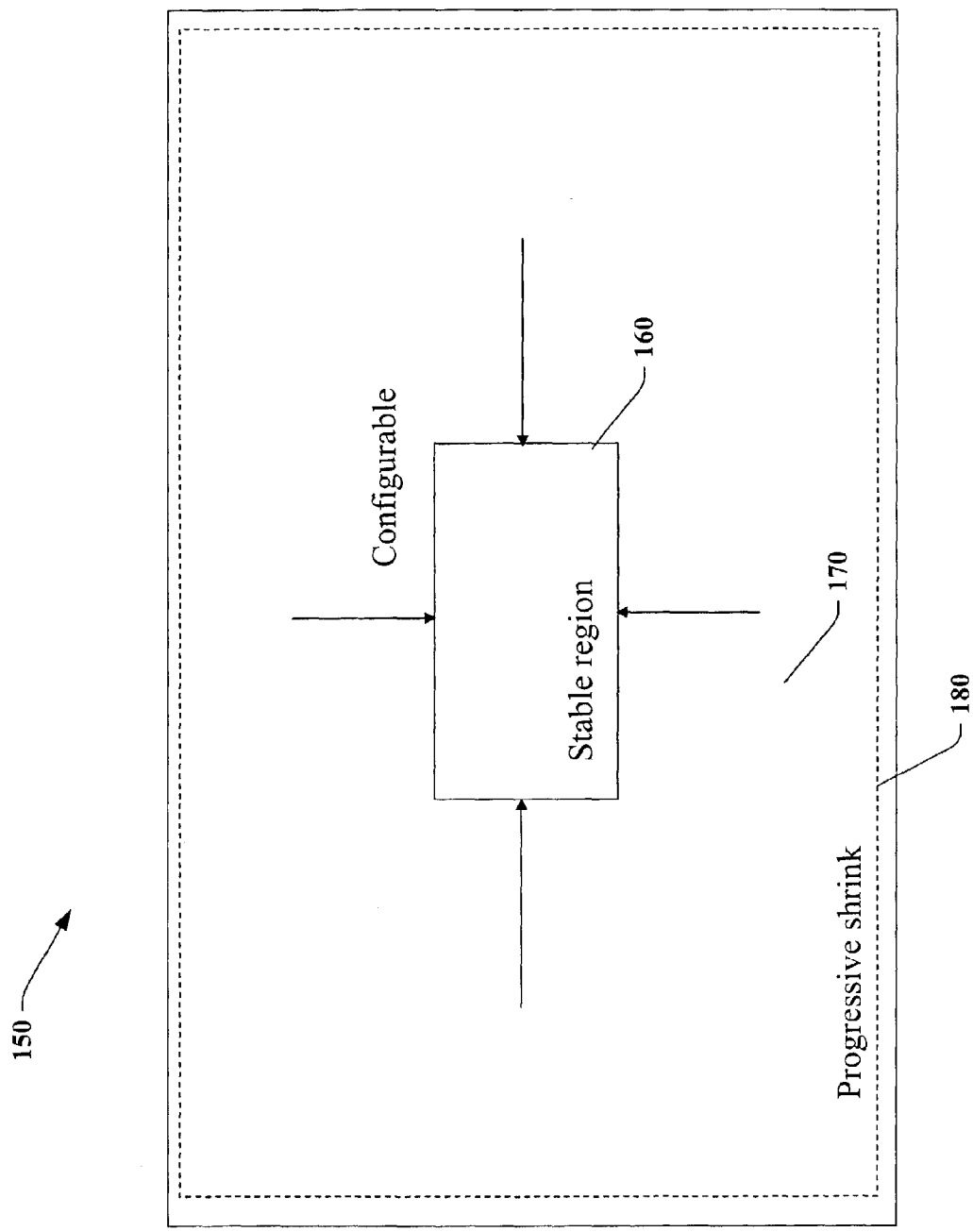
Figure 42:
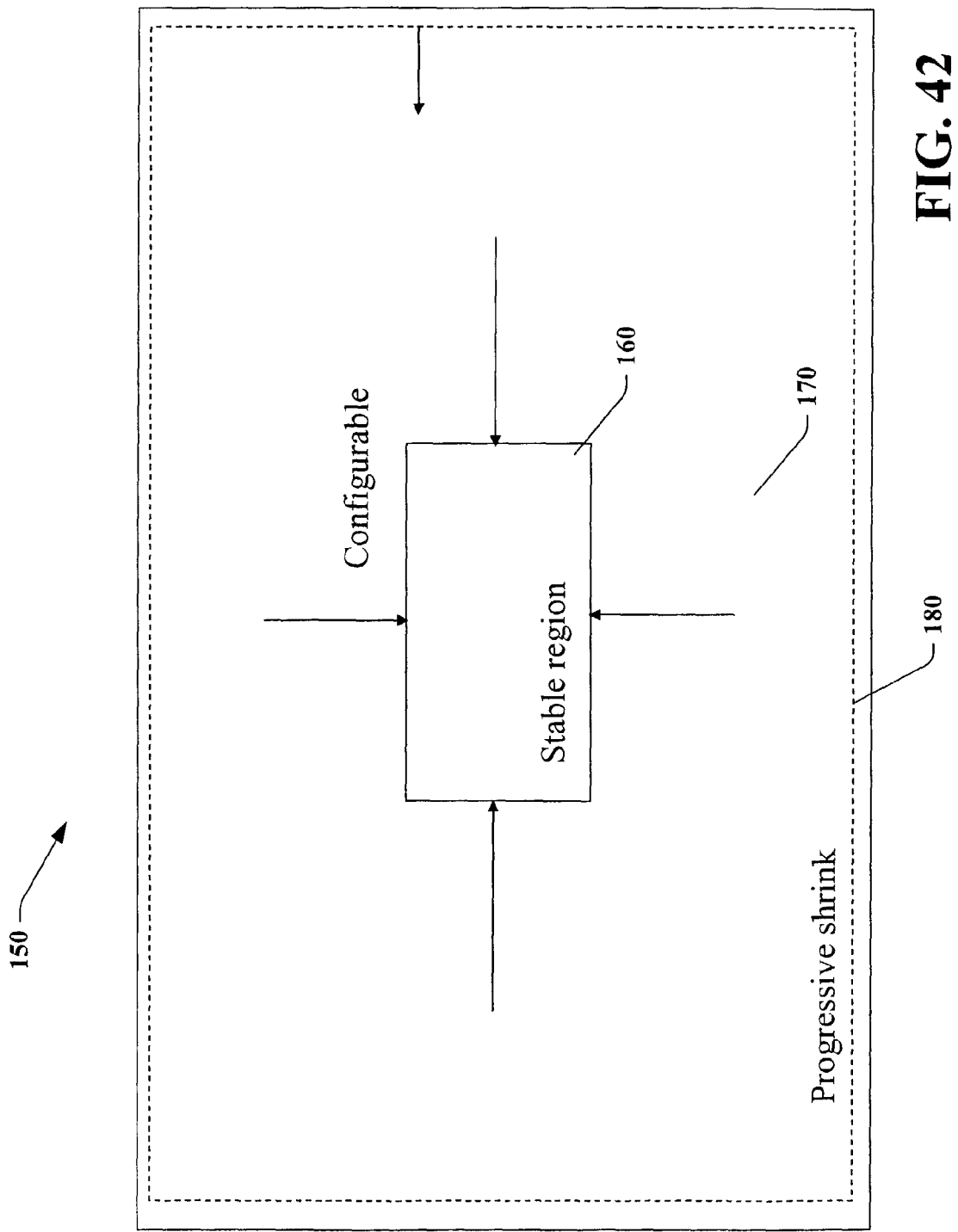
Figure 43:
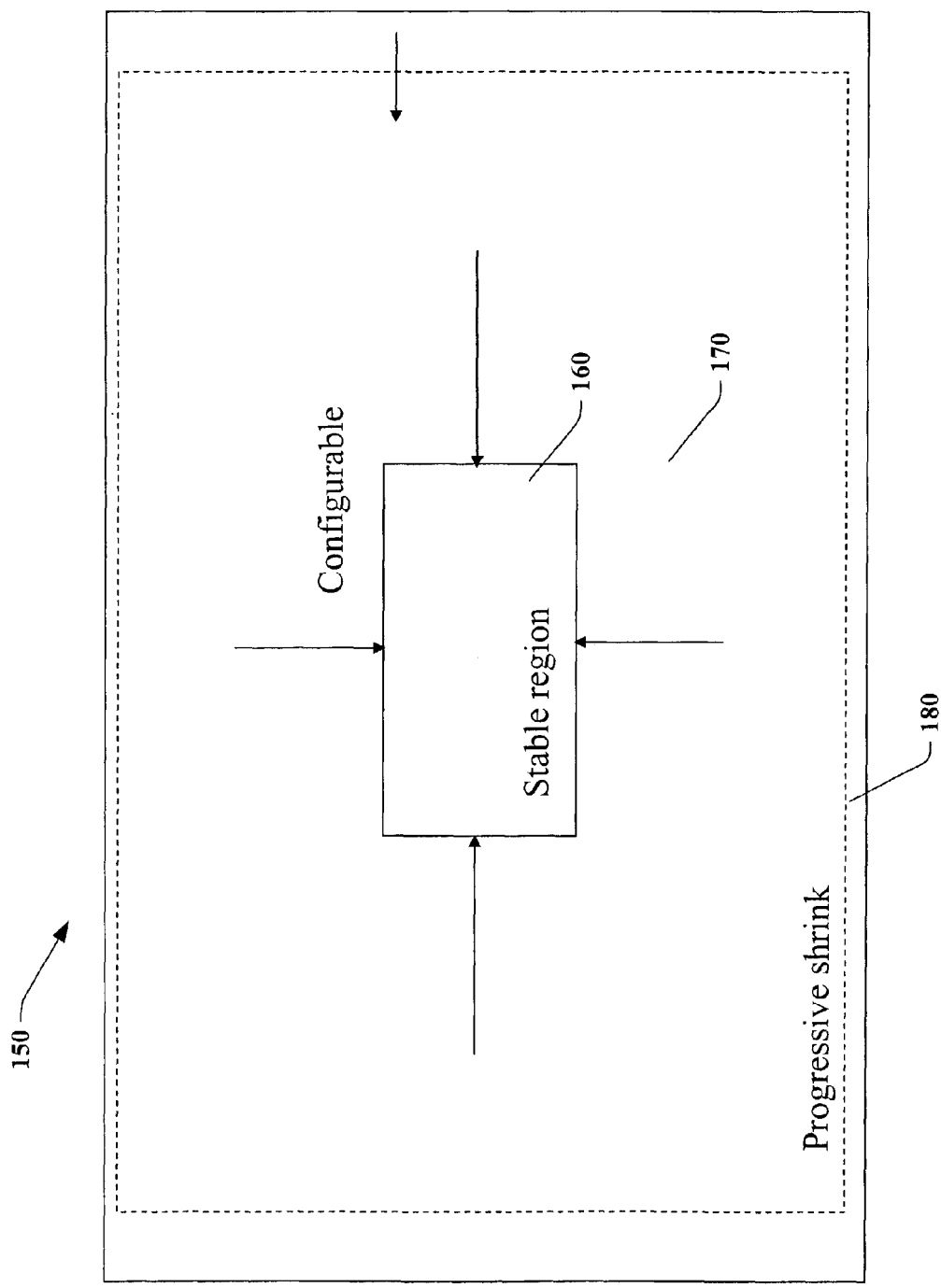
Figure 44:
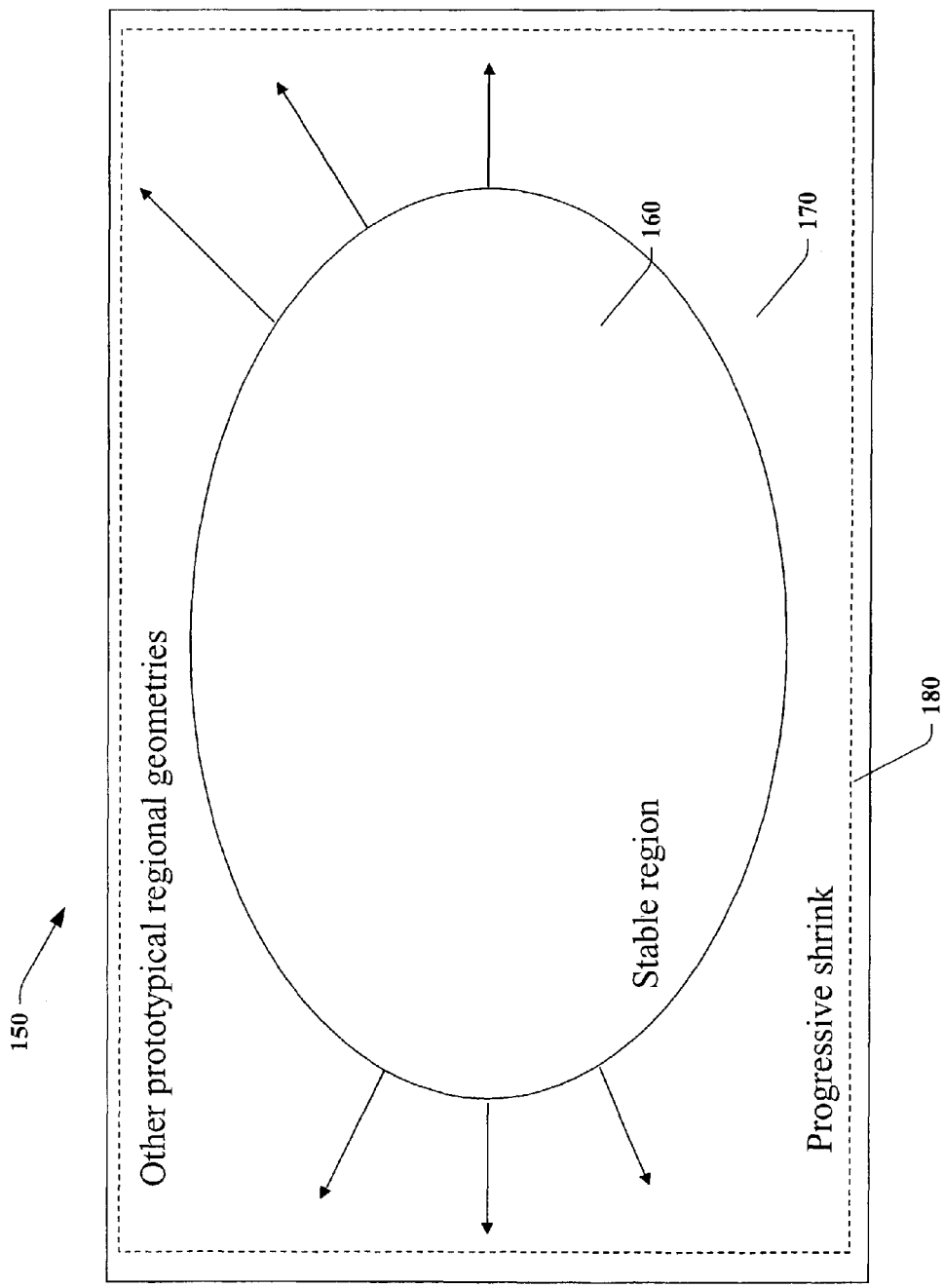
Figure 45:
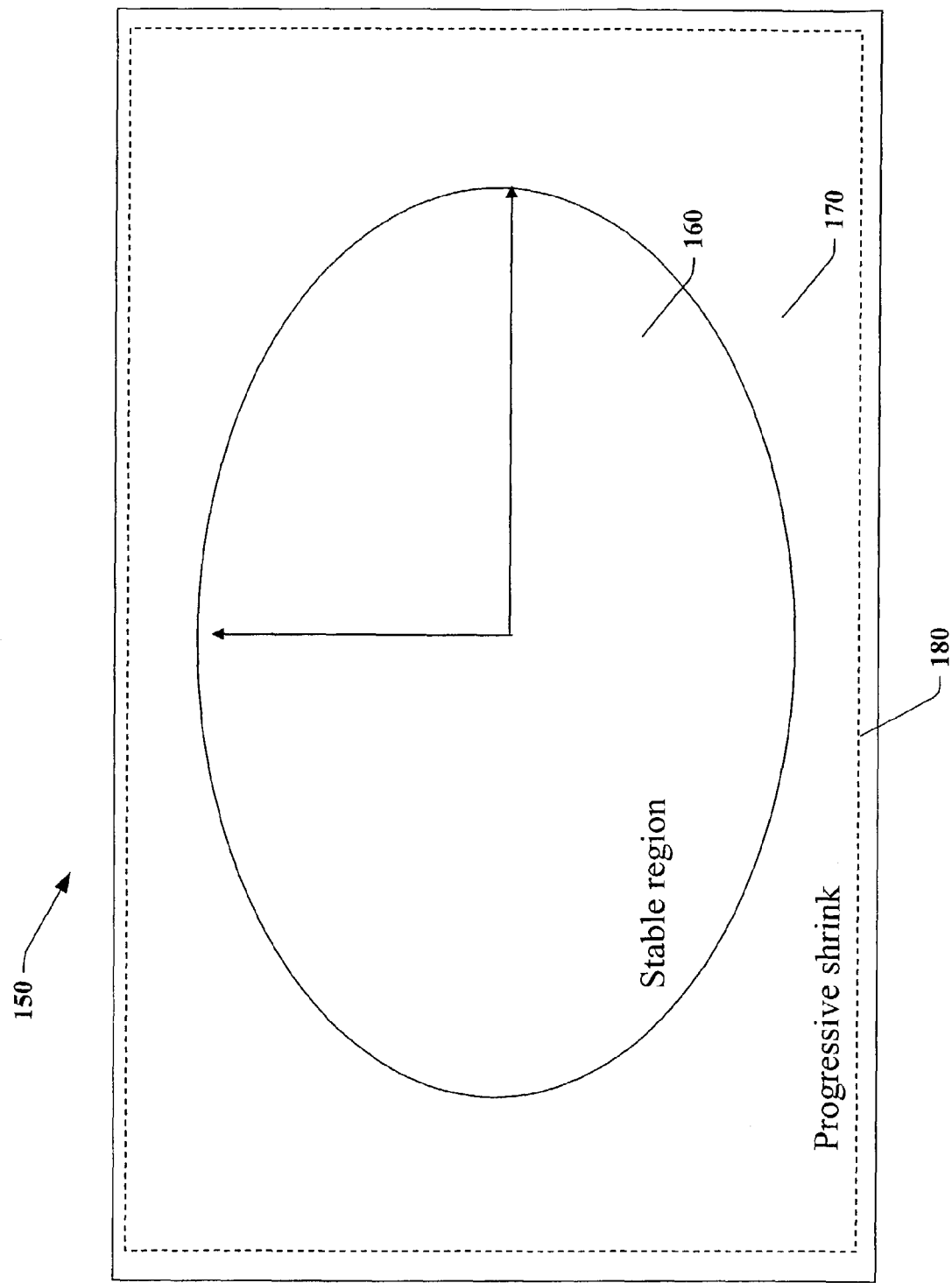
Figure 46:
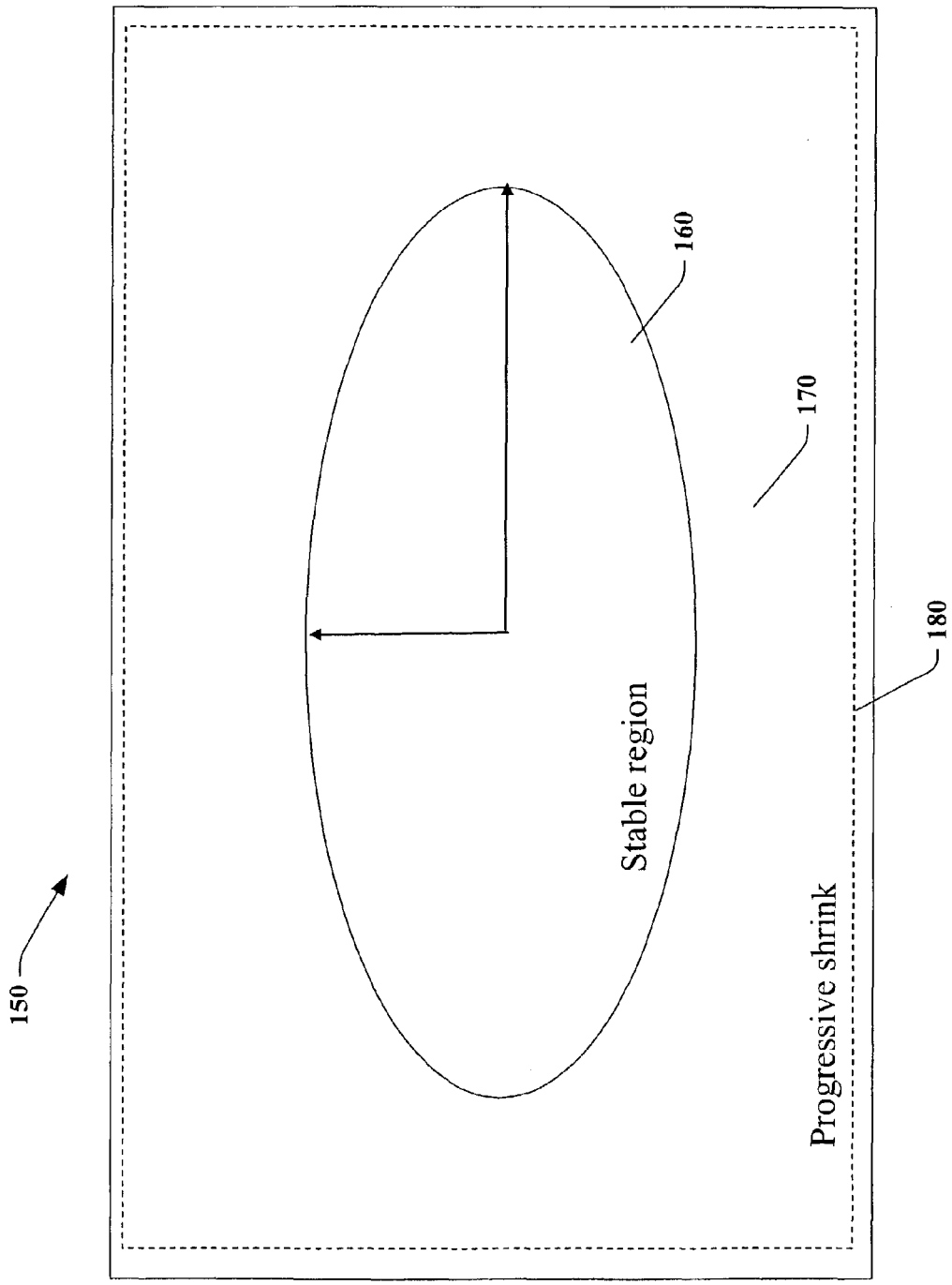
Figure 47:
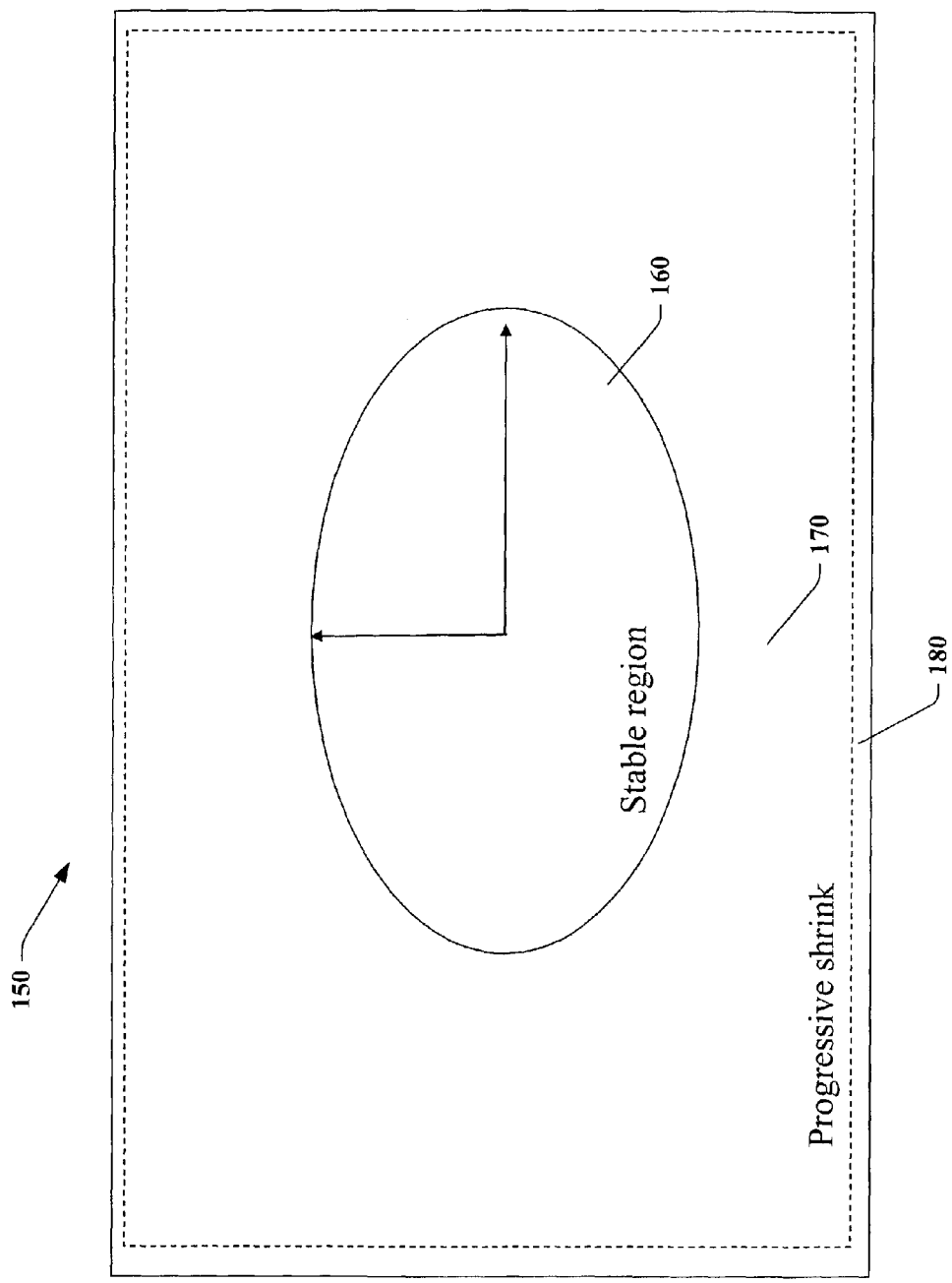
Figure 48:
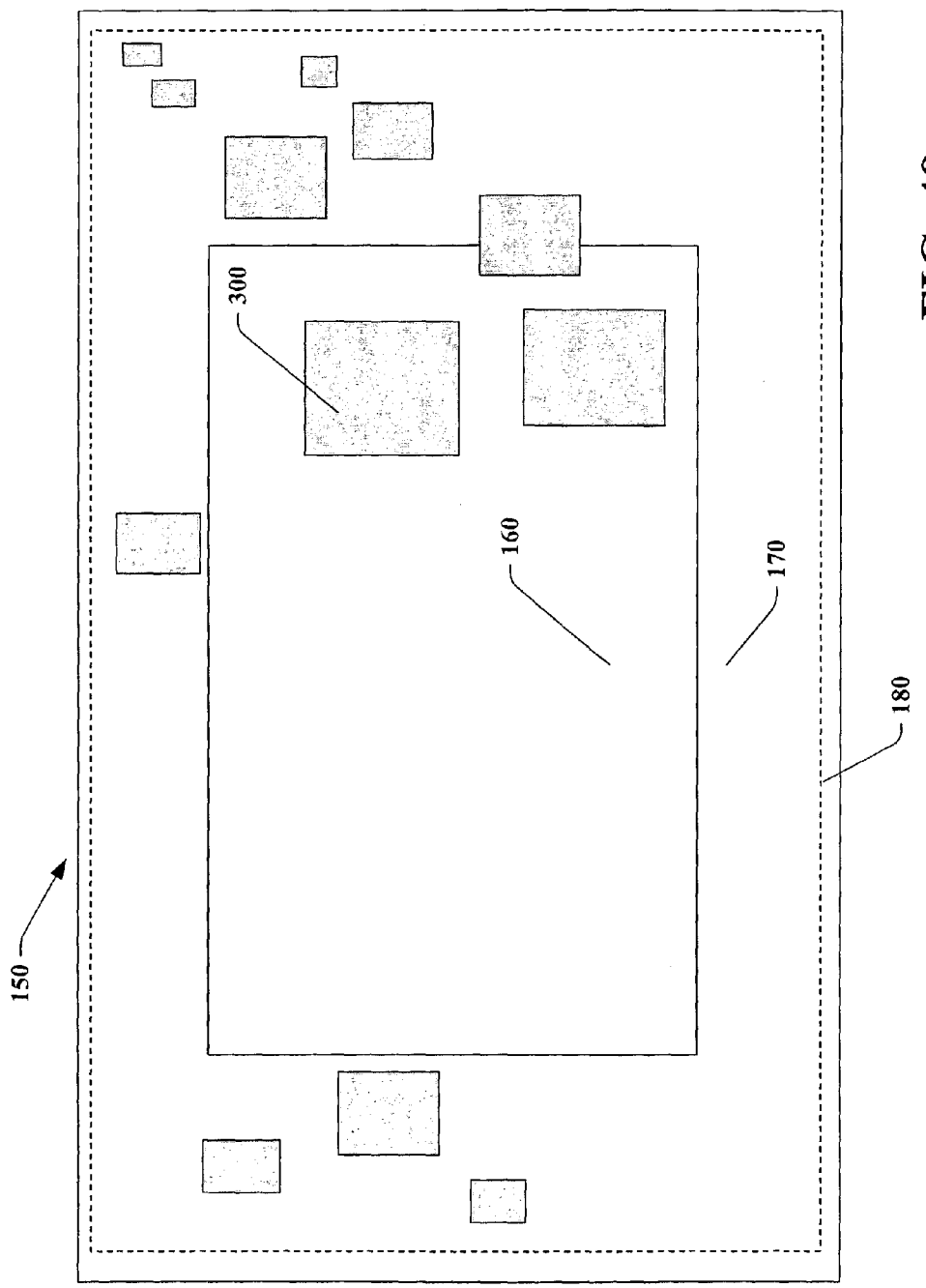
FIGS. 48-68 illustrate various aspects of the invention relating to modifying behavior of certain secondary objects as a function of modification to a primary object, and various embodiments for modifying behavior of display objects to facilitate a user experience in accordance with the subject invention.
Figure 49:
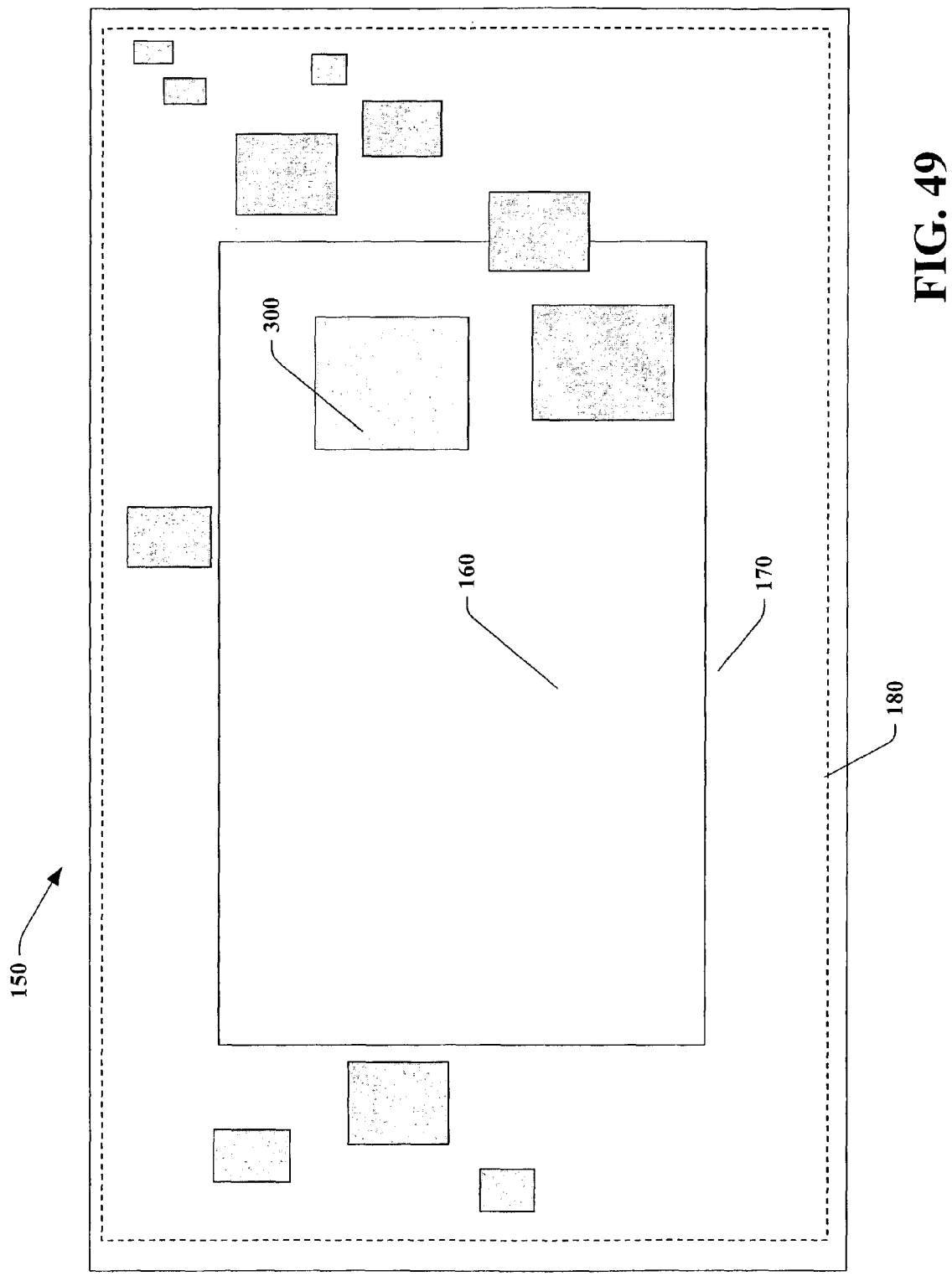
Figure 50:
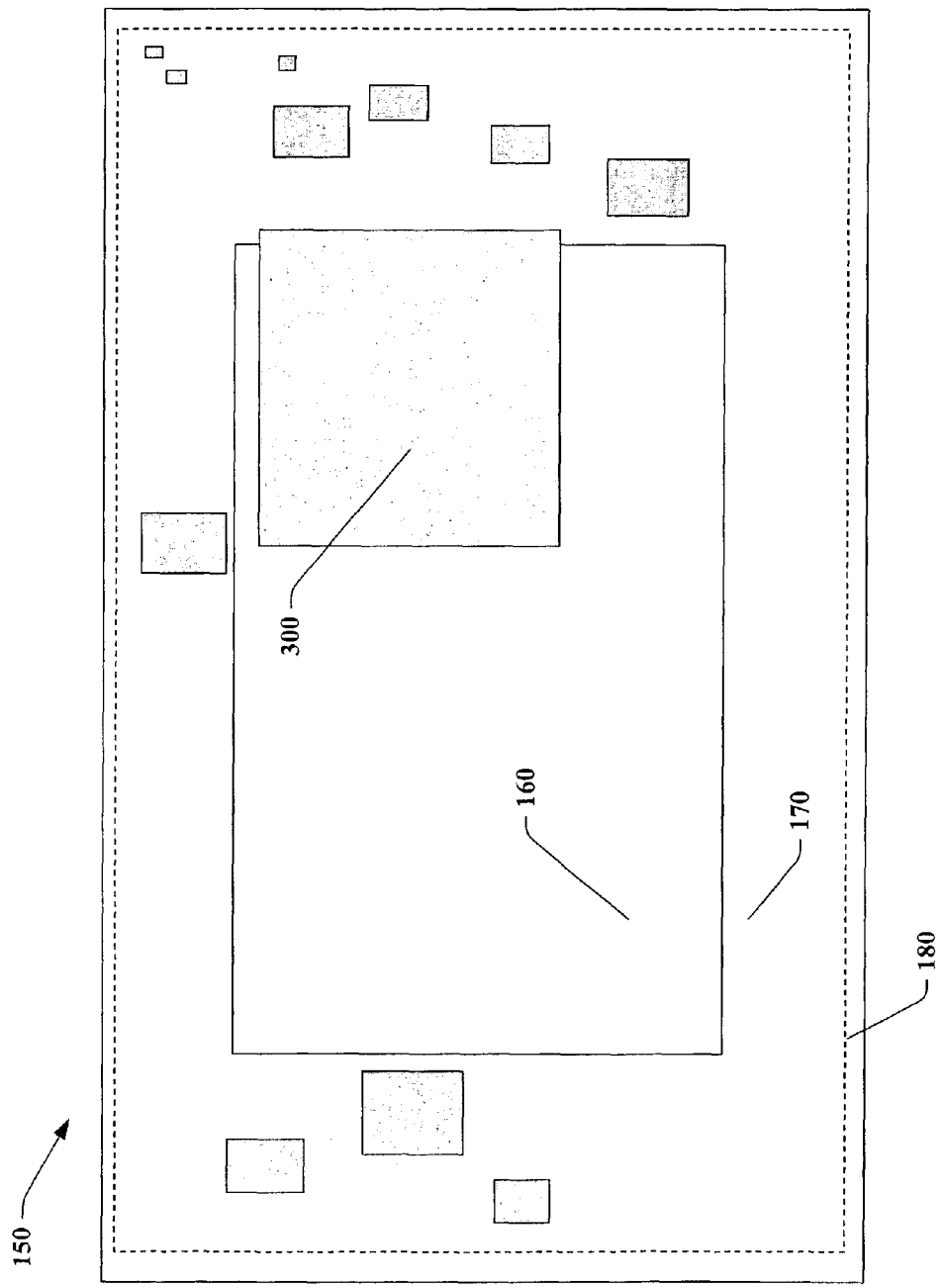
Figure 51:
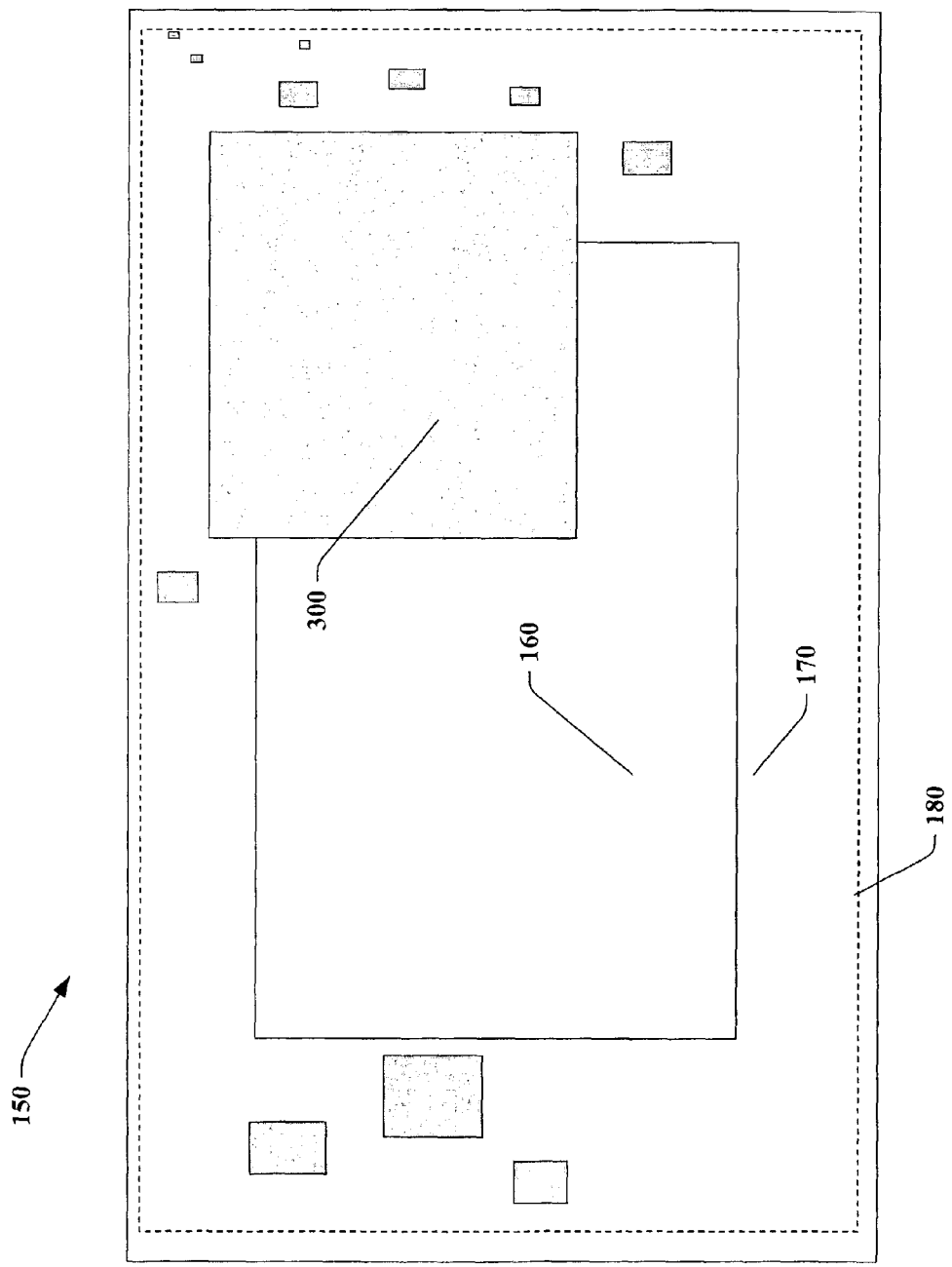

FIGS. 40-47 illustrate that the focus region 160 and/or progressive shrink region 170 as well as display space 150 can be selectively modified in size and/or shape. FIGS. 40 and 41 depict the focus region 160 being scalable in vertical and/or horizontal directions. Likewise, FIGS. 42 and 43 illustrate the progressive shrink region 170 being configurable in vertical and/or horizontal directions. FIGS. 44-47 illustrate that the geometry (e.g., square, rectangle, polygon, circle, ellipsoid, . . . ) of the focus region 160 and/or progressive shrink region 170 and/or display area 150 can be selectively configured in accordance with user preference(s). It is to be appreciated that the various sizes and/or geometries of the respective focus areal 60, progressive shrink area 170 and display area 150 can be automatically modified in accordance with a particular state of respective display objects and/or user tasks and/or inferred goals.

FIGS. 48-66 illustrate an aspect of the subject invention such that modification to a primary display object 300 results in modification to various secondary objects 310 so as to make efficient use of the display space and enhance a UI experience via the subject invention. More particularly, and for example, FIGS. 48-51 depict the display object 300 being modified (e.g., increased in size), and by doing so, other secondary display objects are modified (e.g., reduced in size, displaced on screen, change in refresh rate or activity, change in display of sub-objects . . . ) in accordance with the modifications to the primary display object 300. It is to be appreciated that any suitable optimization protocol can be employed so as to define such modification behavior to secondary objects vis a vis modifications to a primary object. For example, various metrics can be employed such as for example, state of display objects, state of user, goals of user, prioritization of display objects, historical data relating to prior user activity, inferred goals of a user, utility-based analysis. It is to be appreciated that the aforementioned discussion relating to object and/or cluster occlusion avoidance behavior is applicable to the subject invention as depicted in connection with these figures.

Figure 52:
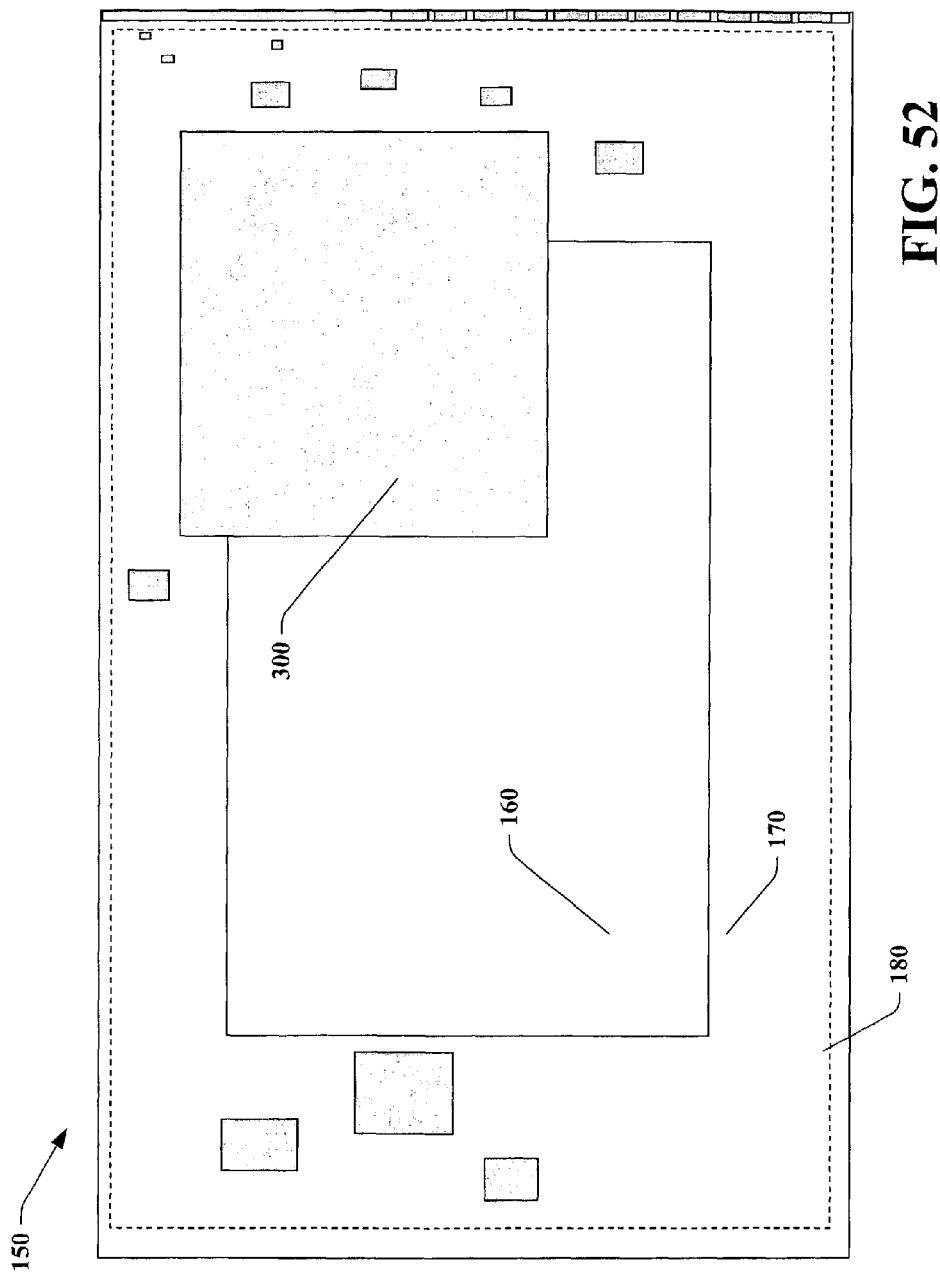
Figure 53:
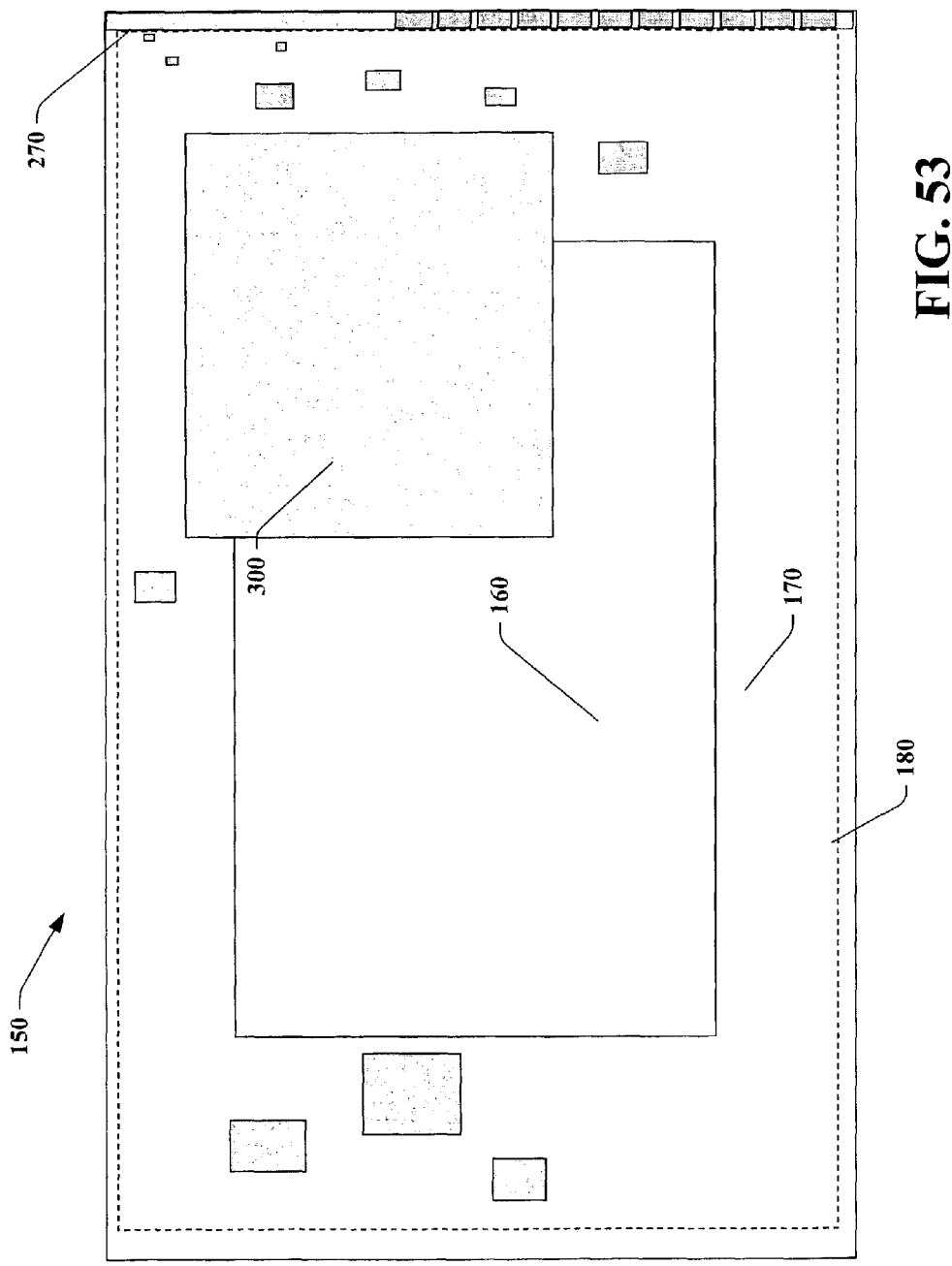
Figure 54:
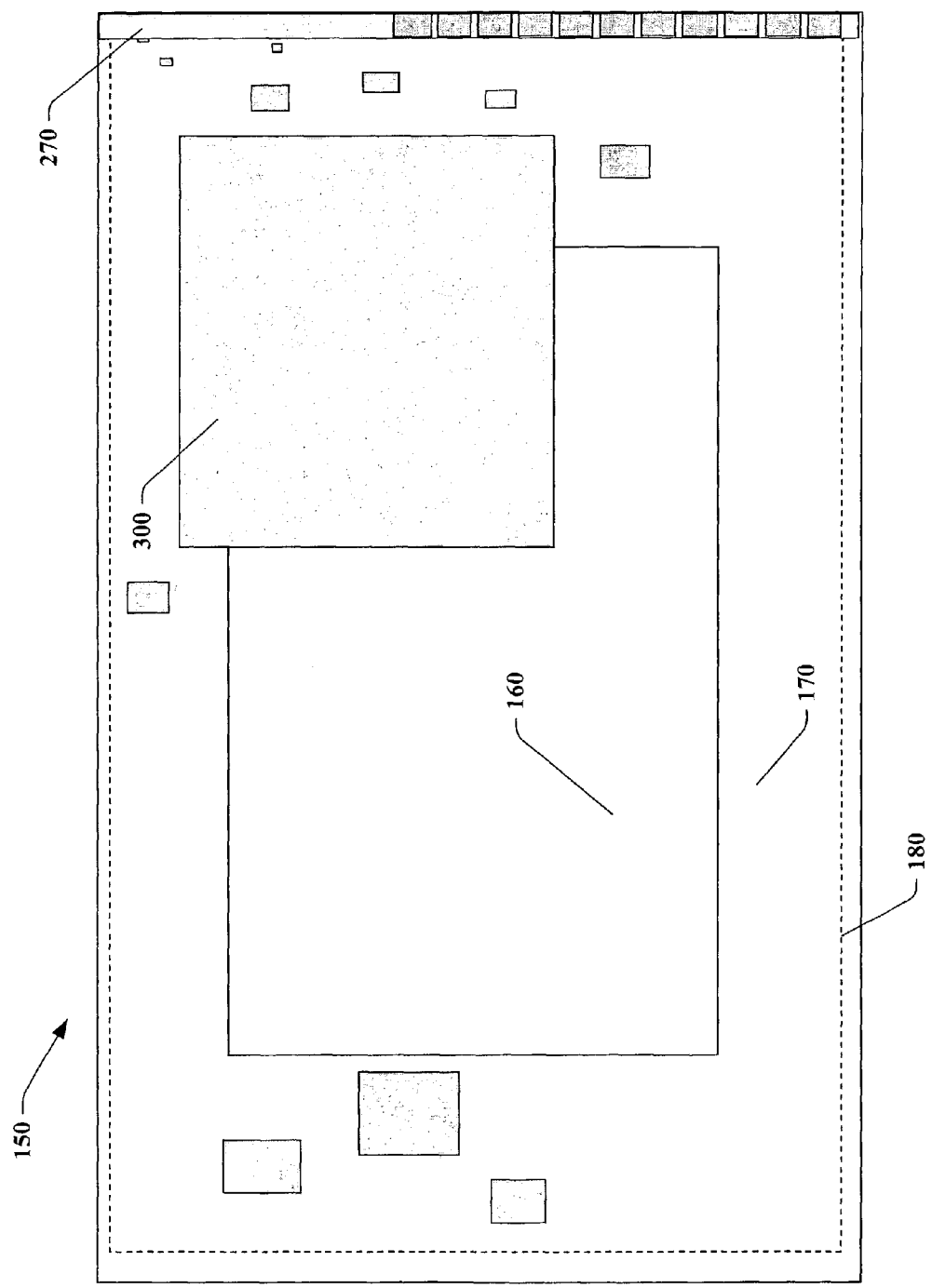
Figure 55:
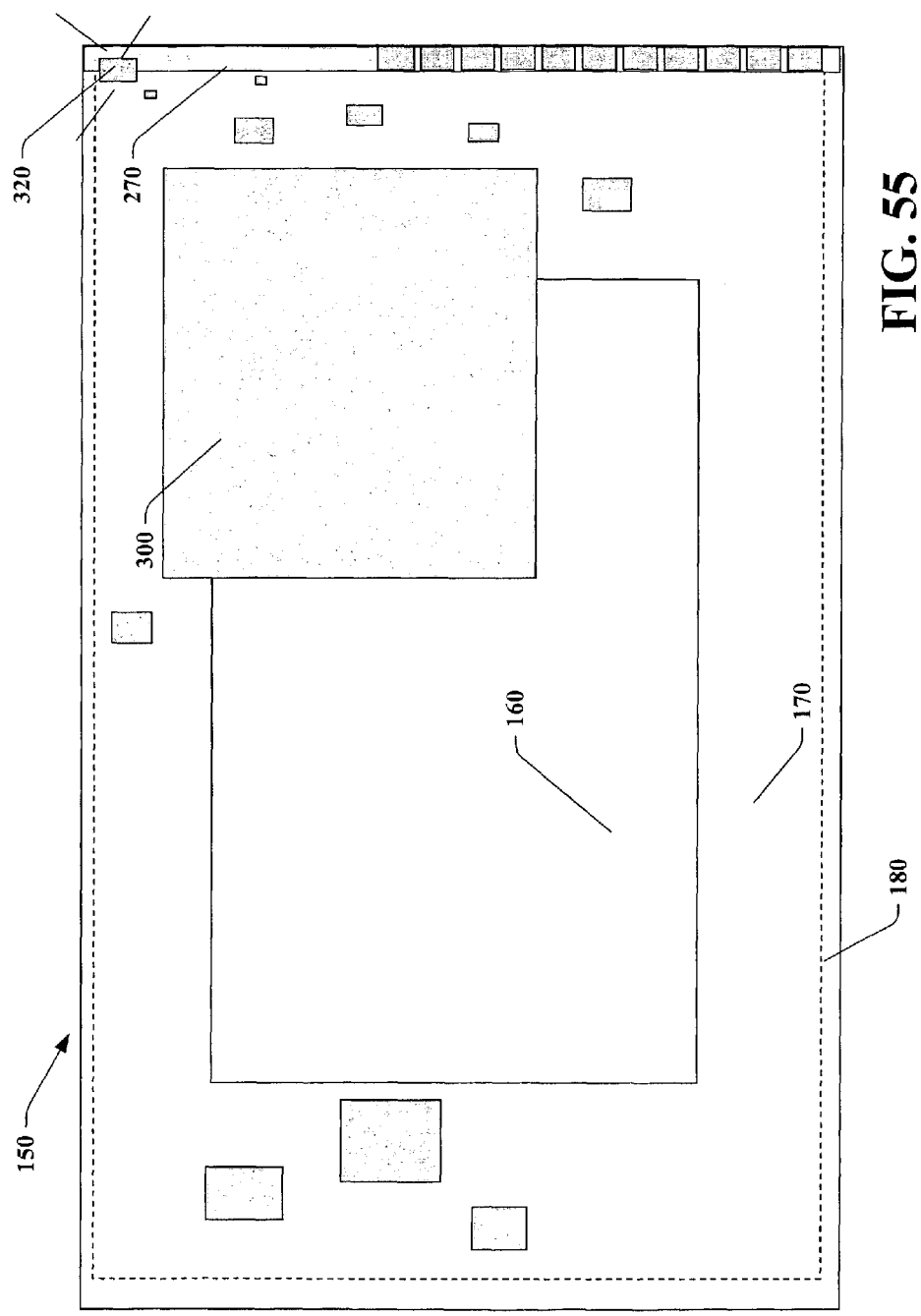
Figure 56:
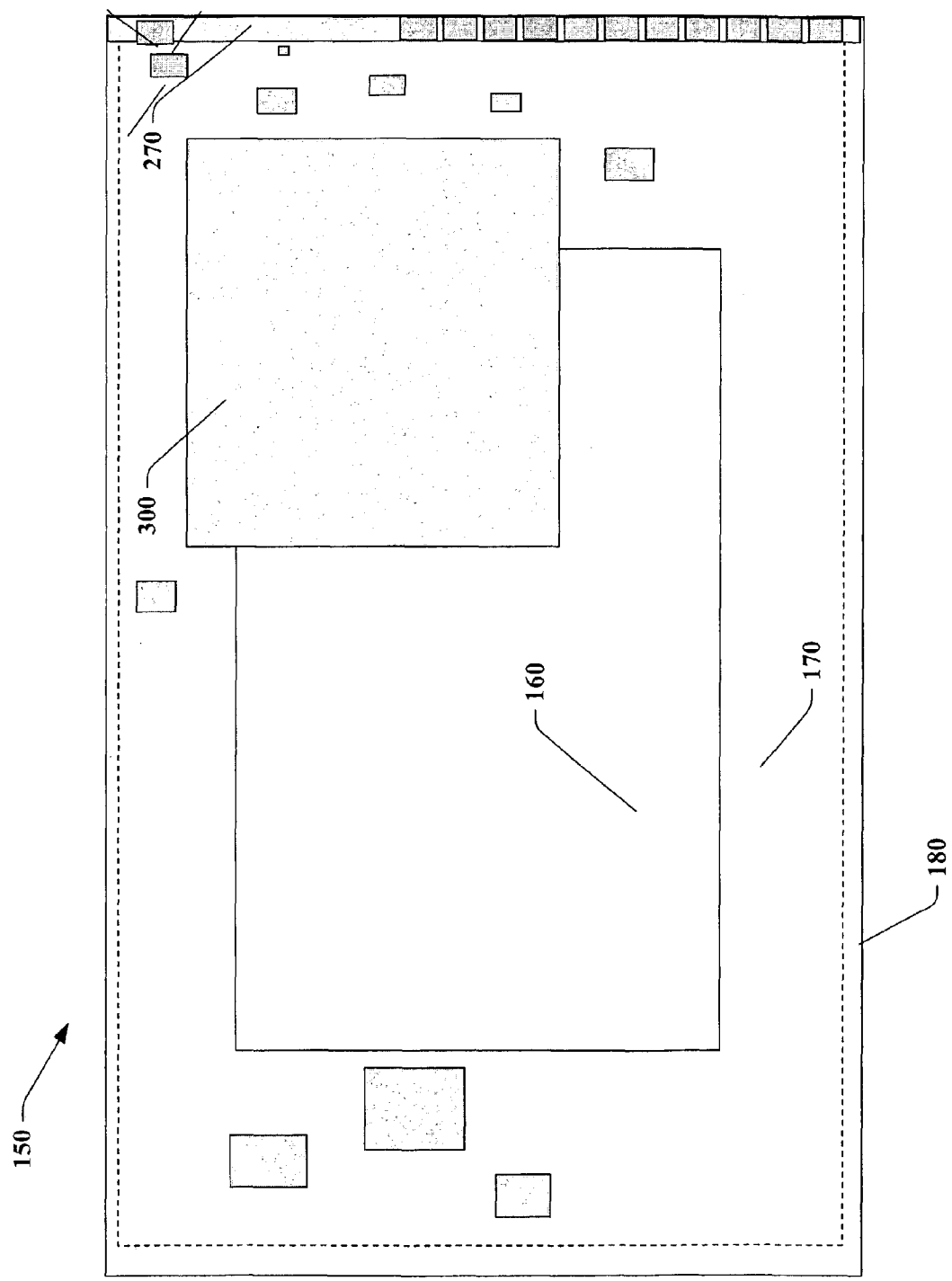
Figure 57:
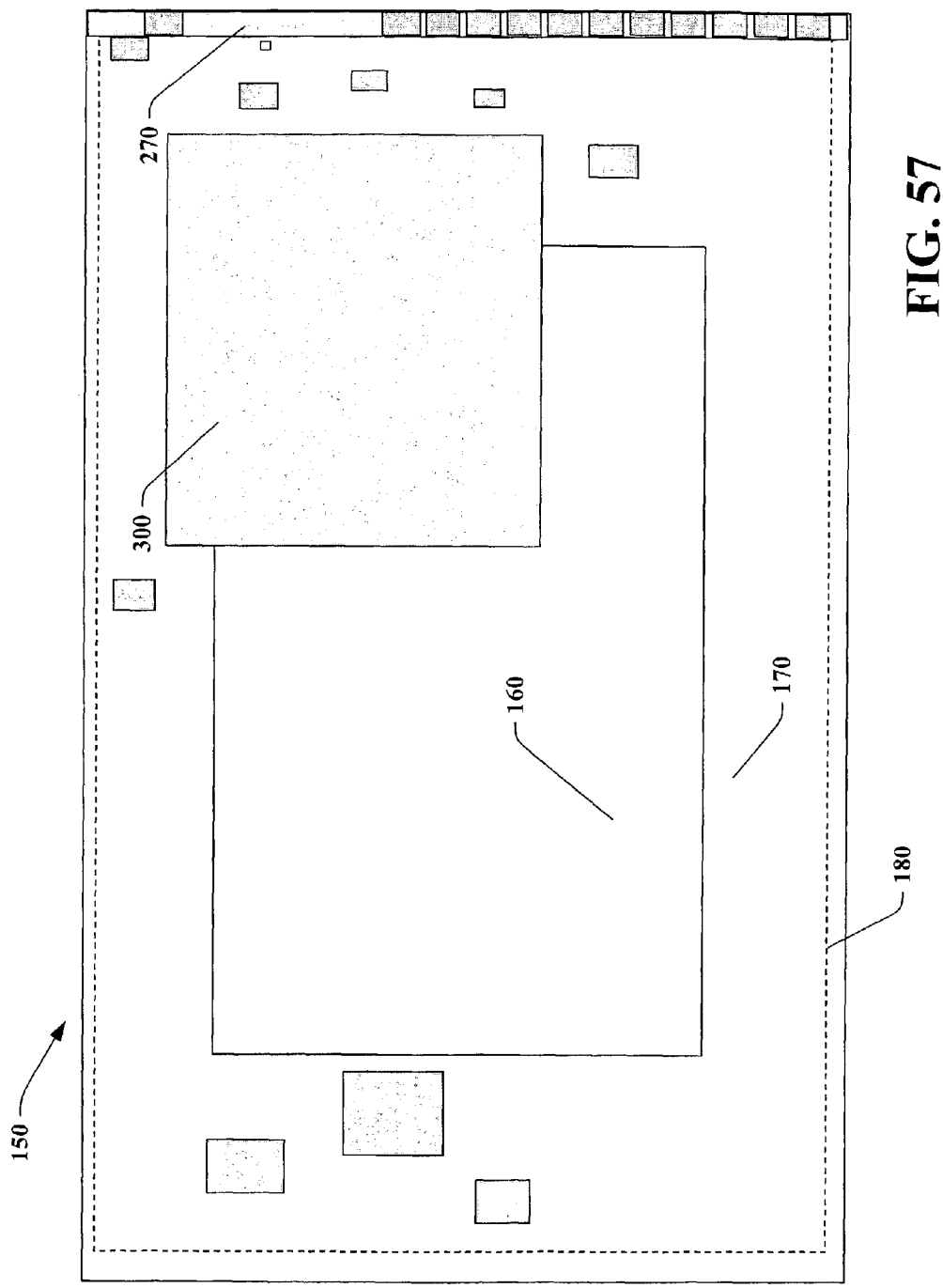
Figure 58:
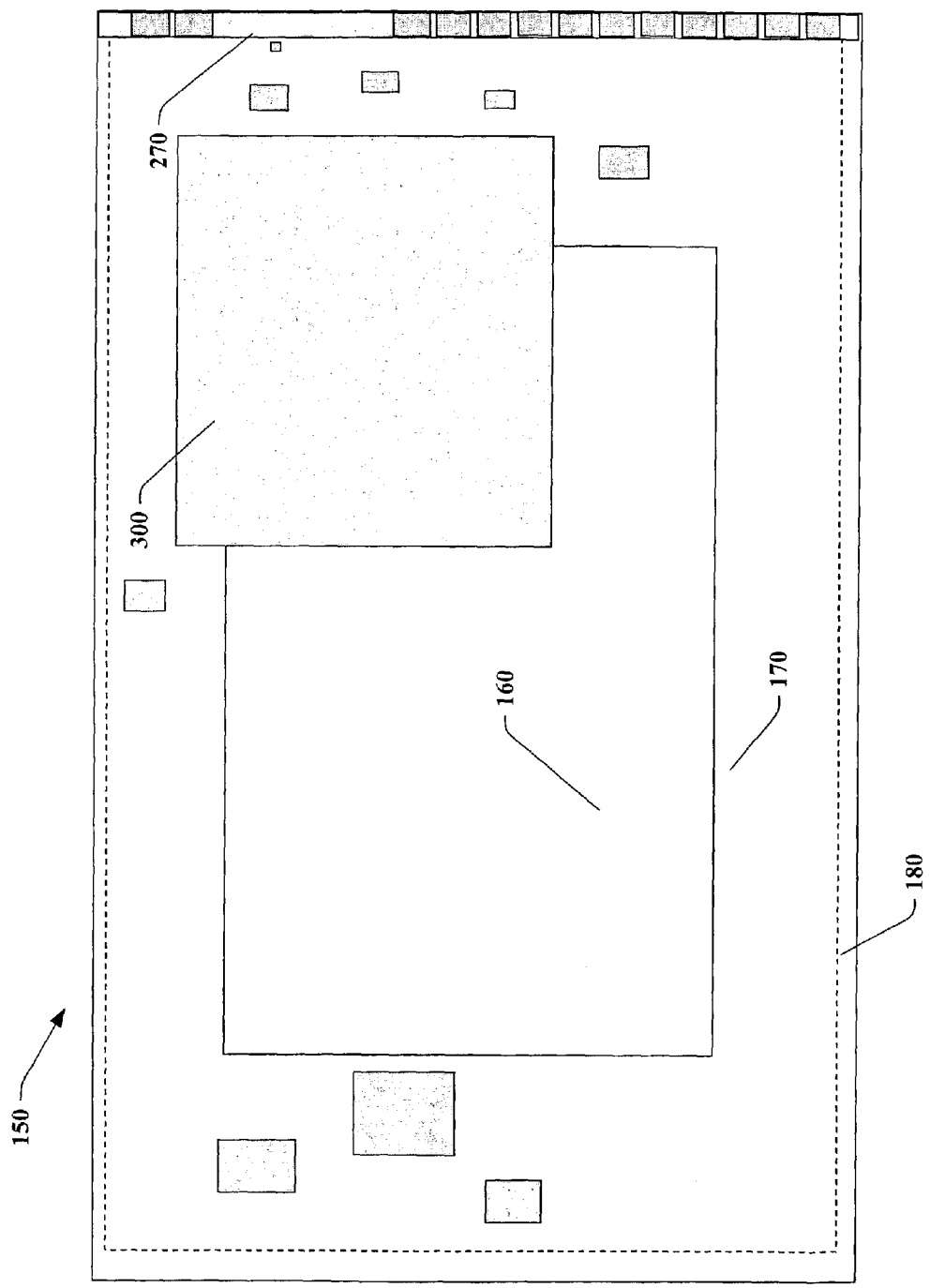
Figure 59:
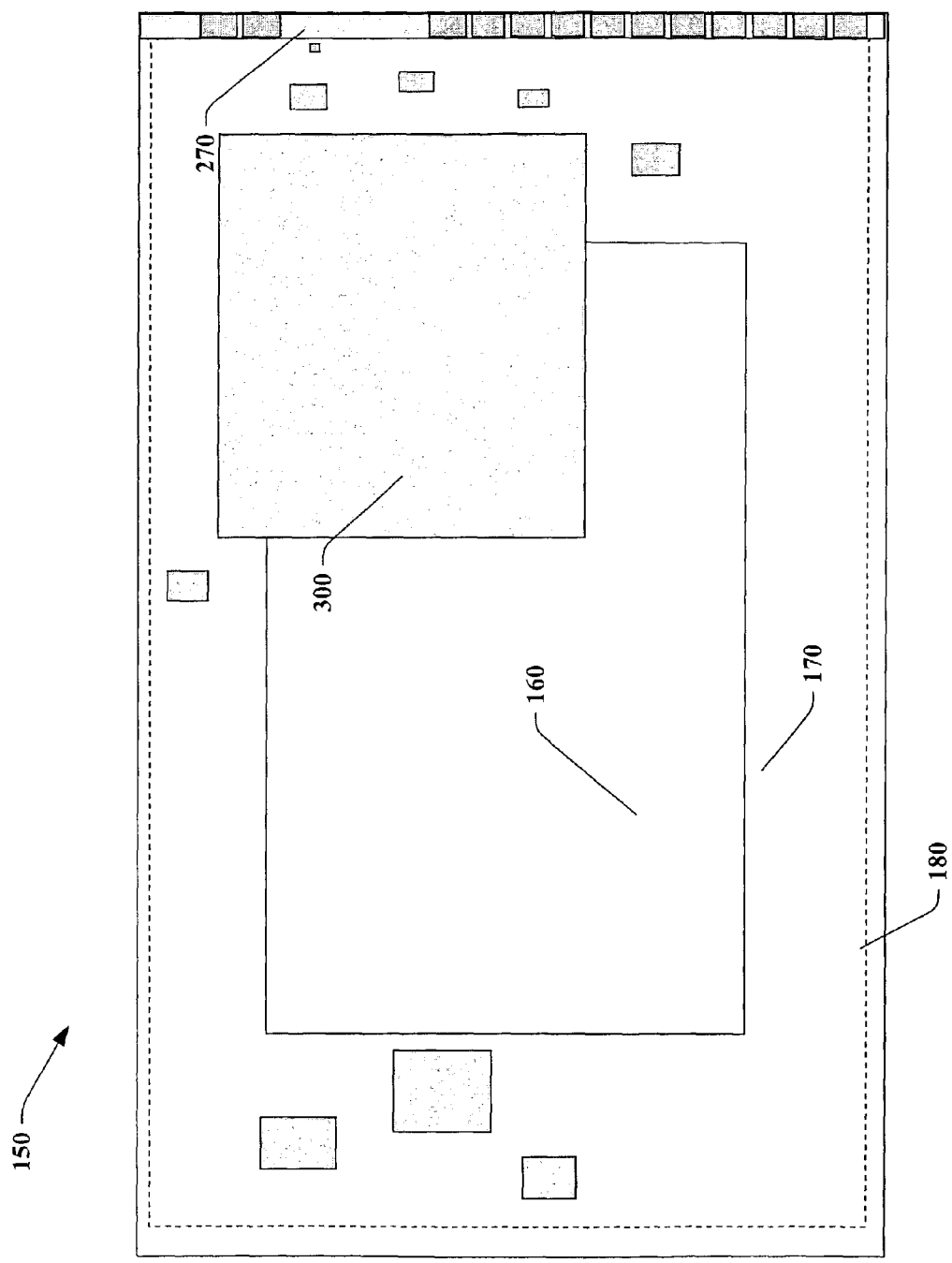
Figure 60:
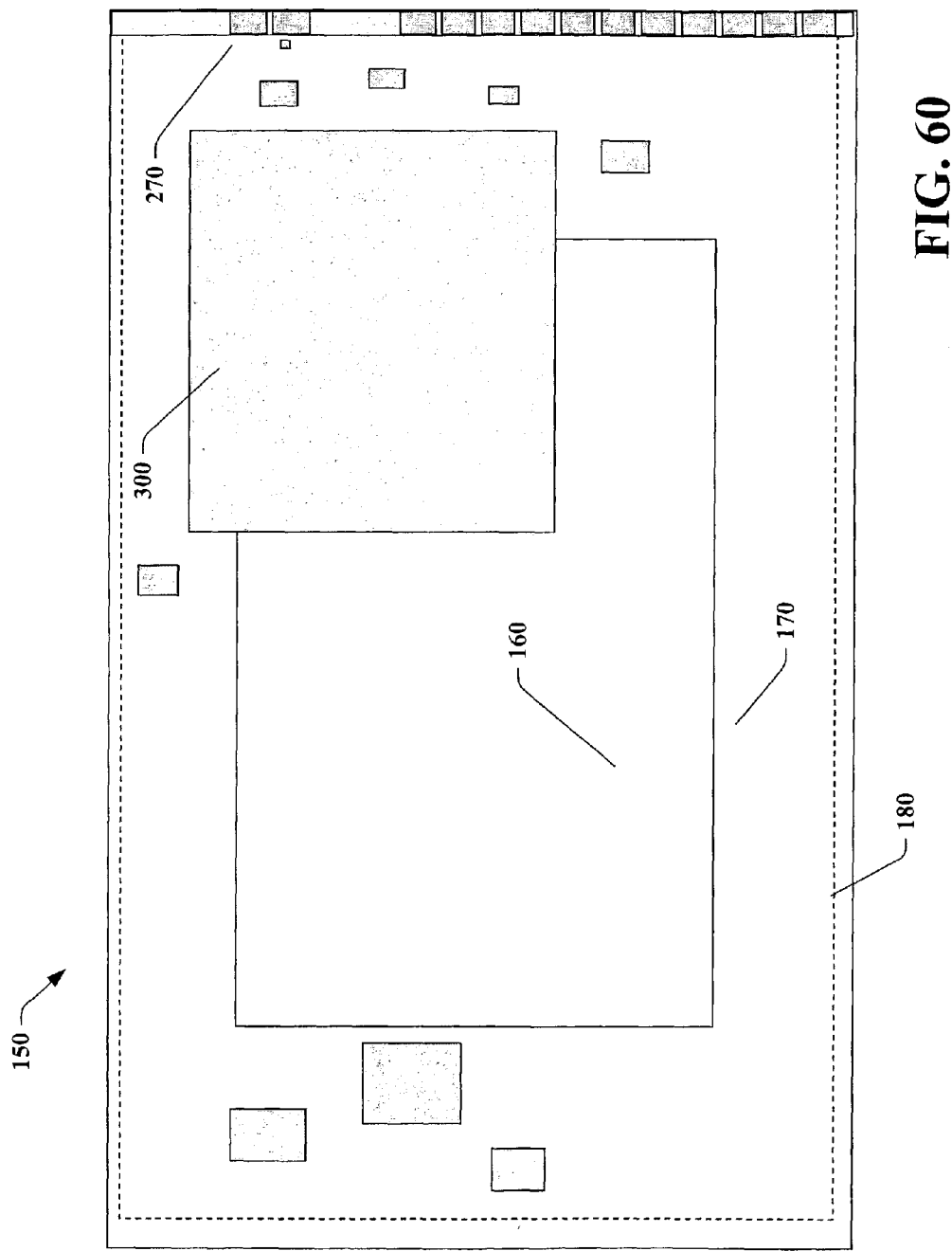
Figure 61:
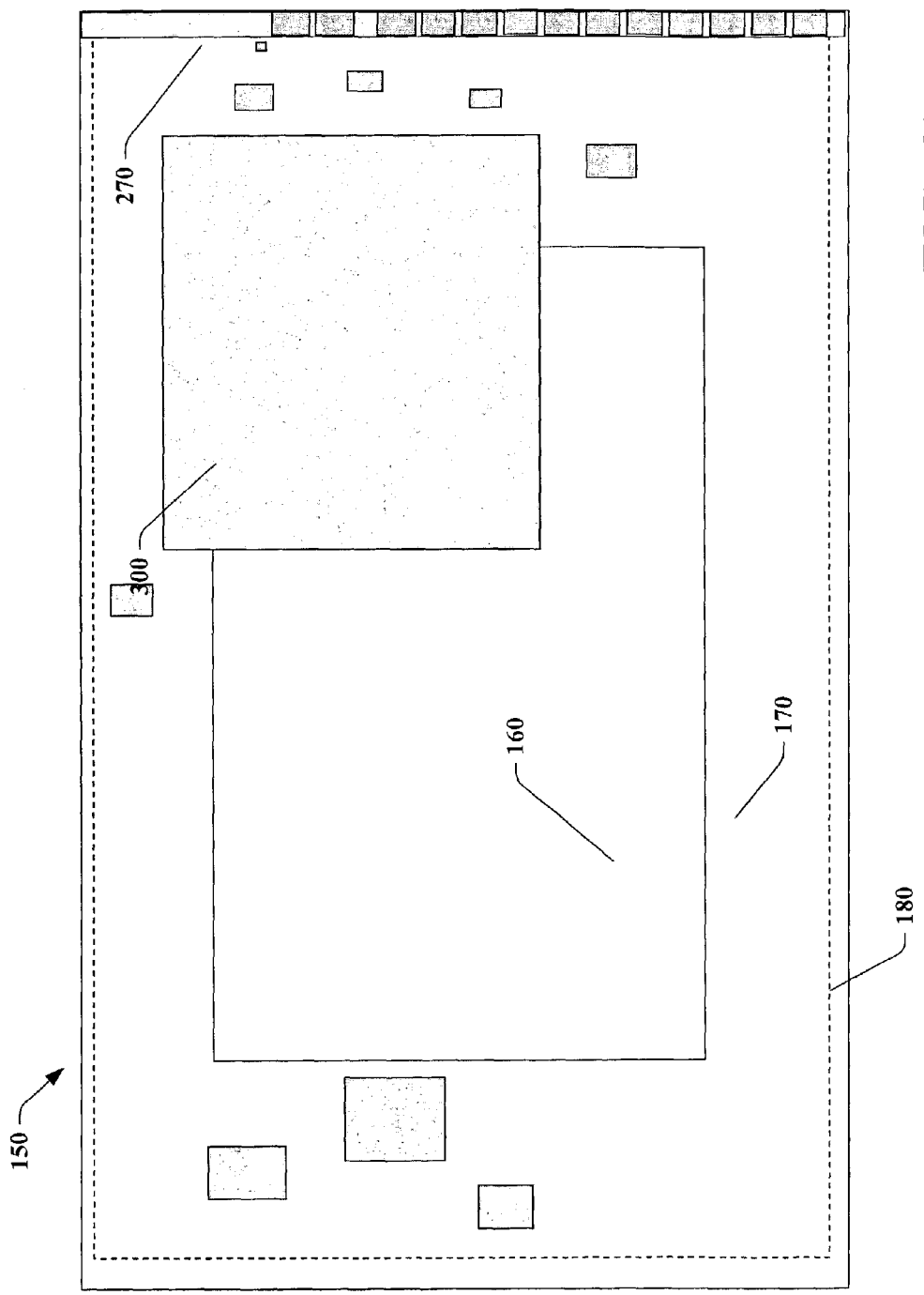
Figure 62:
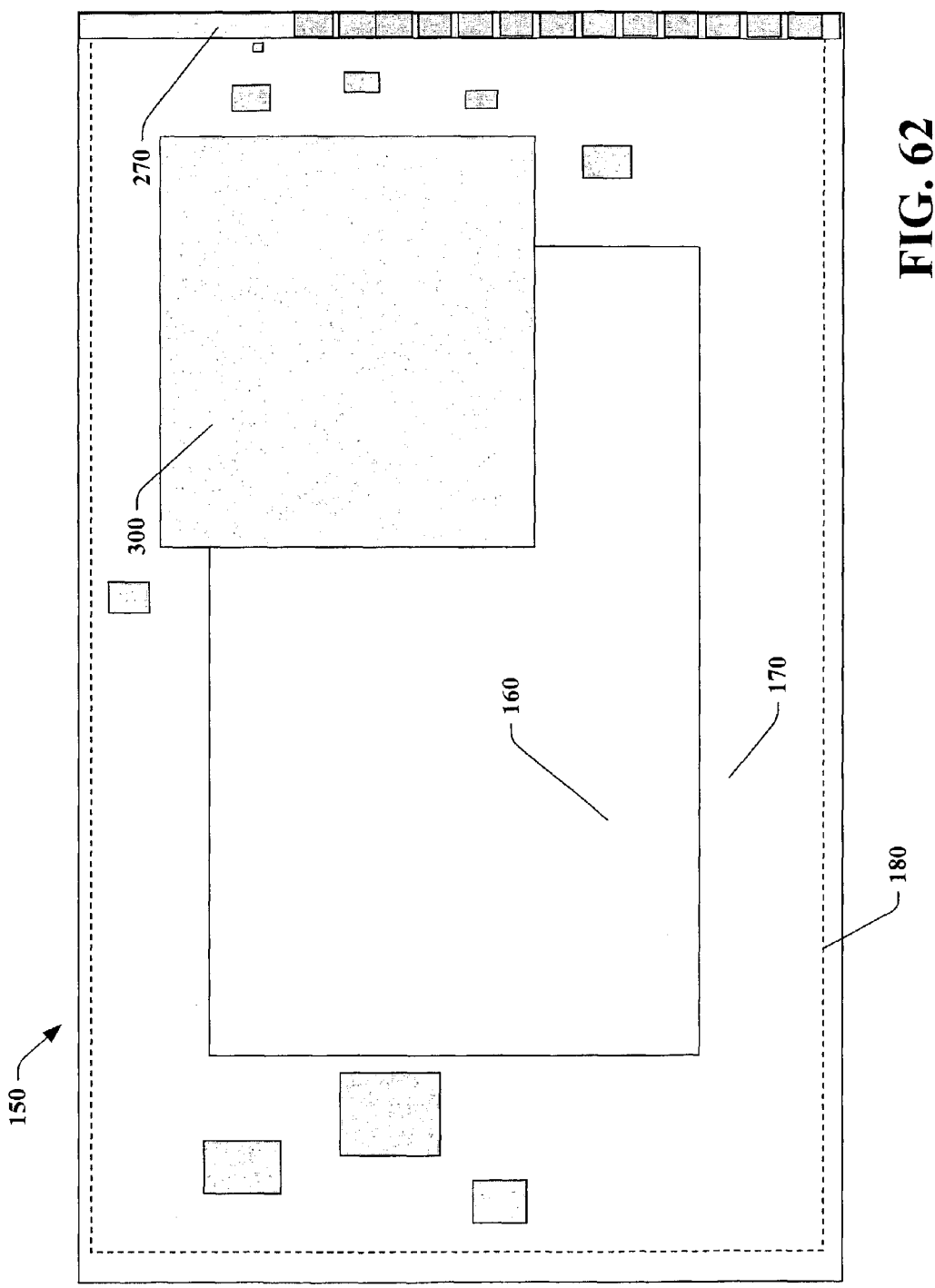
Figure 63:
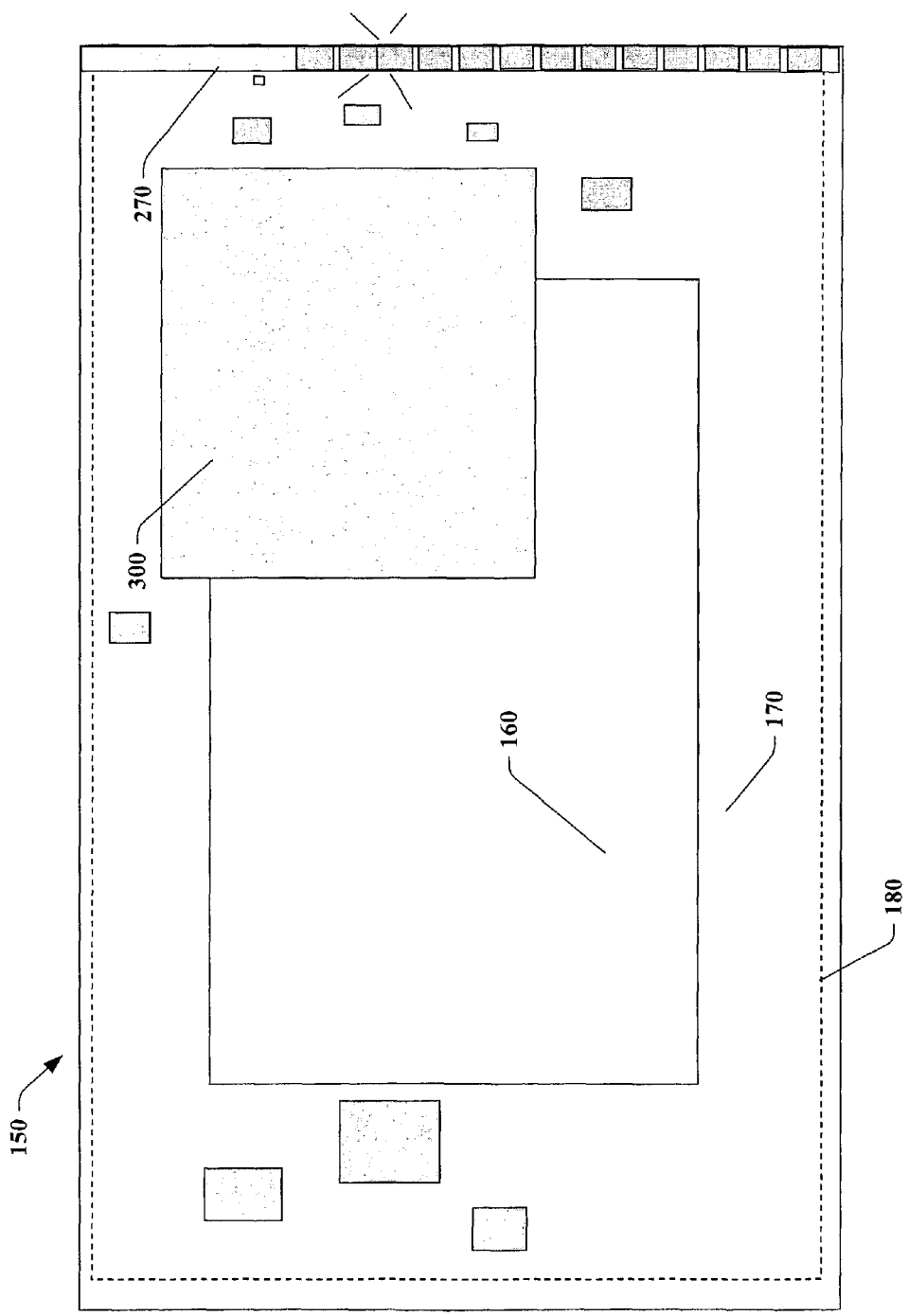
Figure 64:
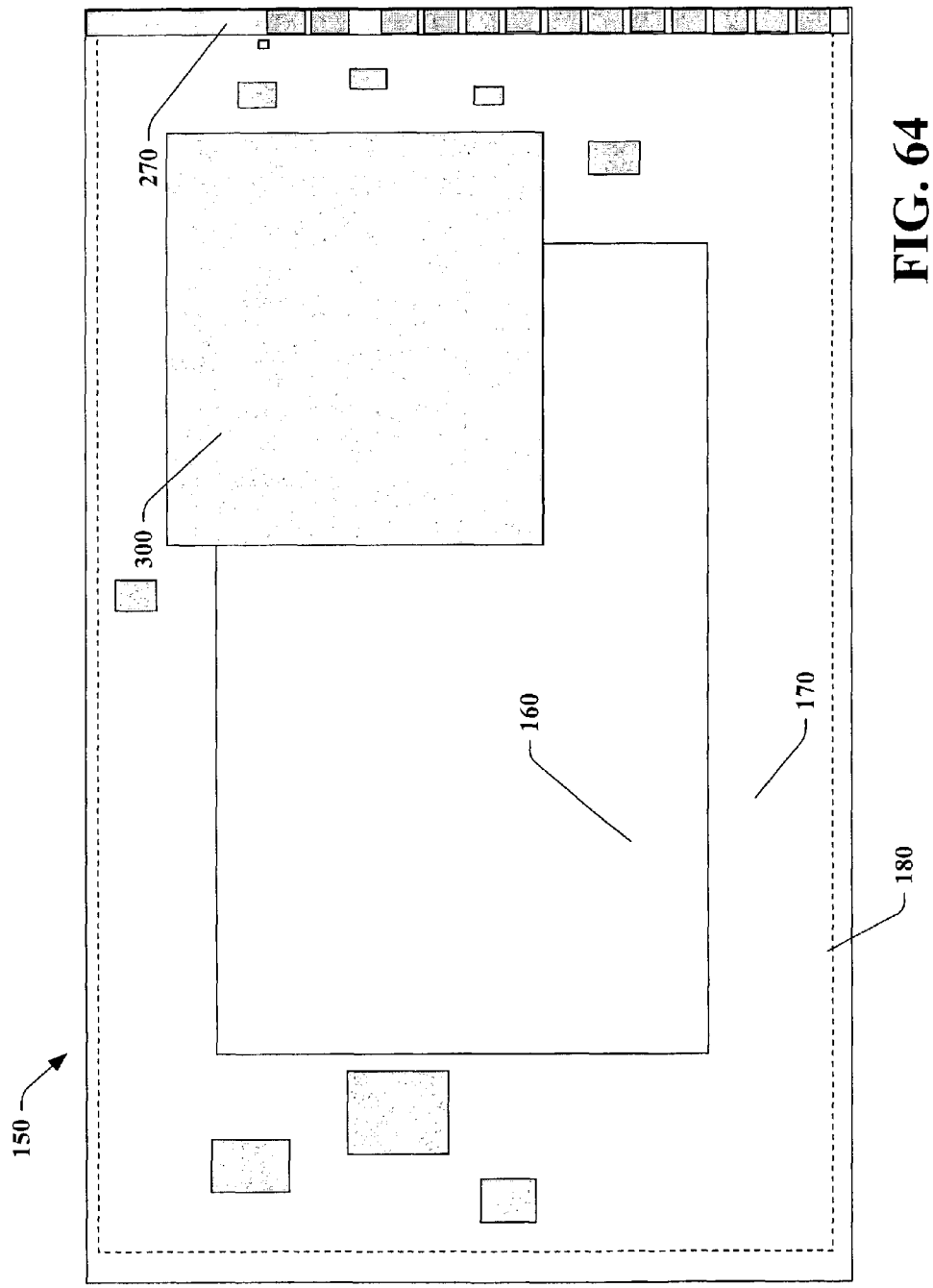
Figure 65:
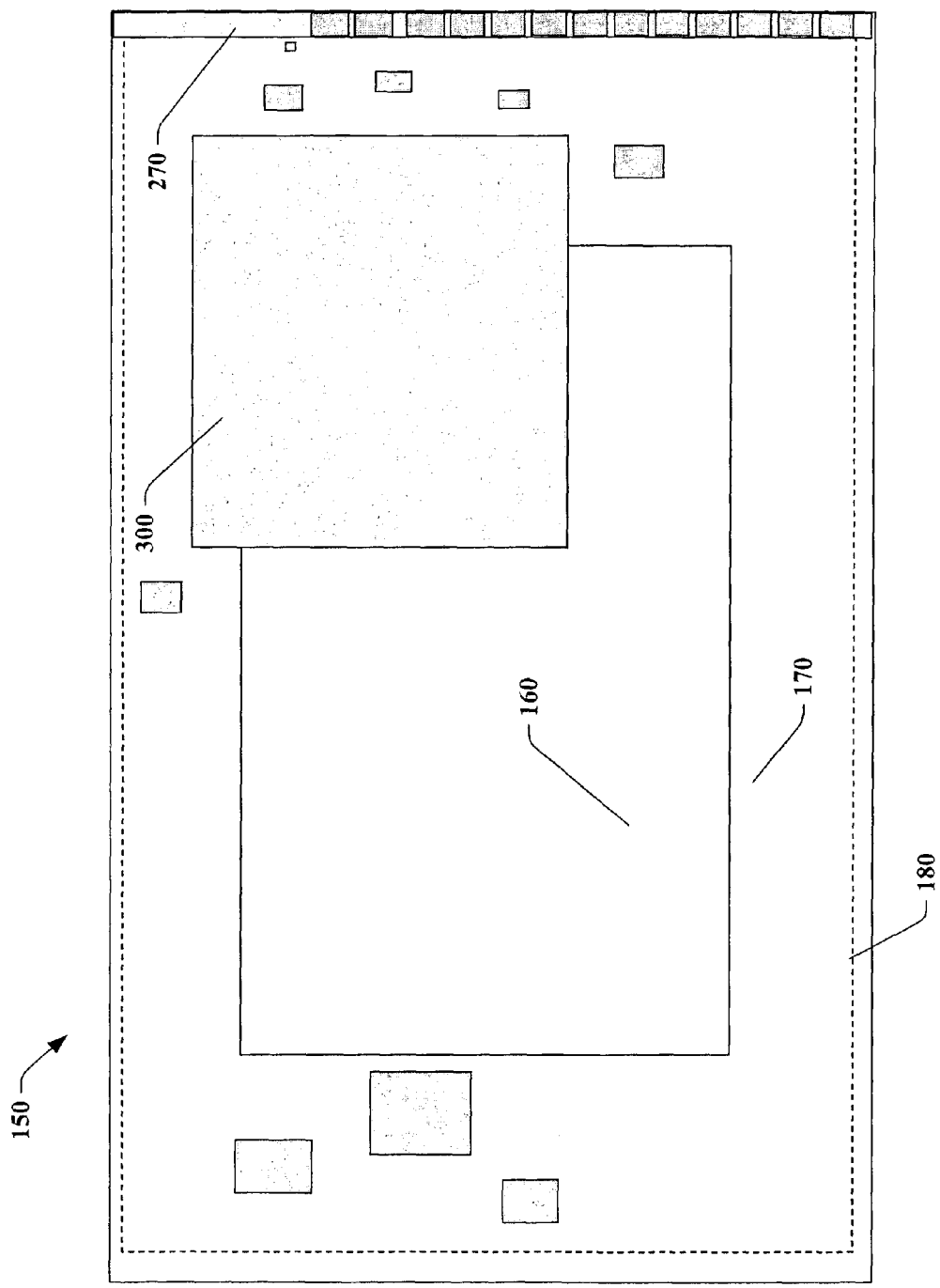
Figure 66:
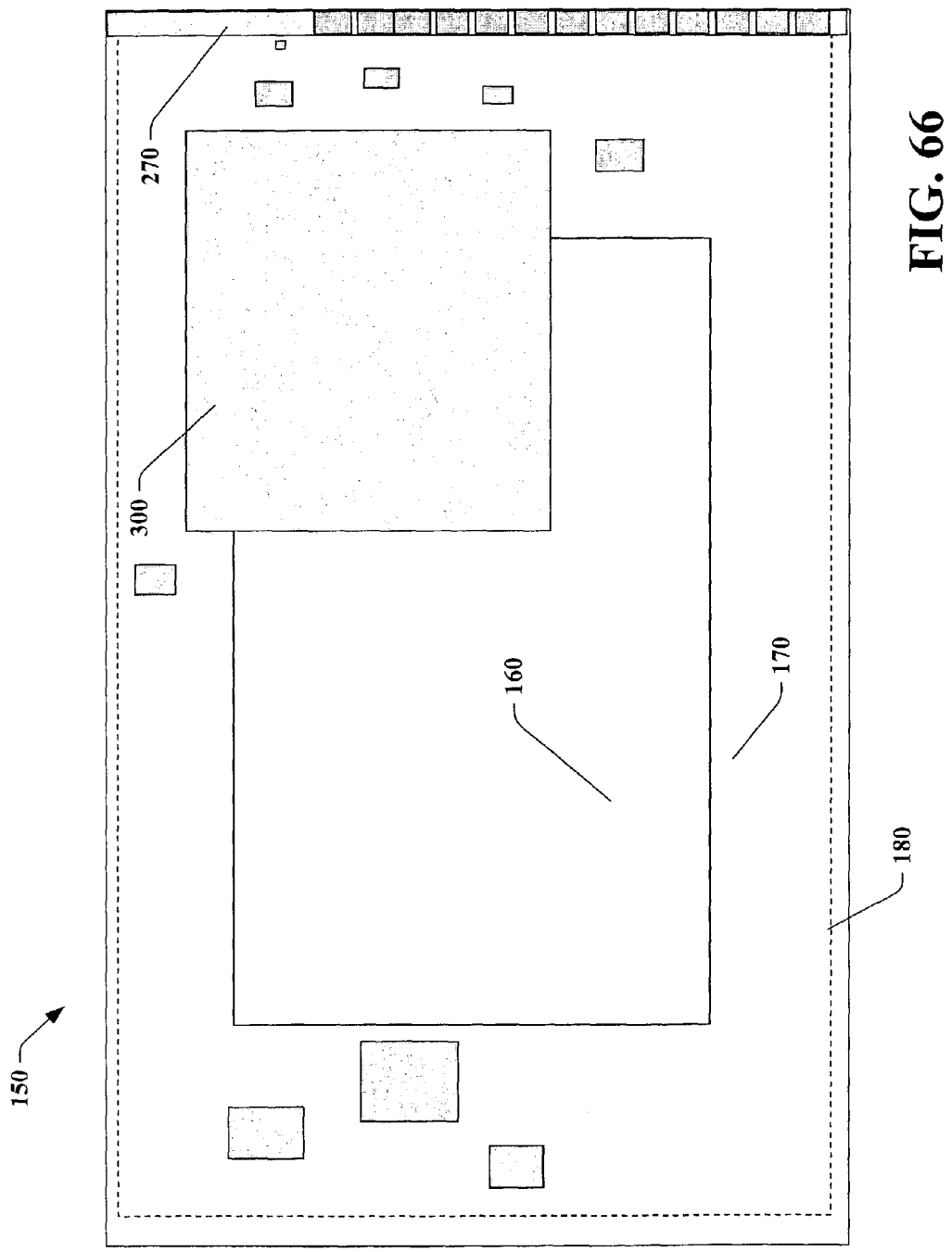
Figure 67:
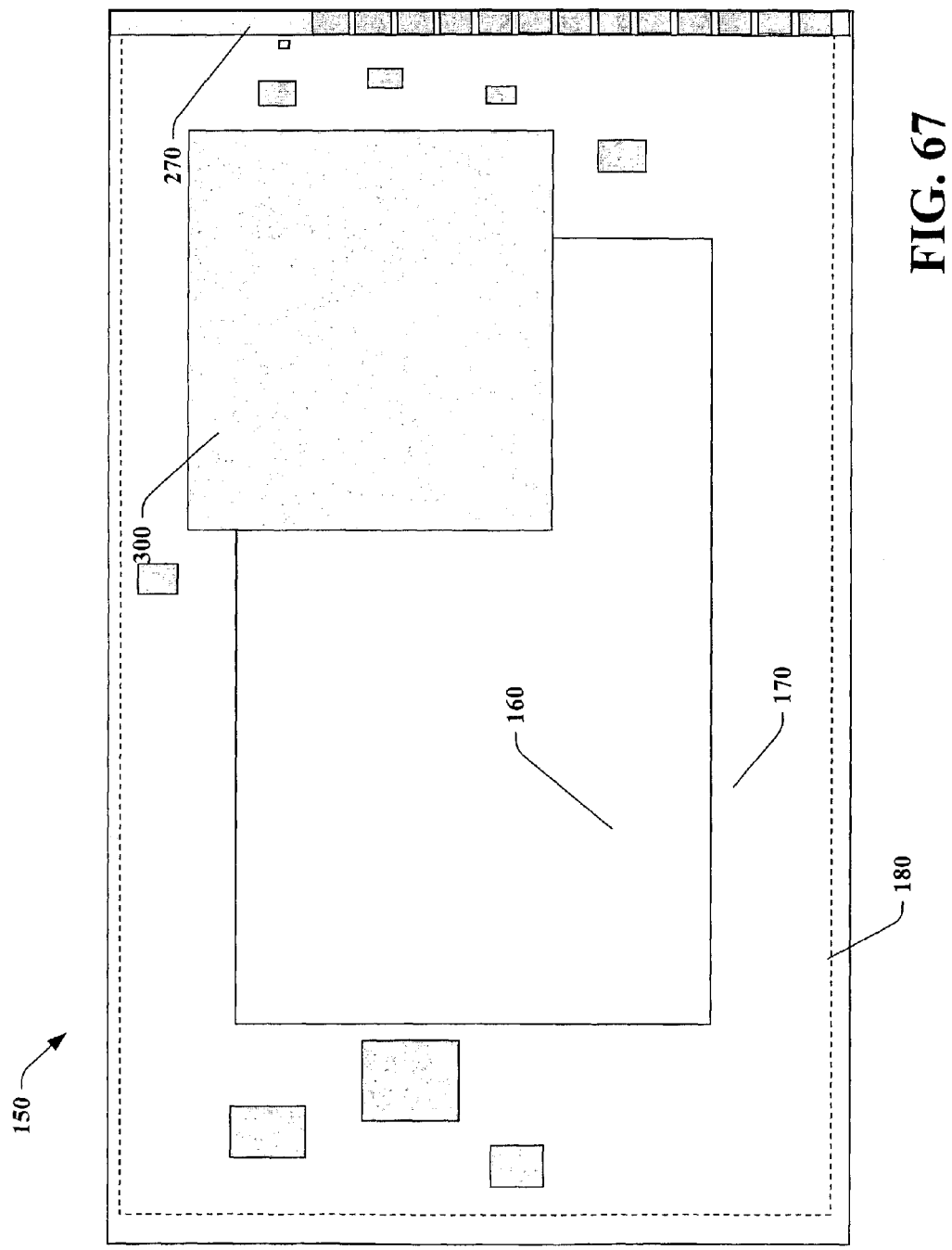
Figure 68:
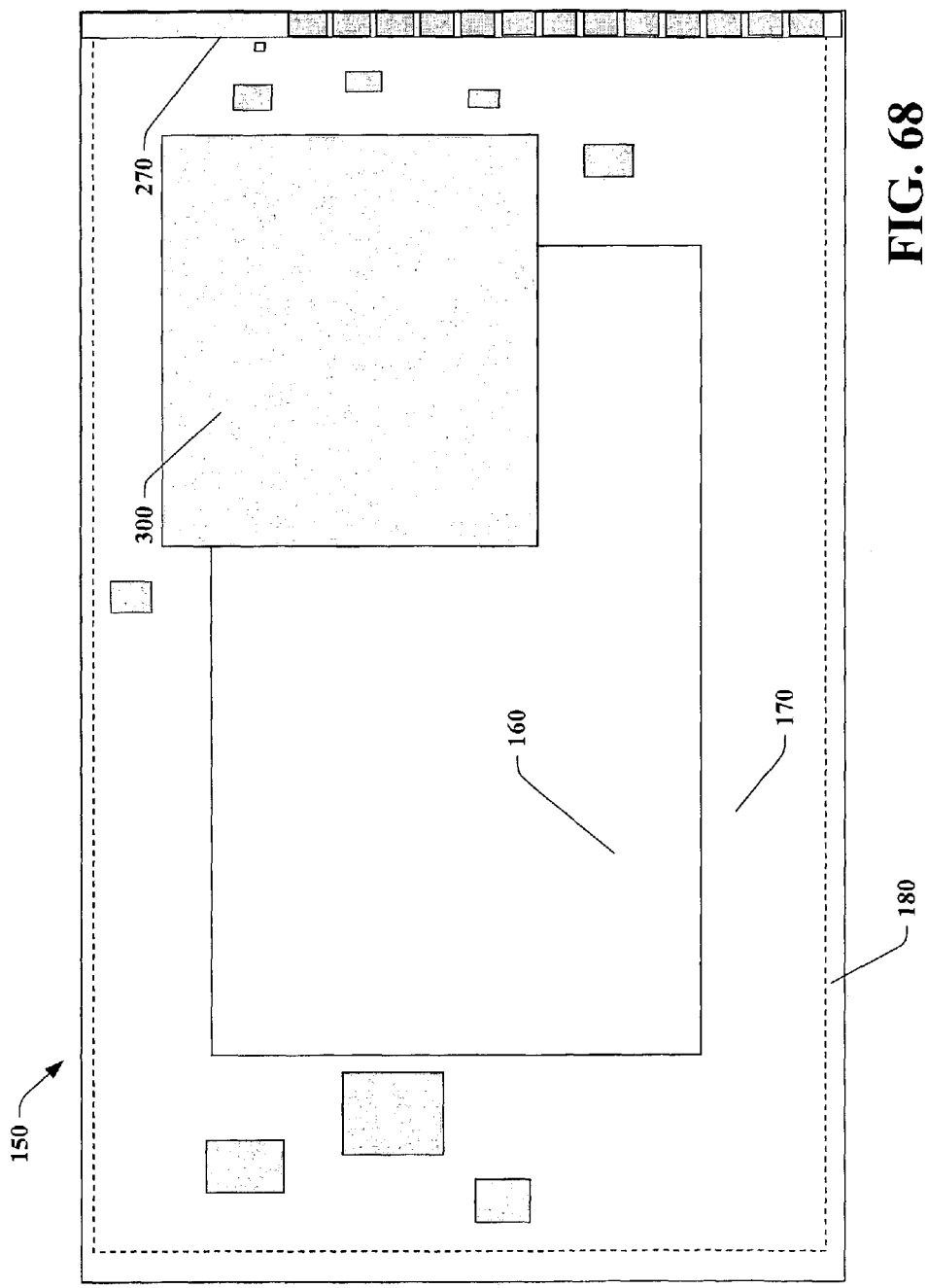

FIGS. 52-54 illustrate that when an object reaches the edge 180, the side bar 270 can automatically reappear (e.g., unhide). FIGS. 55-68 illustrate that as the display object 300 is reduced in size, behavior of the secondary display objects can be modified as well (e.g., reverse modification so as to progressively revert to earlier state). It is also to be appreciated that various animated techniques (e.g., display object rebounding, bouncing . . . ) can be effected via the subject invention so as to enhance a user experience.

Figure 69:
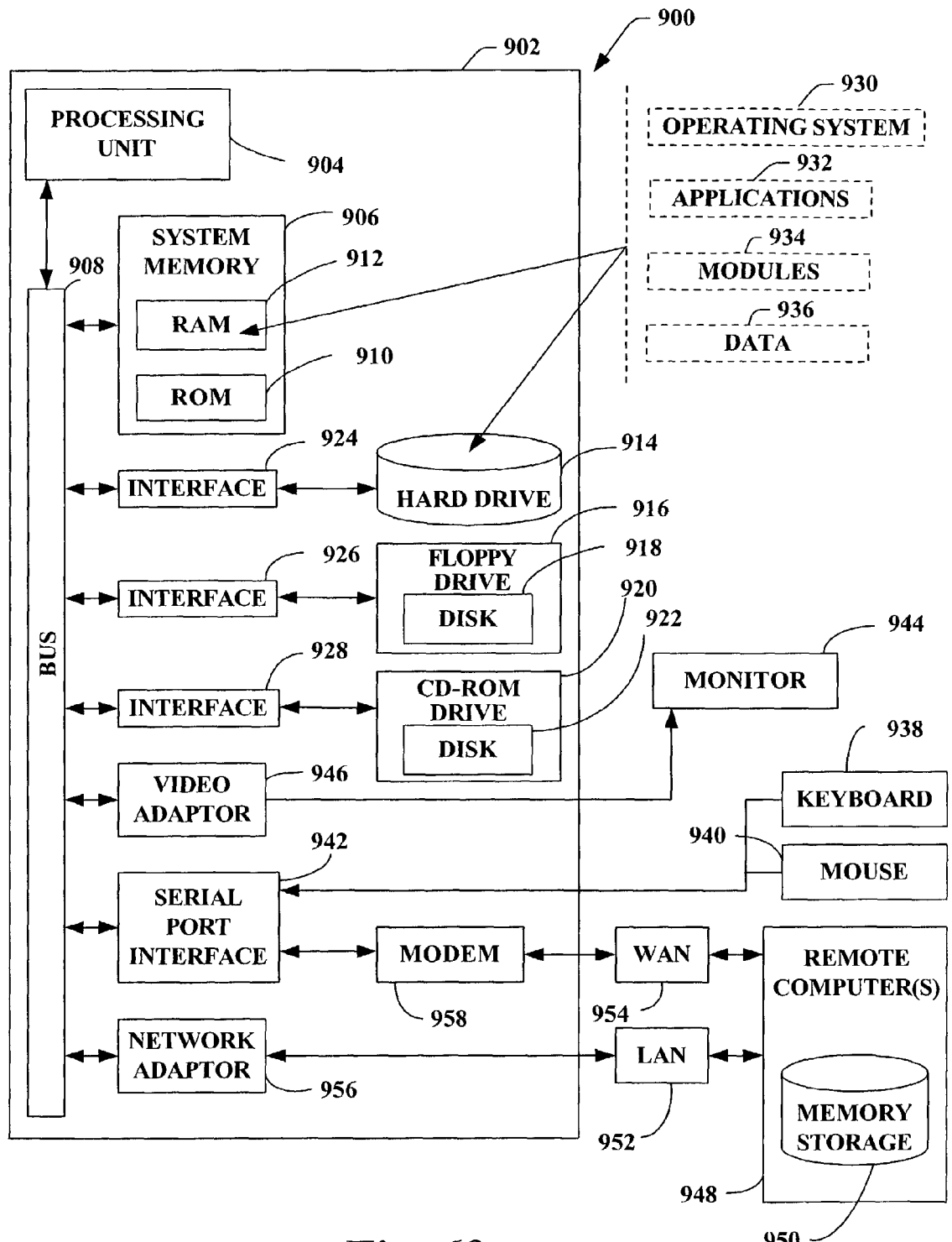
FIG. 69 illustrates a block diagram of a computer operable to execute the disclosed architecture.

Referring now to FIG. 69, there is illustrated a block diagram of a computer operable to execute the disclosed architecture. In order to provide additional context for various aspects of the present invention, FIG. 69 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 69, the exemplary environment 900 for implementing various aspects of the invention includes a computer 902, the computer 902 including a processing unit 904, a system memory 906 and a system bus 908. The system bus 908 couples system components including, but not limited to the system memory 906 to the processing unit 904. The processing unit 904 may be any of various commercially available processors. Dual microprocessors and other multi-processor architectures also can be employed as the processing unit 904.

The system bus 908 can be any of several types of bus structure including a memory bus or memory controller, a peripheral bus and a local bus using any of a variety of commercially available bus architectures. The system memory 906 includes read only memory (ROM) 910 and random access memory (RAM) 912. A basic input/output system (BIOS), containing the basic routines that help to transfer information between elements within the computer 902, such as during start-up, is stored in the ROM 910.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other optical media). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934 and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a LAN 952 and a WAN 954. Such networking environments are commonplace in offices, enterprise-wide computer networks, intranets and the Internet.

When used in a LAN networking environment, the computer 902 is connected to the local network 952 through a network interface or adapter 956. When used in a WAN networking environment, the computer 902 typically includes a modem 958, or is connected to a communications server on the LAN, or has other means for establishing communications over the WAN 954, such as the Internet. The modem 958, which may be internal or external, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates multi-tasking in a computing environment, comprising:
    a display space that presents one or more interactive window objects;
    a focus area component that defines:
        a focus area occupied within the display space;
        a progressive shrink area occupied within the display space; and
        a boundary that separates the focus area and the progressive shrink area;
    a scaling component that scales an interactive window object as a function of proximity to the boundary, the scaling of the interactive window object being initiated responsive to an instruction to move the interactive window object from the focus area to the progressive shrink area within the display space ; and
    a behavior component that regulates behavior of the interactive window object dependent on whether the interactive window object is displayed in the focus area or the progressive shrink area, wherein the interactive window object exhibits standard behavior when displayed in the focus area.

2. The system of claim 1, wherein the scaling component scales down the interactive window object from a first display size to a second display size smaller than the first display size as the interactive window object moves from the focus area to the progressive shrink area.

3. The system of claim 1, the behavior component regulating a data communication refresh rate of the interactive window object dependent on whether the interactive window object is displayed in the focus area or the progressive shrink area.

4. The system of claim 1, the behavior component making the interactive window object static when the interactive window object is outside of the focus area.

5. The system of claim 1, wherein the instruction is automatic and the scaling component automatically moves a location of the interactive window object.

6. The system of claim 5, the interactive window object migrating from the focus areas to the progressive shrink area as a function of predetermined parameters, learned parameters, or both.

7. The system of claim 1, wherein the scaling component preserves a former focus position of the interactive window object when the interactive window object moves outside of the focus area to the progressive shrink area, the scaling component to return the interactive window object to the former focus position upon a selection of the interactive window object while located in the progressive shrink area.

8. The system of claim 1, wherein the instruction is received from a user and the scaling component moves the interactive window object outside of or into the focus area manually.

9. The system of claim 1, further comprising an inference component operable to move the interactive window object outside of or into the focus area automatically.

10. The system of claim 9, wherein the inference component moves the interactive window object as a function of inferring a user's intentions with respect to manipulating the interactive window object.

11. The system of claim 10, wherein the inference component employs machine learning techniques to facilitate the moving.

12. The system of claim 10, wherein the inference component employs a utility based analysis to perform the moving.

13. The system of claim 1, the behavior component effecting the interactive window object to behave with full functionality when located in the focus area.

14. The system of claim 1, wherein when the interactive window object is located in the progressives shrink area, the behavior component alters a transparency value of the interactive window object to cause the interactive window object to increasingly fade as it progresses toward an edge of the display space.

15. The system of claim 14, the fading increasing as a function of distance from the boundary, use of the interactive window object, a priority of the interactive window object, or a combination thereof.

16. The system of claim 1, the behavior component modifying behavior of the interactive window object, while located in the progressive shrink area, as a function of a number of interactive window objects within the display space.

17. The system of claim 16, the behavior component modifying behavior of the interactive window object as a function of a number of interactive window objects within the focus area.

18. The system of claim 16, the behavior component modifying behavior of the interactive window object as a function of a number of interactive window objects within the progressive shrink area.

19. The system of claim 16, the behavior component applying at least one of the following metrics in connection with modifying behavior of the interactive window object: processing overhead, display space, relative location of window objects, priority associated with respective window objects, time of day, and user state.

20. The system of claim 1, the behavior component effecting shifts of multiple interactive window objects so as to automatically move older, less active interactive window objects into the progressive shrink area of the display space.

21. The system of claim 1, the behavior component modifying a minimum density or resolution of the interactive window object while in the progressive shrink area.

22. The system of claim 1, the behavior component automatically shifting and moving off and on interactive window objects, in a manner that keeps the respective interactive window objects on a screen usable.

23. The system of claim 1, the behavior component implicitly returning older interactive window objects to respective previous states as newer interactive window objects are closed.

24. The system of claim 1, wherein the focus area component is operable to modify a geometry of the focus area.

25. The system of claim 24, wherein the focus area component modifies one or more of a horizontal and a vertical dimension of the focus area.

26. The system of claim 1, wherein the focus area component is operable to modify a geometry of the progressive shrink area.

27. The system of claim 1, wherein the focus area component is operable to modify a size of the progressive shrink area.

28. The system of claim 1, the scaling component scaling the interactive window object, while displayed in the progressive shrink area, as a function of a variety of predetermined, learned metrics, or both.

29. The system of claim 28, the scaling component scaling the interactive window object as a function of distance from a reference point of the focus area.

30. The system of claim 28, the scaling component scaling the interactive window object as a function of speed of movement of the interactive window object relative center of mass, or both.

31. The system of claim 1, wherein the scaling component scales the window object using non-liner based techniques.

32. A desktop computing system employing the system of claim 1.

33. A portable computing device employing the system of claim 1.

34. A wireless telephone employing the system of claim 1.

35. A personal data assistant employing the system of claim 1.

36. A vehicle employing the system of claim 1.

37. The system of claim 1, wherein the instruction is a cursor instruction employed to move the object.

38. The system of claim 1, the behavior component effecting one of object occlusion avoidance behavior and object cluster occlusion avoidance behavior.

39. The system of claim 38, at least one of the scaling component or behavior component updating properties of a moved object based at least in part upon new location.

40. The system of claim 1, preserving a former focus position of the interactive window object upon the interactive window object being moved to the progressive shrink area.

41. The system of claim 40, the interactive window object moving back to the focus area upon a user clicking the interactive window object when the interactive window object is in the progressive shrink area.

42. The system of claim 1, preserving a former periphery position of the interactive window object upon the interactive window object moving to the focus area.

43. The system of claim 1, wherein the instruction is a user clicking the interactive window object when the interactive window object is in the focus area.

44. The system of claim 1, wherein a transition point effects the scaling, behavior modification, or both, of the interactive window object based on at least one of: a center of the interactive window object crossing the boundary, a leading or trailing edge of the interactive window object crossing the boundary, and a position of a cursor that is employed in connection with manipulation of the interactive window object.

45. The system of claim 1, the scaling component effecting scaling on the interactive window object as a linear function of proximity to the focus area or an edge of the display space.

46. The system of claim 1, the scaling component effecting scaling on the interactive window object displayed within the focus area as a nonlinear function of proximity of the interactive window object to the boundary so as to mitigate abrupt change in a size of the interactive window object.

47. The system of claim 1, the scaling component effecting scaling on the interactive window object at a corner of the display space based at least in part upon minimums of scales defined by a horizontal and a vertical position of the interactive window object.

48. A method that facilitates optimizing display space utilization, comprising:
defining a focus area within a display space, the focus area occupying a subset area of the display space;
defining a progressive shrink area within the display space, the progressive shrink area located along a perimeter of the display space outside of the focus area;
defining a boundary that separates the focus area and the progressive shrink area:
scaling down, by one or more processors configured with executable instructions, one or more interactive window objects when the one or more interactive window objects move across the boundary from the focus area into the progressive shrink area, the scaling down relative to a proximity of the individual one or more interactive window objects to the boundary; and
eliding at least one component of the one or more interactive window objects during the scaling down.

49. The method of claim 48, further comprising modifying behavior of at least one interactive window object as a function of location in the progressive shrink area.

50. The method of claim 49, the comprising modifying functionality of the at least one interactive window object.

51. The method of claim 48, further comprising automatically shifting at least one interactive window object between the focus area and the progressive shrink area as a function of at least one predetermined metric, learned metric or both.

52. The method of claim 48, wherein the focus area is located inside of the display space such that the focus area does not touch any edges of the display space.

53. The method of claim 48, further comprising placing interactive window objects that reach an edge of the display space into a side bar.

54. The method of claim 53, further comprising organizing the interactive window objects within the side bar as a function of predetermined constraints.

55. The method of claim 48, further comprising changing behavior of a first interactive window object when the first interactive window object crosses the boundary, and automatically modifying behavior of secondary interactive window objects as a function of the change to the first interactive window object.

56. The method of claim 55, the modification of behavior to the first and secondary interactive window objects being based at least in part on optimizing utilization of the display space.

57. The method of claim 48, further comprising reducing functionality associated with the one or more interactive window objects as the one or more interactive window objects respectively progress through the progressive shrink area toward an edge of the display space, wherein the one or more interactive window objects exhibit standard functionality when located in the focus area.

58. The method of claim 48, further comprising modifying geometry of at least one of the focus area and the progressive shrink area.

59. The method of claim 48, further comprising effecting object occlusion avoidance behavior.

60. The method of claim 48, further comprising effecting object cluster occlusion avoidance behavior.

61. The method of claim 48, further comprising updating properties of a moved interactive window object based at least in part upon a new location of the moved interactive window object within the progressive shrink area.

62. The method of claim 48, further comprising preserving a former focus position in the focus area of an interactive window object upon the an interactive window object being moved to the progressive shrink area.

63. The method of claim 48, further comprising preserving a former interactive window object periphery position upon the interactive window object being moved to the focus area.

64. The method of claim 48, further comprising moving an interactive window object to the progressive shrink area upon a user clicking the interactive window object when in the focus area.

65. The method of claim 48, further comprising moving an interactive window object back to the focus area upon a user clicking the interactive window object when the interactive window object is in the progressive shrink area, the interactive window object returning to a preserved former focus position when moved back to the focus area.

66. The method of claim 48, further comprising defining a transition point to effect scaling, behavior modification, or both, of an interactive window object based on at least one of: a center of the interactive window object, leading and trailing edge of the object interactive window, and position of a cursor that is employed in connection with manipulation of the interactive window object.

67. The method of claim 48, further comprising effecting scaling on an interactive window object as a linear function of proximity to the boundary or an edge of the display space.

68. The method of claim 48, further comprising effecting scaling on an interactive window object as a non-linear function of proximity to the boundary or an edge of the display space so as to mitigate abrupt change in size of the interactive window object.

69. The method of claim 48, further comprising effecting scaling on an interactive window object at a corner of the display space based at least in part upon minimums of scales defined by horizontal and vertical positions.

70. A computer readable storage medium comprising processor executable instruction operable to perform the method of claim 48.

71. A method that facilitates optimizing display space utilization, comprising:
defining a focus area within a display space, the focus area occupying a subset area of the display space;
defining a progressive shrink area within the display space, the progressive shrink area located about an outside periphery of the focus area surrounding the focus area;
defining a boundary that separates the focus area and the progressive shrink area:
stabilizing, by one or more processors configured with executable instructions, size and functionality of window objects positioned within the focus area;
scaling, by the one or more processors configured with executable instructions, size and functionality of window objects positioned within the progressive shrink area as a function of proximity of the scaled window objects to the boundary; and
rendering at least one component of the scaled window objects during the scaling.

72. The method of claim 71, further comprising effecting behavior modification to a particular group of window objects en masse.

73. The method of claim 72, further comprising modifying respective behavior of window objects within the particular group uniformly.

74. The method of claim 72, further comprising modifying respective behavior of window objects within the particular group individually.

75. The method of claim 71, further comprising employing cluster occlusion avoidance behavior.

76. The method of claim 71, wherein the scaled window objects are a cluster of objects and the method further comprising employing cluster scaling.

77. The method of claim 76, further comprising revising a distance between a window object and a center of the cluster as a function of the cluster scaling.

78. The method of claim 71, further comprising preserving a state of the window objects.

79. The method of claim 71, the window objects positioned within the focus area being a cluster of objects and the method further comprising transitioning the cluster from the focus area to the progressive shrink area upon a user selecting a marker associated with the cluster.

80. The method of claim 71, the window objects positioned within the progressive shrink area being a cluster of objects and the method further comprising transitioning the cluster from the progressive shrink area to the focus area upon a user selecting a marker associated with the cluster.

81. The method of claim 80, further comprising effecting task switching between the window objects of the cluster.

82. A computer readable storage medium comprising processor executable instruction operable to perform the method of claim 71.

83. A system comprising:
one or more processors; and
a memory, coupled to the one or more processors, storing components executable by the one or more processors, the components comprising:
a focus area component that defines, within a display space, a focus area, a peripheral area, and a boundary that separates the focus area from the peripheral area;
a scaling component that scales down one or more interactive window objects as a function of proximity to the boundary when the one or more interactive window objects are respectively moved from the focus area, across the boundary, and into the peripheral; and
a behavior component that regulates functionality of the one or more interactive window objects dependent on whether the respective interactive window objects are located in the focus area or in the peripheral area, wherein the one or more interactive window objects exhibit standard functionality when located in the focus area and reduced functionality when located in the peripheral area.

84. The system of claim 83, wherein the regulated functionality is related to network communication functionality.

85. The system of claim 84, wherein the network communication functionality includes a refresh rate of web data associated with an interactive window object.

* * * * *